(12) United States Patent
Chen et al.

(10) Patent No.: US 12,309,415 B2
(45) Date of Patent: *May 20, 2025

(54) VIDEO PICTURE PREDICTION METHOD AND APPARATUS

(71) Applicant: HUAWEI TECHNOLOGIES CO., LTD., Guangdong (CN)

(72) Inventors: Huanbang Chen, Shenzhen (CN); Xiang Ma, Moscow (RU); Haitao Yang, Shenzhen (CN); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,223

(22) Filed: Jun. 30, 2023

(65) Prior Publication Data

US 2024/0007663 A1 Jan. 4, 2024

Related U.S. Application Data

(63) Continuation of application No. 17/858,567, filed on Jul. 6, 2022, now Pat. No. 11,736,715, which is a
(Continued)

(30) Foreign Application Priority Data

Aug. 27, 2018 (CN) .......................... 201810983026.0

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS 6,208,690 B1    3/2001  Tomizawa
2012/0121185 A1*  5/2012  Zavesky ................. G06F 3/017
                                                     715/863
(Continued)

FOREIGN PATENT DOCUMENTS

CN    105163116 A    12/2015
CN    106559669 A    4/2017
(Continued)

OTHER PUBLICATIONS

Akula et al., "Description of SDR, HDR and 360 Video Coding Technology Proposal Considering Mobile Application Scenario by Samsung, Huawei, GoPro, and HiSilicon," buJoint Video Exploration Team (JVET) of ITU-T SG 16 WP 3 and ISO/IEC JTC 1/SC 29/WG 11, Document: JVET-J0024_v2, 10th Meeting: San Diego, US, Apr. 10-20, 2018, 120 pages.
(Continued)

*Primary Examiner* — Talha M Nawaz
(74) *Attorney, Agent, or Firm* — Fish & Richardson P.C.

(57) ABSTRACT

This application provides a video picture prediction method and apparatus, to resolve a problem in a conventional technology that a length of a coded video sequence is increased. The first type of identifier may be added to a bitstream. The first type of identifier is used to indicate whether an affine motion model-based inter prediction mode is enabled for a video picture. For a video picture or a picture block included in the slice for which the affine motion model does not need to be used, a parameter, related to the affine motion model, of the picture block may not need to be transmitted. On a decoder side, during decoding of the picture block, the parameter related to the affine motion
(Continued)

model does not need to be parsed. This can reduce load of a decoder, increase a processing speed, and decrease a processing time.

20 Claims, 14 Drawing Sheets

Related U.S. Application Data continuation of application No. 17/185,039, filed on Feb. 25, 2021, now Pat. No. 11,425,410, which is a continuation of application No. PCT/CN2019/083100, filed on Apr. 17, 2019.

(51) Int. Cl.
 *H04N 19/159* (2014.01)
 *H04N 19/176* (2014.01)
 *H04N 19/46* (2014.01)

(56) References Cited

U.S. PATENT DOCUMENTS

| | | |
|---|---|---|
| 2017/0332095 A1 | 11/2017 | Zou et al. |
| 2018/0098063 A1 | 4/2018 | Chen et al. |
| 2019/0028731 A1 | 1/2019 | Chuang et al. |
| 2019/0058896 A1 | 2/2019 | Huang et al. |
| 2019/0104319 A1 | 4/2019 | Zhang et al. |
| 2019/0110064 A1 | 4/2019 | Zhang et al. |
| 2019/0116376 A1 | 4/2019 | Chen et al. |
| 2019/0208211 A1* | 7/2019 | Zhang ............... H04N 19/517 |
| 2019/0222865 A1 | 7/2019 | Zhang et al. |
| 2020/0099949 A1* | 3/2020 | Xu ..................... H04N 19/176 |
| 2020/0213608 A1 | 7/2020 | Chen et al. |

FOREIGN PATENT DOCUMENTS

| | | |
|---|---|---|
| CN | 108271023 A | 7/2018 |
| CN | 108432250 A | 8/2018 |
| WO | 2017200771 A1 | 11/2017 |

OTHER PUBLICATIONS

Bross et al., "Versatile Video Coding (Draft 2)," Joint Video Experts Team (JVET) of ITU-T SG 16 WP 3 and ISO/IEC JTC 1/SC 29/WG 11,Document: JVET-K1001 v5, 11th Meeting: Ljubljana, SI, Jul. 10-18, 2018, 136 pages.

Extended European Search Report issued in European Application No. 19853361.4 on Aug. 31, 2021, 17 pages.

Li et al., "An Affine Motion Compensation Framework for High Efficiency Video Coding," 2015 IEEE International Symposium on Circuits and Systems (ISCAS), Jul. 30, 2015, 4 pages.

Lin et al., "Affine Transform Prediction for Next Generation Video Coding," International Organization for Standardization, ISO/IEC JTC1/SC29/WG11, Coding of Moving Pictures and Audio, ISO/IEC JTC1/SC29/WG11 MPEG2015/m37525, Geneva, Switzerland, Oct. 2015, 10 pages.

PCT International Search Report and Written Opinion issued in International Application No. PCT/CN2019/083100 on Jul. 10, 2019, 13 pages (with English translation).

Sullivan et al., "Meeting Report of the 11th Meeting of the Joint Video Experts Team (JVET), Ljubljana, SI, Jul. 10-18, 2018," Joint Video Experts Team (JVET) of ITU-T SG 16 WP 3 and ISO/IEC JTC 1/SC 29/WG 11, Document: JVET-K1000-v1, 11th Meeting: Ljubljana, SI, Jul. 10-18, 2018, 290 pages.

Yang et al., "Description of CE4: Inter-Prediction and Motion Vector Coding," Joint Video Experts Team (JVET) of ITU-TSG 16 WP 3 and ISO/IEC JTC 1/SC 29/WG 11, Document: JVET-JJ1024r2, 10th Meeting: San Diego, US, Apr. 10-20, 2018, 46 pages.

Yang et al., "Draft Text for Affine Motion Compensation," Joint Video Experts Team (JVET) of ITU-T SG 16 WP 3 and ISO/IEC JTC 1/SC 29/WG 11, Document: JVET-K0565-v2, 11th Meeting: Ljubljana, SI, Jul. 10-18, 2018, 61 pages.

Office Action in Chinese Appln. No. 201810983026.0, dated Feb. 16, 2023, 13 pages.

Office Action in Japanese Appln. No. 2023-065984, mailed on Oct. 8, 2024, 3 pages (with English translation).

* cited by examiner

VIDEO PICTURE PREDICTION METHOD AND APPARATUS

CROSS-REFERENCE TO RELATED APPLICATIONS

This application is a continuation of U.S. patent application Ser. No. 17/858,567, filed on Jul. 6, 2022, which is a continuation of U.S. patent application Ser. No. 17/185,039, filed on Feb. 25, 2021, now U.S. Pat. No. 11,425,410, which is a continuation of International Application No. PCT/CN2019/083100, filed on Apr. 17, 2019, which claims priority to Chinese Patent Application No. 201810983026.0, filed on Aug. 27, 2018. All of the afore-mentioned patent applications are hereby incorporated by reference in their entireties.

TECHNICAL FIELD

This application relates to the field of picture encoding and decoding technologies, and in particular, to a video picture prediction method and apparatus.

BACKGROUND

With development of information technologies, video services such as high definition television, web conferencing, IPTV, and 3D television develop rapidly. Thanks to advantages such as intuitiveness and high efficiency, video signals become a main manner of obtaining information in people's daily life. The video signals include a large amount of data, and therefore occupy a large amount of transmission bandwidth and storage space. To effectively transmit and store the video signals, compression encoding needs to be performed on the video signals. A video compression technology has increasingly become an indispensable key technology in the field of video application.

A basic principle of video coding compression is to eliminate redundancy as much as possible based on a correlation between a space domain, a time domain, and a codeword. Currently, a prevalent method is to use a picture-block-based hybrid video coding framework to implement video coding compression by performing steps such as prediction (including intra prediction and inter prediction), transform, quantization, and entropy coding.

In various video encoding/decoding solutions, motion estimation/motion compensation in inter prediction is a key technology that affects encoding/decoding performance. In existing inter prediction, sub-block-based motion compensation prediction using a non-translational motion model (for example, an affine motion model) is added based on block-based motion compensation (motion compensation, MC) prediction using a translational motion model. Regardless of whether the non-translational motion model is used, a related parameter about the affine motion model needs to be added to a coded video sequence. As a result, a length of the coded video sequence is increased.

SUMMARY

This application provides a video picture prediction method and apparatus, to resolve a problem in a conventional technology that a length of a coded video sequence is increased.

According to a first aspect, an embodiment of this application provides a video picture prediction method, including: parsing a bitstream to obtain a first identifier; when the first identifier indicates that a candidate motion model for inter prediction of a picture block in a video picture including a to-be-processed block includes an affine motion model, and the to-be-processed block meets a preset condition for inter prediction using the affine motion model, parsing the bitstream to obtain a second identifier; and determining, based on the second identifier, a prediction mode for inter prediction of the to-be-processed block, where the prediction mode includes an affine motion model-based merge mode, an affine motion model-based AMVP mode, and a non-affine motion model-based prediction mode.

In the foregoing solution, for example, some video pictures may have some affine features, while some video pictures may have no affine features. In this case, an identifier may be added to a bitstream to indicate whether an affine motion model-based inter prediction mode is enabled for the video picture. If the affine motion model-based inter prediction mode is not enabled for the video picture, a parameter, related to the affine motion model, of a picture block of the video picture may not need to be transmitted. On a decoder side, during decoding of the picture block of the video picture, the parameter related to the affine motion model does not need to be parsed. This can reduce load of a decoder, increase a processing speed, and decrease a processing time.

For example, terms such as "first" and "second" are merely used for distinction and description, and shall not be understood as an indication or implication of relative importance or an indication or implication of an order. In addition, for a parameter such as an identifier, different names may be used for description of same content in various aspects and specific embodiments. For example, the first identifier in the first aspect is referred to as a fifth identifier in the second aspect. In a specific embodiment, the first identifier in the first aspect is referred to as an identifier 1, and the second identifier in the first aspect is referred to as an identifier 12.

In a possible design of the first aspect, the parsing a bitstream to obtain a first identifier may be implemented in the following manner: parsing a sequence parameter set of the bitstream to obtain the first identifier. When the first identifier is configured in the sequence parameter set, and the first identifier indicates that the affine motion model-based inter prediction mode is not enabled for the video picture, each picture-block-level syntax of the video picture does not include a syntax element related to the affine motion model. On the decoder side, during decoding of the picture block of the video picture, the parameter related to the affine motion model does not need to be parsed. This can reduce load of a decoder, increase a processing speed, and decrease a processing time.

In a possible design of the first aspect, when the first identifier indicates that the candidate motion model for inter prediction of the picture block of the video picture including the to-be-processed block includes the affine motion model, the method further includes: parsing the bitstream to obtain a third identifier. When the third identifier is a first value, the affine motion model includes only a 4-parameter affine model; or when the third identifier is a second value, the affine motion model includes a 4-parameter affine model and a 6-parameter affine model. The first value is different from the second value.

In the foregoing design, the third identifier indicating whether the affine motion model including a 6-parameter affine model is enabled for the video picture may be further configured in the bitstream. When the third identifier indicates that the 6-parameter affine model is not enabled for the video picture, a parameter related to the 6-parameter affine model does not need to be parsed for the picture block of the video picture, and the parameter related to the 6-parameter affine model does not need to be transmitted, in the bitstream, for each picture block of the video picture, either. This can reduce a length of a coded video sequence, reduce load of a decoder, increase a processing speed, and decrease a processing time.

In a specific embodiment, the third identifier in the first aspect is referred to as an identifier 13.

In a possible design of the first aspect, the method further includes: when the second identifier indicates that affine motion model-based merge mode is used for inter prediction of the to-be-processed block, and the third identifier is the second value, constructing a first candidate motion vector list, where the first candidate motion vector list includes a first element, and the first element includes motion information of three control points for constructing the 6-parameter affine motion model; or when the second identifier indicates that affine motion model-based merge mode is used for inter prediction of the to-be-processed block, and the third identifier is the first value, constructing a second candidate motion vector list, where the second candidate motion vector list includes a second element, and the second element includes only motion information of two control points for constructing the 4-parameter affine motion model.

In the foregoing design, the third identifier and the second identifier are used to indicate construction of the candidate motion vector lists.

In a possible design of the first aspect, when the second identifier indicates that affine motion model-based merge mode is used for inter prediction of the to-be-processed block, and the third identifier is the second value, the first candidate motion vector list further includes the second element.

In a possible design of the first aspect, the method further includes: when the second identifier indicates that the affine motion model-based AMVP mode is used for inter prediction of the to-be-processed block, and the third identifier is the second value, parsing the bitstream to obtain a fourth identifier. When the fourth identifier is a third value, the affine motion model is the 6-parameter affine motion model, or when the fourth identifier is a fourth value, the affine motion model is the 4-parameter affine motion model. The third value is different from the fourth value.

In a specific embodiment, the fourth identifier is referred to as an identifier 14.

In a possible design of the first aspect, the parsing the bitstream to obtain a third identifier includes: parsing the sequence parameter set of the bitstream to obtain the third identifier.

In a possible design of the first aspect, the preset condition includes that a width of the to-be-processed block is greater than or equal to a first preset threshold, and a height of the to-be-processed block is greater than or equal to a second preset threshold.

In a possible design of the first aspect, the first preset threshold is equal to the second preset threshold.

According to a second aspect, an embodiment of this application provides a video picture prediction method, including: parsing a bitstream to obtain a first identifier; when the first identifier indicates that a candidate motion model for inter prediction of a picture block of a slice including a to-be-processed block includes an affine motion model, and the to-be-processed block meets a preset condition for inter prediction using the affine motion model, parsing the bitstream to obtain a second identifier; and determining, based on the second identifier, a prediction mode for inter prediction of the to-be-processed block, where the prediction mode includes an affine motion model-based merge mode, an affine motion model-based AMVP mode, and a non-affine motion model-based prediction mode.

In the foregoing solution, for example, some slices of a video picture may have some affine features, while some slices of the video picture may have no affine features. In this case, an identifier may be added to the bitstream to indicate whether an affine motion model-based inter prediction mode is enabled for a slice of the video picture. If the affine motion model-based inter prediction mode is not enabled for the slice, a parameter, related to the affine motion model, of a picture block included in the slice may not need to be transmitted. On a decoder side, during decoding of the picture block in the slice, the parameter related to the affine motion model does not need to be parsed. This can reduce load of a decoder, increase a processing speed, and decrease a processing time.

It should be noted that the first identifier in the second aspect is referred to as an identifier 2 in a specific embodiment, and the second identifier in the second aspect is referred to as an identifier 22 in a specific embodiment.

In a possible design of the second aspect, the parsing a bitstream to obtain a first identifier includes: parsing a slice header of the slice in the bitstream to obtain the first identifier.

When the first identifier is configured in the slice header of the slice, and the first identifier indicates that the affine motion model-based inter prediction mode is not enabled for the slice, each picture-block-level syntax of the slice does not include a syntax element related to the affine motion model. On the decoder side, during decoding of the picture block in the slice, the parameter related to the affine motion model does not need to be parsed. This can reduce load of a decoder, increase a processing speed, and decrease a processing time.

In a possible design of the second aspect, when the first identifier indicates that the candidate motion model for inter prediction of the picture block in the slice including the to-be-processed block includes the affine motion model, the method further includes: parsing the bitstream to obtain a third identifier. When the third identifier is a first value, the affine motion model includes only a 4-parameter affine model; or when the third identifier is a second value, the affine motion model includes a 4-parameter affine model and a 6-parameter affine model. The first value is different from the second value.

It should be noted that the third identifier in the second aspect is referred to as an identifier 23 in a specific embodiment.

In a possible design of the second aspect, the method further includes: when the second identifier indicates that affine motion model-based merge mode is used for inter prediction of the to-be-processed block, and the third identifier is the second value, constructing a first candidate motion vector list, where the first candidate motion vector list includes a first element, and the first element includes motion information of three control points for constructing the 6-parameter affine motion model; or when the second identifier indicates that affine motion model-based merge mode is used for inter prediction of the to-be-processed block, and the third identifier is the first value, constructing a second candidate motion vector list, where the second candidate motion vector list includes a second element, and the second element includes only motion information of two control points for constructing the 4-parameter affine motion model.

In a possible design of the second aspect, when the second identifier indicates that affine motion model-based merge mode is used for inter prediction of the to-be-processed block, and the third identifier is the second value, the first candidate motion vector list further includes the second element.

In a possible design of the second aspect, the method further includes: when the second identifier indicates that the affine motion model-based AMVP mode is used for inter prediction of the to-be-processed block, and the third identifier is the second value, parsing the bitstream to obtain a fourth identifier.

When the fourth identifier is a third value, the affine motion model is the 6-parameter affine motion model, or when the fourth identifier is a fourth value, the affine motion model is the 4-parameter affine motion model. The third value is different from the fourth value.

It should be noted that, in this application, the fourth identifier is referred to as an identifier 24 in a specific embodiment.

In the foregoing design, the third identifier indicating whether the affine motion model used for the slice may include the 6-parameter affine motion model may be further configured in the bitstream. When the third identifier indicates that the 6-parameter affine model is not enabled for the slice, a parameter related to the 6-parameter affine model does not need to be parsed for the picture block included in the slice, and the parameter related to the 6-parameter affine model does not need to be transmitted, in the bitstream, for each picture block included in the slice, either. This can reduce a length of a coded video sequence, reduce load of a decoder, increase a processing speed, and decrease a processing time.

In a possible design of the second aspect, the parsing the bitstream to obtain a third identifier includes: parsing the slice header of the slice in the bitstream to obtain the third identifier.

In a possible design of the second aspect, before the parsing a bitstream to obtain a first identifier, the method further includes: parsing the bitstream to obtain a fifth identifier. When the fifth identifier is a fifth value, a candidate motion model for inter prediction of a picture block in a video picture including the to-be-processed block includes the affine motion model, or when the fifth identifier is a sixth value, a candidate motion model for inter prediction of a picture block in a video picture including the to-be-processed block includes only the non-affine motion model. The fifth value is different from the sixth value.

The fifth identifier is referred to as an identifier 1 in a specific embodiment.

Some video pictures have no affine features, while not all slices of some video pictures have affine features. In this case, two identifiers may be added to the bitstream. A first type of identifier (which is referred to as the fifth identifier in the second aspect) is used to indicate whether the affine motion model-based inter prediction mode is enabled for the video picture, and a second type of identifier (which is referred to as the first identifier in the second aspect) is used to indicate whether the affine motion model-based inter prediction mode is enabled for the slice in the video picture. For a video picture or a picture block included in the slice for which the affine motion model does not need to be used, a parameter, related to the affine motion model, of the picture block may not need to be transmitted. On the decoder side, during decoding of the picture block, the parameter related to the affine motion model does not need to be parsed. This can reduce load of a decoder, increase a processing speed, and decrease a processing time.

In a possible design of the second aspect, the parsing the bitstream to obtain a fifth identifier includes: parsing a sequence parameter set of the bitstream to obtain the fifth identifier.

In a possible design of the second aspect, after the parsing the bitstream to obtain a fifth identifier, and before the parsing a bitstream to obtain a first identifier, the method further includes: parsing the bitstream to obtain a sixth identifier. The sixth identifier is used to determine that the bitstream includes the third identifier.

It should be noted that the sixth identifier in the second aspect is referred to as an identifier 13 in a specific embodiment.

In a possible design of the second aspect, the parsing the bitstream to obtain a sixth identifier includes: parsing the sequence parameter set of the bitstream to obtain the sixth identifier.

In a possible design of the second aspect, the preset condition includes that a width of the to-be-processed block is greater than or equal to a first preset threshold, and a height of the to-be-processed block is greater than or equal to a second preset threshold.

In a possible design of the second aspect, the first preset threshold is equal to the second preset threshold.

Based on a same inventive concept as the first aspect, according to a third aspect, an embodiment of this application provides a video picture prediction apparatus, including:

a parsing unit, configured to: parse a bitstream to obtain a first identifier; and when the first identifier indicates that a candidate motion model for inter prediction of a picture block in a video picture including a to-be-processed block includes an affine motion model, and the to-be-processed block meets a preset condition for inter prediction using the affine motion model, parse the bitstream to obtain a second identifier.

The parsing unit is further configured to determine, based on the second identifier, a prediction mode for inter prediction of the to-be-processed block. The prediction mode includes an affine motion model-based merge mode, an affine motion model-based AMVP mode, and a non-affine motion model-based prediction mode.

In a possible design of the third aspect, when parsing the bitstream to obtain the first identifier, the parsing unit is specifically configured to parse a sequence parameter set of the bitstream to obtain the first identifier.

In a possible design of the third aspect, when the first identifier indicates that the candidate motion model for inter prediction of the picture block in the video picture including the to-be-processed block includes the affine motion model, the parsing unit is further configured to parse the bitstream to obtain a third identifier. When the third identifier is a first value, the affine motion model includes only a 4-parameter affine model; or when the third identifier is a second value, the affine motion model includes a 4-parameter affine model and a 6-parameter affine model. The first value is different from the second value.

In a possible design of the third aspect, the apparatus further includes: a construction unit, configured to: when the second identifier indicates that affine motion model-based merge mode is used for inter prediction of the to-be-processed block, and the third identifier is the second value, construct a first candidate motion vector list, where the first candidate motion vector list includes a first element, and the first element includes motion information of three control points for constructing the 6-parameter affine motion model; or when the second identifier indicates that affine motion model-based merge mode is used for inter prediction of the to-be-processed block, and the third identifier is the first value, construct a second candidate motion vector list, where the second candidate motion vector list includes a second element, and the second element includes only motion information of two control points for constructing the 4-parameter affine motion model.

In a possible design of the third aspect, when the second identifier indicates that affine motion model-based merge mode is used for inter prediction of the to-be-processed block, and the third identifier is the second value, the first candidate motion vector list further includes the second element.

In a possible design of the third aspect, the parsing unit is further configured to:

when the second identifier indicates that the affine motion model-based AMVP mode is used for inter prediction of the to-be-processed block, and the third identifier is the second value, parse the bitstream to obtain a fourth identifier.

When the fourth identifier is a third value, the affine motion model is the 6-parameter affine motion model, or when the fourth identifier is a fourth value, the affine motion model is the 4-parameter affine motion model. The third value is different from the fourth value.

In a possible design of the third aspect, when parsing the bitstream to obtain the third identifier, the parsing unit is specifically configured to parse the sequence parameter set of the bitstream to obtain the third identifier.

In a possible design of the third aspect, the preset condition includes that a width of the to-be-processed block is greater than or equal to a first preset threshold, and a height of the to-be-processed block is greater than or equal to a second preset threshold.

In a possible design of the third aspect, the first preset threshold is equal to the second preset threshold.

Based on a same inventive concept as the second aspect, according to a fourth aspect, an embodiment of this application provides a video picture prediction apparatus, including: a parsing unit, configured to parse a bitstream to obtain a first identifier. The parsing unit is further configured to: when the first identifier indicates that a candidate motion model for inter prediction of a picture block in a slice including a to-be-processed block includes an affine motion model, and the to-be-processed block meets a preset condition for inter prediction using the affine motion model, parse the bitstream to obtain a second identifier; and determine, based on the second identifier, a prediction mode for inter prediction of the to-be-processed block. The prediction mode includes an affine motion model-based merge mode, an affine motion model-based AMVP mode, and a non-affine motion model-based prediction mode.

In a possible design of the fourth aspect, when parsing the bitstream to obtain the first identifier, the parsing unit is specifically configured to parse a slice header of the slice in the bitstream to obtain the first identifier.

In a possible design of the fourth aspect, affine motion model-based merge mode is used for inter prediction of the to-be-processed block. The parsing unit is further configured to: when the first identifier indicates that the candidate motion model for inter prediction of the picture block in the slice including the to-be-processed block includes the affine motion model, parse the bitstream to obtain a third identifier. When the third identifier is a first value, the affine motion model includes only a 4-parameter affine model; or when the third identifier is a second value, the affine motion model includes a 4-parameter affine model and a 6-parameter affine model. The first value is different from the second value.

In a possible design of the fourth aspect, the apparatus further includes: a construction unit, configured to: when the second identifier indicates that affine motion model-based merge mode is used for inter prediction of the to-be-processed block, and the third identifier is the second value, construct a first candidate motion vector list, where the first candidate motion vector list includes a first element, and the first element includes motion information of three control points for constructing the 6-parameter affine motion model; or when the second identifier indicates that affine motion model-based merge mode is used for inter prediction of the to-be-processed block, and the third identifier is the first value, construct a second candidate motion vector list, where the second candidate motion vector list includes a second element, and the second element includes only motion information of two control points for constructing the 4-parameter affine motion model.

In a possible design of the fourth aspect, when the second identifier indicates that affine motion model-based merge mode is used for inter prediction of the to-be-processed block, and the third identifier is the second value, the first candidate motion vector list further includes the second element.

In a possible design of the fourth aspect, the parsing unit is further configured to: when the second identifier indicates that the affine motion model-based AMVP mode is used for inter prediction of the to-be-processed block, and the third identifier is the second value, parse the bitstream to obtain a fourth identifier. When the fourth identifier is a third value, the affine motion model is the 6-parameter affine motion model, or when the fourth identifier is a fourth value, the affine motion model is the 4-parameter affine motion model. The third value is different from the fourth value.

In a possible design of the fourth aspect, when parsing the bitstream to obtain the third identifier, the parsing unit is specifically configured to parse the slice header of the slice in the bitstream to obtain the third identifier.

In a possible design of the fourth aspect, before parsing the bitstream to obtain the first identifier, the parsing unit is further configured to parse the bitstream to obtain a fifth identifier. When the fifth identifier is a fifth value, a candidate motion model for inter prediction of a picture block in a video picture including the to-be-processed block includes the affine motion model, or when the fifth identifier is a sixth value, a candidate motion model for inter prediction of a picture block in a video picture including the to-be-processed block includes only the non-affine motion model. The fifth value is different from the sixth value.

In a possible design of the fourth aspect, when parsing the bitstream to obtain the fifth identifier, the parsing unit is specifically configured to parse a sequence parameter set of the bitstream to obtain the fifth identifier.

In a possible design of the fourth aspect, the parsing unit is further configured to: after parsing the bitstream to obtain the fifth identifier, and before parsing the bitstream to obtain the first identifier, parse the bitstream to obtain the sixth identifier. The sixth identifier is used to determine that the bitstream includes the third identifier.

In a possible design of the fourth aspect, when parsing the bitstream to obtain the sixth identifier, the parsing unit is specifically configured to parse the sequence parameter set of the bitstream to obtain the sixth identifier.

In a possible design of the fourth aspect, the preset condition includes that a width of the to-be-processed block is greater than or equal to a first preset threshold, and a height of the to-be-processed block is greater than or equal to a second preset threshold.

In a possible design of the fourth aspect, the first preset threshold is equal to the second preset threshold.

According to a fifth aspect, an embodiment of this application provides an apparatus. The apparatus may be a decoder, and includes a processor and a memory. The memory is configured to store an instruction. When the apparatus runs, the processor executes the instruction stored in the memory, to enable the apparatus to perform the method provided in any one of the first aspect, the designs of the first aspect, the second aspect, or the designs of the second aspect. It should be noted that the memory may be integrated into the processor, or may be independent of the processor.

According to a sixth aspect, an embodiment of this application provides a video picture prediction method. The method is applied to an encoder side and includes:

encoding a first identifier into a bitstream; and when the first identifier indicates that a candidate motion model for inter prediction of a picture block in a video picture including a to-be-processed block includes an affine motion model, and the to-be-processed block meets a preset condition for inter prediction using the affine motion model, encoding a second identifier into the bitstream, where the second identifier is used to determine a prediction mode for inter prediction of the to-be-processed block. The prediction mode includes an affine motion model-based merge mode, an affine motion model-based advanced motion vector prediction (AMVP) mode, and a non-affine motion model-based prediction mode.

In a possible design of the sixth aspect, the encoding a first identifier into a bitstream may be implemented in the following manner: encoding the first identifier into a sequence parameter set of the bitstream.

In a possible design of the sixth aspect, when the first identifier indicates that the candidate motion model for inter prediction of the picture block in the video picture including the to-be-processed block includes the affine motion model, the method further includes: encoding a third identifier into the bitstream. When the third identifier is a first value, the affine motion model includes only a 4-parameter affine model; or when the third identifier is a second value, the affine motion model includes a 4-parameter affine model and a 6-parameter affine model. The first value is different from the second value.

In a possible design of the sixth aspect, the method further includes: when the second identifier indicates that affine motion model-based merge mode is used for inter prediction of the to-be-processed block, and the third identifier is the second value, constructing a first candidate motion vector list, where the first candidate motion vector list includes a first element, and the first element includes motion information of three control points for constructing the 6-parameter affine motion model; or when the second identifier indicates that affine motion model-based merge mode is used for inter prediction of the to-be-processed block, and the third identifier is the first value, constructing a second candidate motion vector list, where the second candidate motion vector list includes a second element, and the second element includes only motion information of two control points for constructing the 4-parameter affine motion model.

In the foregoing design, the third identifier and the second identifier are used to indicate construction of the candidate motion vector lists.

In a possible design of the sixth aspect, when the second identifier indicates that affine motion model-based merge mode is used for inter prediction of the to-be-processed block, and the third identifier is the second value, the first candidate motion vector list further includes the second element.

In a possible design of the sixth aspect, the method further includes: when the second identifier indicates that the affine motion model-based AMVP mode is used for inter prediction of the to-be-processed block, and the third identifier is the second value, encoding a fourth identifier into the bitstream. When the fourth identifier is a third value, the affine motion model is the 6-parameter affine motion model, or when the fourth identifier is a fourth value, the affine motion model is the 4-parameter affine motion model. The third value is different from the fourth value.

In a specific embodiment, the fourth identifier is referred to as an identifier 14.

In a possible design of the sixth aspect, the encoding a third identifier into the bitstream includes: encoding the third identifier into the sequence parameter set of the bitstream.

According to a seventh aspect, an embodiment of this application provides a video picture prediction method. The method is applied to an encoder side and includes:

encoding a first identifier into a bitstream; and when the first identifier indicates that a candidate motion model for inter prediction of a picture block in a slice including a to-be-processed block includes an affine motion model, and the to-be-processed block meets a preset condition for inter prediction using the affine motion model, encoding a second identifier into the bitstream, where the second identifier is used to determine a prediction mode for inter prediction of the to-be-processed block, and the prediction mode includes an affine motion model-based merge mode, an affine motion model-based advanced motion vector prediction (AMVP) mode, and a non-affine motion model-based prediction mode.

In a possible design of the seventh aspect, the encoding a first identifier into a bitstream includes: encoding the first identifier into a slice header of the slice of the bitstream.

In a possible design of the seventh aspect, when the first identifier indicates that the candidate motion model for inter prediction of the picture block in the slice including the to-be-processed block includes the affine motion model, the method further includes: encoding a third identifier into the bitstream. When the third identifier is a first value, the affine motion model includes only a 4-parameter affine model; or when the third identifier is a second value, the affine motion model includes a 4-parameter affine model and a 6-parameter affine model. The first value is different from the second value.

In a possible design of the seventh aspect, the method further includes: when the second identifier indicates that affine motion model-based merge mode is used for inter prediction of the to-be-processed block, and the third identifier is the second value, constructing a first candidate motion vector list, where the first candidate motion vector list includes a first element, and the first element includes motion information of three control points for constructing the 6-parameter affine motion model; or when the second identifier indicates that affine motion model-based merge mode is used for inter prediction of the to-be-processed block, and the third identifier is the first value, constructing a second candidate motion vector list, where the second candidate motion vector list includes a second element, and the second element includes only motion information of two control points for constructing the 4-parameter affine motion model.

In a possible design of the seventh aspect, when the second identifier indicates that affine motion model-based merge mode is used for inter prediction of the to-be-processed block, and the third identifier is the second value, the first candidate motion vector list further includes the second element.

In a possible design of the seventh aspect, the method further includes: when the second identifier indicates that the affine motion model-based AMVP mode is used for inter prediction of the to-be-processed block, and the third identifier is the second value, encoding a fourth identifier into the bitstream.

When the fourth identifier is a third value, the affine motion model is the 6-parameter affine motion model, or when the fourth identifier is a fourth value, the affine motion model is the 4-parameter affine motion model. The third value is different from the fourth value.

In a possible design of the seventh aspect, the encoding a third identifier into the bitstream includes: encoding the third identifier into the slice header of the slice of the bitstream.

In a possible design of the seventh aspect, before the encoding a first identifier into a bitstream, the method further includes: encoding a fifth identifier into the bitstream. When the fifth identifier is a fifth value, a candidate motion model for inter prediction of a picture block in a video picture including the to-be-processed block includes the affine motion model, or when the fifth identifier is a sixth value, a candidate motion model for inter prediction of a picture block in a video picture including the to-be-processed block includes only the non-affine motion model. The fifth value is different from the sixth value.

In a possible design of the seventh aspect, the encoding a fifth identifier into the bitstream includes: encoding the fifth identifier into a sequence parameter set of the bitstream.

In a possible design of the seventh aspect, after the encoding a fifth identifier into the bitstream and before the encoding a first identifier in a bitstream, the method further includes: encoding a sixth identifier into the bitstream. The sixth identifier is used to determine that the bitstream includes the third identifier.

It should be noted that the sixth identifier in the seventh aspect is referred to as an identifier 13 in a specific embodiment.

In a possible design of the seventh aspect, the encoding a sixth identifier into the bitstream includes: encoding the sixth identifier into the sequence parameter set of the bitstream.

According to an eighth aspect, an embodiment of this application provides an apparatus. The apparatus may be an encoder, and includes a processor and a memory. The memory is configured to store an instruction. When the apparatus runs, the processor executes the instruction stored in the memory, to enable the apparatus to perform the method provided in any one of the third aspect, the designs of the third aspect, the fourth aspect, or the designs of the fourth aspect. It should be noted that the memory may be integrated into the processor, or may be independent of the processor.

According to a ninth aspect, this application provides a computer-readable storage medium. The computer-readable storage medium stores an instruction; and when the instruction is executed on a computer, the computer is enabled to perform the method described in each of the foregoing aspects.

According to a tenth aspect, this application provides a computer program product including an instruction. When the computer program product is run on a computer, the computer is enabled to perform the method described in each of the foregoing aspects.

It should be understood that technical solutions of the third to the tenth aspects of this application are consistent with technical solutions of the first aspect and the second aspect of this application, and advantageous effects achieved by the aspects and the corresponding implementable designs are similar. Details are not described again.

DESCRIPTION OF EMBODIMENTS

Figure 1:
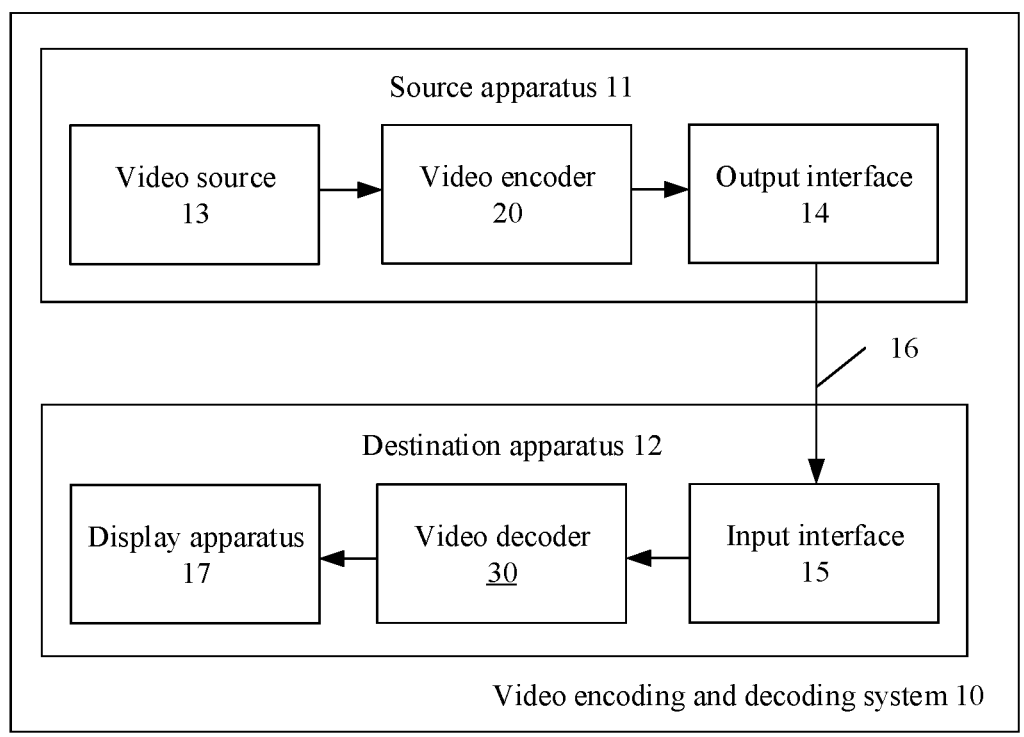
FIG. 1 is a block diagram of a video encoding and decoding system in an implementation described in an embodiment of this application.

A video picture prediction solution provided in the embodiments of this application may be applied to video picture encoding or decoding. FIG. 1 is a schematic block diagram of a video encoding and decoding system 10 according to an embodiment of this application. As shown in FIG. 1, the system 10 includes a source apparatus 11 and a destination apparatus 12. The source apparatus 11 generates encoded video data and sends the encoded video data to the destination apparatus 12. The destination apparatus 12 is configured to receive the encoded video data, decode the encoded video data, and display the decoded video data. The source apparatus 11 and the destination apparatus 12 may include any one of a wide range of apparatuses, including a desktop computer, a laptop computer, a tablet computer, a set-top box, a mobile phone such as a "smart" phone, a "smart" touch panel, a television set, a camera, a display apparatus, a digital media player, a video gaming console, a video streaming transmission apparatus, and the like.

A solution for predicting an intra mode of a picture block provided in the embodiments of this application may be applied to video picture encoding or decoding.

The destination apparatus 12 may receive the to-be-decoded encoded video data through a link 16. The link 16 may include any type of media or apparatuses that can transfer the encoded video data from the source apparatus 11 to the destination apparatus 12. In a possible implementation, the link 16 may include a communications medium that enables the source apparatus 11 to directly transmit the encoded video data to the destination apparatus 12 in real time. The encoded video data may be modulated according to a communications standard (for example, a wireless communications protocol), and modulated encoded video data is transmitted to the destination apparatus 12. The communications medium may include any wireless or wired communications medium, for example, a radio frequency spectrum or one or more physical transmission lines. The communications medium may be a part of a packet-based network (for example, a local area network, a wide area network, or a global network of the Internet). The communications medium may include a router, a switch, a base station, or any other device configured to facilitate communication between the source apparatus 11 and the destination apparatus 12.

Alternatively, the video encoding and decoding system 10 further includes a storage apparatus. The encoded data may be output to the storage apparatus through an output interface 14. Similarly, the encoded data may be accessed from the storage apparatus through an input interface 15. The storage apparatus may include any one of a variety of distributed or local-access data storage media, for example, a hard disk drive, a Blu-ray disc, a DVD, a CD-ROM, a flash memory, a volatile or non-volatile memory, or any other appropriate digital storage medium used to store the encoded video data. In another feasible implementation, the storage apparatus may correspond to a file server or another intermediate storage apparatus that can maintain the encoded video generated by the source apparatus 11. The destination apparatus 12 may access the stored video data from the storage apparatus through streaming transmission or downloading. The file server may be any type of server that can store the encoded video data and transmit the encoded video data to the destination apparatus 12. In a feasible implementation, the file server includes a website server, a file transfer protocol server, a network-attached storage apparatus, or a local disk drive. The destination apparatus 12 may access the encoded video data through any standard data connection including an internet connection. The data connection may include a wireless channel (for example, a Wi-Fi connection), a wired connection (for example, a cable modem), or a combination thereof. The wireless channel or the wired connection is suitable for accessing the encoded video data stored in the file server. Transmission of the encoded video data from the storage apparatus may be streaming transmission, downloading transmission, or a combination thereof.

The technologies in this application are not necessarily limited to wireless applications or settings. The technologies may be applied to video decoding, to support any one of a variety of multimedia applications, for example, over-the-air television broadcasting, cable television transmission, satellite television transmission, streaming video transmission (for example, through the internet), digital video encoding for storage on a data storage medium, decoding of a digital video stored on a data storage medium, or another application. In some possible implementations, the system 10 may be configured to support unidirectional or bidirectional video transmission, so as to support applications such as streaming video transmission, video playing, video broadcasting, and/or video calling.

In a possible implementation of FIG. 1, the source apparatus 11 may include a video source 13, a video encoder 20, and an output interface 14. In some applications, the output interface 14 may include a modulator/demodulator (a modem) and/or a transmitter. In the source apparatus 11, the video source 13 may include, for example, the following source devices: a video capture apparatus (for example, a camera), an archive containing a previously captured video, a video feed-in interface for receiving a video from a video content provider, and/or a computer graphics system used to generate computer graphics data as a source video, or a combination thereof. In a possible implementation, if the video source 13 is a camera, the source apparatus 11 and the destination apparatus 12 may constitute a camera phone or a video phone. For example, the technologies described in this application may be applied to, for example, video decoding, and may be applied to wireless and/or wired applications.

The video encoder 20 may encode, capture, pre-capture, or calculate a generated video. The encoded video data may be directly transmitted to the destination apparatus 12 through the output interface 14 of the source apparatus 11. The encoded video data may also (or alternatively) be stored on the storage apparatus for later access by the destination apparatus 12 or another apparatus for decoding and/or playing.

The destination apparatus 12 includes the input interface 15, a video decoder 30, and a display apparatus 17. In some applications, the input interface 15 may include a receiver and/or a modem. The input interface 15 of the destination apparatus 12 receives the encoded video data through the link 16. The encoded video data transmitted or provided to the storage apparatus through the link 16 may include a variety of syntax elements generated by the video encoder 20 for the video decoder 30 to decode video data. These syntax elements may be included together with the encoded video data that is transmitted on the communications medium and that is stored on the storage medium or the file server.

The display apparatus 17 may be integrated with the destination apparatus 12, or may be located outside the destination apparatus 12. In some possible implementations, the destination apparatus 12 may include an integrated display apparatus, and may also be configured to connect to an interface of an external display apparatus. In another possible implementation, the destination apparatus 12 may be a display apparatus. Generally, the display apparatus 17 displays decoded video data to a user, and may include any of a variety of display apparatuses, for example, a liquid crystal display, a plasma display, an organic light-emitting diode display, or another type of display apparatus.

The video encoder 20 and the video decoder 30 may operate according to, for example, a next-generation video coding compression standard (H.266) that is currently being developed, and may comply with an H.266 test model (JEM). Alternatively, the video encoder 20 and the video decoder 30 may operate according to, for example, other dedicated or industrial standards such as the ITU-T H.265 standard or the ITU-T H.264 standard or extensions thereof, where the ITU-T H.265 standard is also referred to as the high efficiency video coding standard, and the ITU-T H.264 standard is also referred to as MPEG-4 Part 10, or advanced video coding (advanced video coding, AVC). However, the technologies in this application are not limited to any specific decoding standard. Other possible implementations of the video compression standard include MPEG-2 and ITU-TH.263.

Although not shown in FIG. 1, in some aspects, the video encoder 20 and the video decoder 30 may be integrated with an audio encoder and an audio decoder, respectively, and may include an appropriate multiplexer-demultiplexer (MUX-DEMUX) unit or other hardware and software to encode both audio and a video in a common data stream or separate data streams. If applicable, in some feasible implementations, the MUX-DEMUX unit may comply with the ITU H.223 multiplexer protocol or other protocols such as a user datagram protocol (UDP).

The video encoder 20 and the video decoder 30 may be separately implemented as any one of a variety of appropriate encoder circuits, for example, one or more microprocessors, a digital signal processor (digital signal processor, DSP), an application-specific integrated circuit (application-specific integrated circuit, ASIC), a field-programmable gate array (field-programmable gate array, FPGA), discrete logic, software, hardware, firmware, or any combination thereof. When some of the techniques are implemented as software, an apparatus may store an instruction for the software into an appropriate non-transitory computer-readable medium, and execute the instruction in a form of hardware by using one or more processors, to implement the techniques of this application. Each of the video encoder 20 and the video decoder 30 may be included in one or more encoders or decoders, and either the video encoder 20 or the video decoder 30 may be integrated as a part of a combined encoder/decoder (CODEC) in a corresponding apparatus.

The JCT-VC has developed the H.265 (HEVC) standard. HEVC standardization is based on an evolved model of a video decoding apparatus, where the model is referred to as an HEVC test model (HM). A latest H.265 standard document is available at http://www.itu.int/rec/T-REC-H.265. A latest version of the standard document is H.265 (12/16), and the standard document is incorporated herein by reference in its entirety. In the HM, it is assumed that the video decoding apparatus has several additional capabilities relative to an existing algorithm of ITU-TH.264/AVC.

JVET is committed to developing the H.266 standard. An H.266 standardization process is based on an evolved model of the video decoding apparatus, where the model is referred to as the H.266 test model. H.266 algorithm descriptions are available at http://phenix.int-evry.fr/j vet, and latest algorithm descriptions are included in JVET-F1001-v2. A document of the algorithm descriptions is incorporated herein by reference in its entirety. In addition, reference software for a JEM test model is available at https://jvet.hhi.fraunhofer.de/svn/svn_HMJEMSoftware/, and is also incorporated herein by reference in its entirety.

Generally, in descriptions of an HM working model, a video frame or picture may be split into a sequence of tree blocks including both luma and chroma samples or a sequence of largest coding units (largest coding unit, LCU), where the LCU is also referred to as CTU. A tree block has a function similar to that of a macroblock in the H.264 standard. A slice includes several consecutive tree blocks in a decoding order. The video frame or picture may be partitioned into one or more slices. Each tree block can be split into coding units based on a quadtree. For example, a tree block serving as a root node of the quadtree may be split into four child nodes, and each child node may also serve as a parent node and is split into four other child nodes. A final non-splittable child node serving as a leaf node of the quadtree includes a decoding node, for example, a decoded picture block. In syntactic data associated with a decoded bitstream, a maximum quantity of splits of a tree block and a minimum size of a decoding node may be defined.

A coding unit includes a decoding node, a prediction unit (prediction unit, PU), and a transform unit (transform unit, TU) associated with the decoding node. A size of the CU corresponds to a size of the decoding node, and a shape of the CU needs to square. The size of the CU may range from 8×8 pixels to a maximum of 64×64 pixels, or may be a larger tree block size. Each CU may include one or more PUs and one or more TUs. For example, syntactic data associated with the CU may describe partitioning of a CU into one or more PUs. A different partitioning mode may be used if the CU is encoded in a skip mode, a direct mode, an intra prediction mode, or an inter prediction mode. The PU obtained through partitioning may be in a non-square shape. For example, the syntactic data associated with the CU may also describe partitioning of a CU into one or more TUs based on the quadtree. The TU may be in a square or non-square shape.

The HEVC standard allows TU-based transform. Different CUs may include different TUs. A size of a TU is usually set based on a size of a PU within a given CU defined for a partitioned LCU. However, a case may not always be like this. The size of the TU is usually the same as or less than that of the PU. In some feasible implementations, a quadtree structure referred to as a "residual quadtree" (residual quadtree, RQT) may be used to divide a residual sample corresponding to a CU into smaller units. A leaf node of the RQT may be referred to as a TU. A pixel difference associated with the TU may be transformed to generate a transform coefficient, and the transform coefficient may be quantized.

Generally, a PU includes data related to a prediction process. For example, when the PU is encoded in an intra mode, the PU may include data describing an intra prediction mode of the PU. In another feasible implementation, when the PU is encoded in an inter mode, the PU may include data defining a motion vector for the PU. For example, the data defining the motion vector for the PU may describe a horizontal component of the motion vector, a vertical component of the motion vector, resolution (for example, ¼ pixel precision or ⅛ pixel precision) of the motion vector, a reference picture to which the motion vector points, and/or a reference picture list (for example, a list 0, a list 1, or a list C) of the motion vector.

Generally, transform and quantization processes are used for a TU. A given CU including one or more PUs may also include one or more TUs. After prediction, the video encoder 20 may calculate a residual value corresponding to a PU. The residual value includes a pixel difference. The pixel difference may be transformed into a transform coefficient, and the transform coefficient is quantized and is scanned by using a TU, to generate serialized transform coefficients for entropy decoding. In this application, the term "picture block" is usually used to represent a decoding node of a CU. In some specific applications, in this application, the term "picture block" may also be used to represent a tree block including a decoding node, a PU, and a TU, for example, an LCU or a CU.

The video encoder 20 encodes video data. The video data may include one or more pictures. The video encoder 20 may generate a bitstream, and the bitstream includes encoded information of video data in a form of a bit stream. The encoded information may include encoded picture data and associated data. The associated data may include a sequence parameter set (sequence paramater set, SPS), a picture parameter set (picture parameter set, PPS), and another syntax structure. The SPS may include a parameter applied to zero or a plurality of sequences. The SPS describes a higher-layer parameter of a general characteristic of a coded video sequence (coded video sequence, CVS), and the sequence parameter set (SPS) includes information required by all slices (slice) in the CVS. The PPS may include a parameter applied to zero or a plurality of pictures. The syntax structure is a set of zero or a plurality of syntax elements arranged in the bitstream in a specified order.

In a feasible implementation, HM supports prediction for a variety of PU sizes. Assuming that a size of a specific CU is 2 N×2 N, the HM supports intra prediction for a PU size of 2 N×2 N or N×N, and inter prediction for a symmetric PU size of 2 N×2 N, 2 N×N, N×2 N, or N×N. HM also supports asymmetric partitioning for inter prediction for PU sizes of 2 N×nU, 2 N×nD, nL×2 N, and nR×2 N. In asymmetric partitioning, the CU is not partitioned in a direction, and is partitioned into two parts in another direction, where one part accounts for 25% of the CU and the other part accounts for 75% of the CU. The part accounting for 25% of the CU is indicated by an indicator including "n" followed by "U (Up)", "D (Down)", "L (Left)" or "R (Right)". Therefore, for example, "2 N×nU" refers to a horizontally partitioned 2 N×2 N CU, with a 2 N×0.5 N PU at the top and a 2 N×1.5 N PU at the bottom.

In this application, "N×N" and "N by N" may be used interchangeably to indicate a pixel size of a picture block in a vertical dimension and a horizontal dimension, for example, 16×16 pixels or 16 by 16 pixels. Usually, a 16×16 block has 16 pixels in a vertical direction (y=16) and 16 pixels in a horizontal direction (x=16). Similarly, an N×N block usually has N pixels in a vertical direction and N pixels in a horizontal direction, where N is a nonnegative integer value. Pixels in a block may be arranged in rows and columns. In addition, in a block, a quantity of pixels in the horizontal direction and a quantity of pixels in the vertical direction may not be necessarily the same. For example, a block may include N×M pixels, where M is not necessarily equal to N.

After decoding a PU in a CU in an intra or inter prediction mode, the video encoder 20 may calculate residual data of a TU in the CU. The PU may include pixel data in a space domain (which is also referred to as a pixel domain), and the TU may include a coefficient in a transform domain obtained after transform (for example, discrete cosine transform (discrete cosine transform, DCT), integer transform, wavelet transform, or other conceptually similar transform) is applied to residual video data. The residual data may correspond to a pixel difference between a pixel of an unencoded picture and a predictor corresponding to the PU. The video encoder 20 may generate a TU including residual data of the CU, and then transform the TU to generate a transform coefficient of the CU.

The JEM model further improves a video picture coding structure. Specifically, a block coding structure referred to as a "quadtree plus binary tree" (QTBT) structure is introduced. Without using concepts such as CU, PU, and TU in HEVC, the QTBT structure supports more flexible CU split shapes. A CU may be in a square shape or rectangular shape. Quadtree partitioning is first performed on a CTU, and binary tree partitioning is further performed on a leaf node of the quadtree. In addition, there are two binary tree partitioning modes: symmetric horizontal partitioning and symmetric vertical partitioning. A leaf node of a binary tree is referred to as a CU. The CU in the JEM model is further split neither in a prediction process nor in a transform process. In other words, the CU, the PU, and the TU in the JEM model have a same block size. In the existing JEM model, a maximum CTU size is 256×256 luma pixels.

Figure 2A:
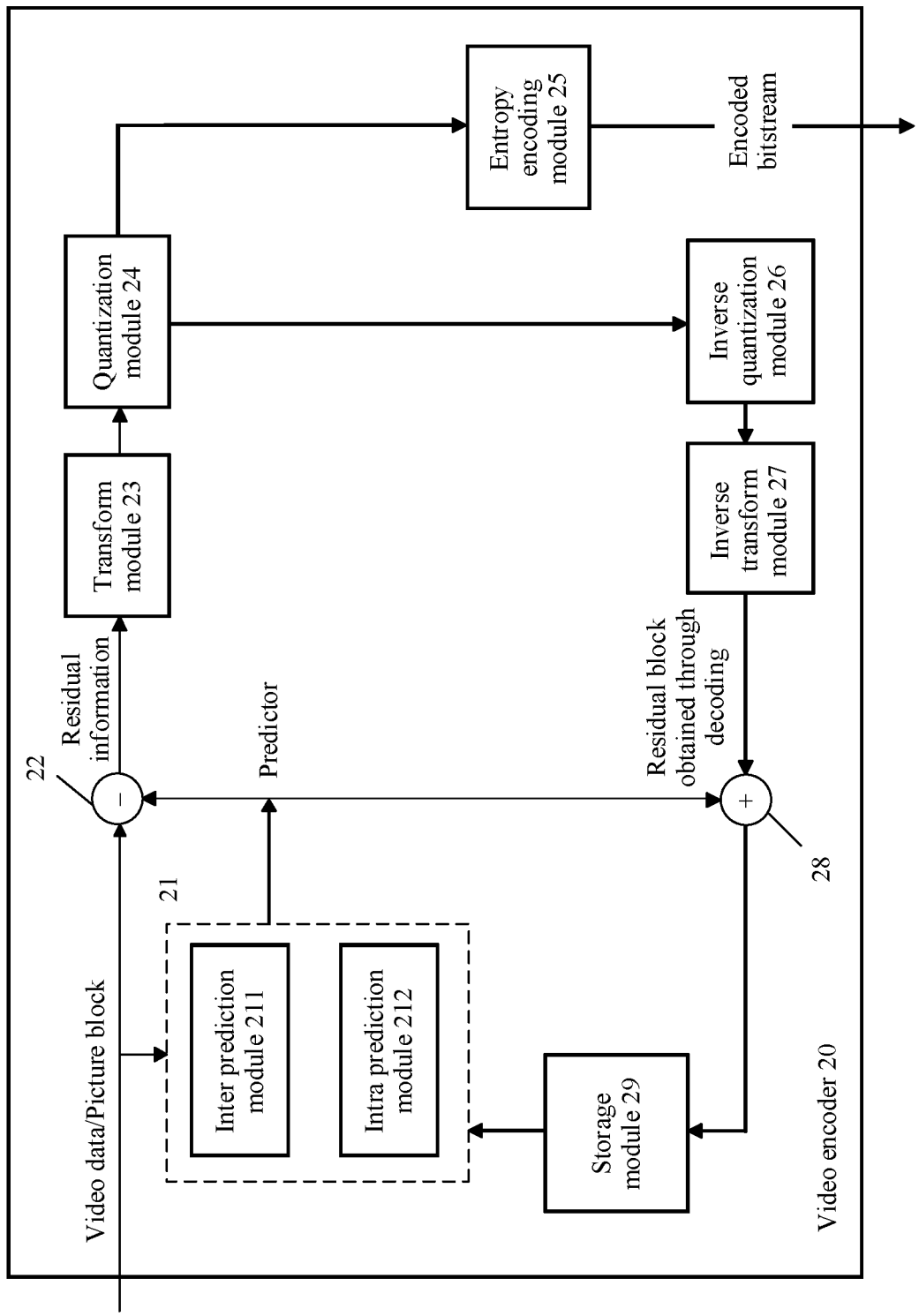
FIG. 2A is a block diagram of a video encoder in an implementation described in an embodiment of this application.

FIG. 2A is a schematic block diagram of a video encoder 20 according to an embodiment of this application.

As shown in FIG. 2A, the video encoder 20 may include a prediction module 21, a summator 22, a transform module 23, a quantization module 24, and an entropy encoding module 25. In an example, the prediction module 21 may include an inter prediction module 211 and an intra prediction module 212. An internal structure of the prediction module 21 is not limited in this embodiment of this application. Optionally, the video encoder 20 with a hybrid architecture may also include an inverse quantization module 26, an inverse transform module 27, and a summator 28.

In a feasible implementation of FIG. 2A, the video encoder 20 may further include a storage module 29. It should be understood that the storage module 29 may alternatively be disposed outside the video encoder 20.

In another feasible implementation, the video encoder 20 may further include a filter (which is not shown in FIG. 2A) to filter a boundary of a picture block, so as to eliminate an artifact from a reconstructed video picture. When necessary, the filter usually filters an output from the summator 28.

Optionally, the video encoder 20 may further include a partitioning unit (which is not shown in FIG. 2A). The video encoder 20 receives video data, and the partitioning unit partitions the video data into picture blocks. Such partitioning may further include partitioning into slices, picture blocks, or other larger units, and (for example) partitioning into picture blocks that is performed based on quadtree structures of an LCU and a CU. The video encoder 20 describes, for example, a component for encoding a picture block in a to-be-encoded video slice. A slice may usually be split into a plurality of picture blocks (and may be split into a set of picture blocks). Slice types include I (which is mainly used for intra-picture encoding), P (which is used for inter forward reference prediction picture encoding), and B (which is used for inter bidirectional reference prediction picture encoding).

The prediction module 21 is configured to perform intra or inter prediction on a picture block that needs to be currently processed, to obtain a predictor (which may be referred to as predicted information in this application) of the current block. In this embodiment of this application, the picture block that needs to be currently processed may be a to-be-processed block for short, may be a current picture block for short, or may be the current block for short. Alternatively, the picture block that needs to be currently processed in an encoding phase may be referred to as a current coding block (encoding block) for short, and the picture block that needs to be currently processed in a decoding phase may be referred to as a current coding block (decoding block).

Figure 2B:
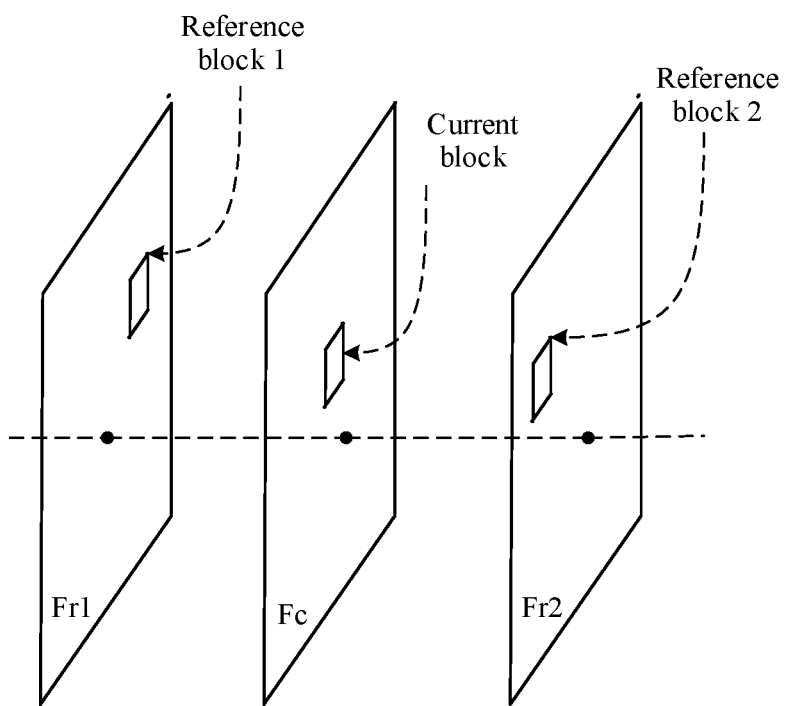
FIG. 2B is a schematic diagram of inter prediction in an implementation described in an embodiment of this application.

Specifically, the inter prediction module 211 included in the prediction module 21 performs inter prediction on the current block, to obtain an inter predictor. The intra prediction module 212 performs intra prediction on the current block, to obtain an intra predictor. The inter prediction module 211 searches a reconstructed picture for a matched reference block for a current block in a current picture; uses a sample value of a sample in the reference block as predicted information or a predictor of a sample value of a sample in the current block (the following does not distinguish information from a value), where this process is referred to as motion estimation (Motion estimation, ME) (as shown in FIG. 2B); and transmits motion information of the current block.

It should be noted that the motion information of the picture block includes indication information of a prediction direction (which is usually forward prediction, backward prediction, or bidirectional prediction), one or two motion vectors (Motion vector, MV) to which the reference block points, and indication information (which is often denoted as a reference picture index, Reference index) of a picture in which the reference block is located.

Forward prediction means selecting a reference picture from a forward reference picture set, to obtain a reference block for the current block. Backward prediction means selecting a reference picture from a backward reference picture set, to obtain a reference block for the current block. Bidirectional prediction means selecting a reference picture from a forward reference picture set and a reference picture from a backward reference picture set, to obtain reference blocks. When a bidirectional prediction method is used, there are two reference blocks for the current block. Each reference block needs to be indicated by using a motion vector and a reference picture index, and then the predictor of the sample value of the sample in the current block is determined based on pixel values of samples in the two reference blocks.

In the motion estimation process, a plurality of reference blocks in the reference picture needs to be tried for the current block, and which one or more specific reference blocks are finally used for prediction is determined through rate-distortion optimization (Rate-distortion optimization, RDO) or by using another method.

After the prediction module 21 generates the predictor of the current block through inter prediction or intra prediction, the video encoder 20 subtracts the predictor from the current block, to generate residual information. The transform module 23 is configured to transform the residual information. The transform module 23 applies a transform such as discrete cosine transform (discrete cosine transformation, DCT) or a conceptually similar transform (for example, discrete sine transform DST) to transform the residual information into a residual transform coefficient. The transform module 23 may send the obtained residual transform coefficient to the quantization module 24. The quantization module 24 quantizes the residual transform coefficient to further reduce a code rate. In some feasible implementations, the quantization module 24 may continue to scan a matrix including the quantized transform coefficient. Alternatively, the entropy encoding module 25 may perform scanning.

After quantization, the entropy encoding module 25 may perform entropy encoding on the quantized residual transform coefficient to obtain a bitstream. For example, the entropy encoding module 25 may perform context-adaptive variable-length decoding (CAVLC), context-based adaptive binary arithmetic decoding (CABAC), syntax-based context-adaptive binary arithmetic decoding (SBAC), probability interval partitioning entropy (PIPE) decoding, or another entropy encoding methodology or technology. After the entropy encoding module 25 performs entropy encoding, an encoded bitstream may be transmitted to the video decoder 30, or archived for future transmission or retrieval by the video decoder 30.

The inverse quantization module 26 and the inverse transform module 27 perform inverse quantization and inverse transform respectively, to reconstruct a residual block in a pixel domain as a reference block in a reference picture. The summator 28 adds residual information obtained through reconstruction and the predictor generated by the prediction module 21, to generate a reconstructed block, and uses the reconstructed block as the reference block for storage in the storage module 29. The reference blocks may be used by the prediction module 21 to perform inter or intra prediction on blocks in a subsequent video frame or picture.

It should be understood that another structural variant of the video encoder 20 can be used to encode a video stream. For example, for some picture blocks or picture frames, the video encoder 20 may directly quantize the residual information without processing by the transform module 23 or processing by the inverse transform module 27. Alternatively, for some picture blocks or picture frames, the video encoder 20 does not generate residual information, and correspondingly, processing by the transform module 23, the quantization module 24, the inverse quantization module 26, and the inverse transform module 27 is not required. Alternatively, the video encoder 20 may directly store a reconstructed picture block as a reference block without processing by a filter unit. Alternatively, the quantization module 24 and the inverse quantization module 26 in the video encoder 20 may be combined together. Alternatively, the transform module 23 and the inverse transform module 27 in the video encoder 20 may be combined together. Alternatively, the summator 22 and the summator 28 may be combined together.

Figure 2C:
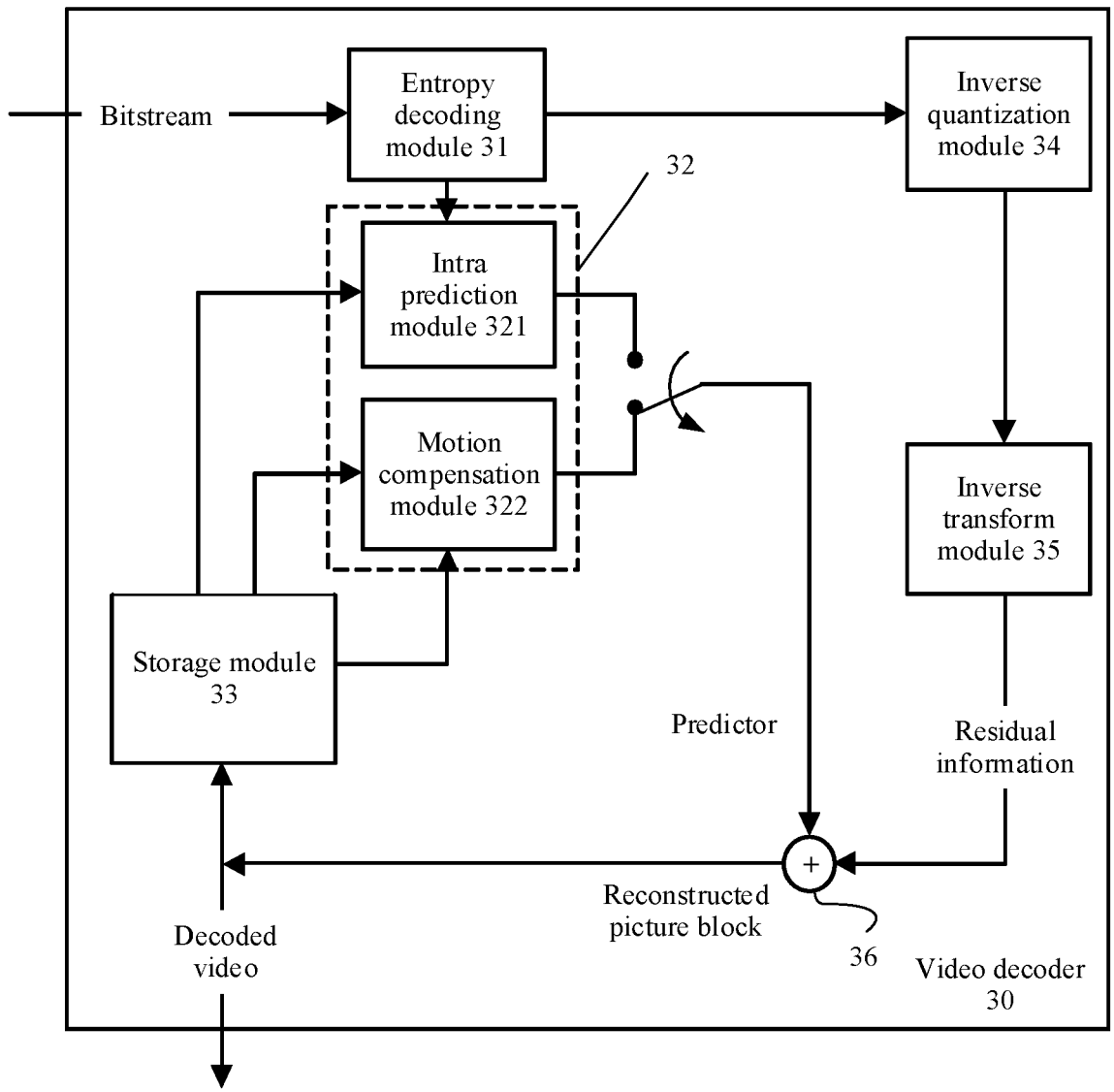
FIG. 2C is a block diagram of a video decoder in an implementation described in an embodiment of this application.

FIG. 2C is a schematic block diagram of a video decoder 30 according to an embodiment of this application.

As shown in FIG. 2C, the video decoder 30 may include an entropy decoding module 31, a prediction module 32, an inverse quantization module 34, an inverse transform module 35, and a reconstruction module 36. In an example, the prediction module 32 may include a motion compensation module 322 and an intra prediction module 321. This is not limited in this embodiment of this application.

In a feasible implementation, the video decoder 30 may further include a storage module 33. It should be understood that the storage module 33 may alternatively be disposed outside the video decoder 30. In some feasible implementations, the video decoder 30 may perform an example decoding procedure inverse to the encoding procedure of the video encoder 20 in FIG. 2A.

In the decoding process, the video decoder 30 receives a bitstream from the video encoder 20. The entropy decoding module 31, the inverse quantization module 34, and the inverse transform module 35 successively perform respectively entropy decoding, inverse quantization, and inverse transform on the bitstream received by the video decoder 30, to obtain residual information. Whether intra prediction or inter prediction is performed on the current block is determined based on the bitstream. If intra prediction is performed, the intra prediction module 321 in the prediction module 32 constructs predicted information based on a used intra prediction method and pixel values of reference pixels of reconstructed blocks around the current block. If inter prediction is performed, the motion compensation module 322 needs to obtain motion information through parsing, determines a reference block from a reconstructed picture block based on the motion information parsed, and uses a sample value of a sample in the reference block as predicted information (where this process is referred to as motion compensation (motion compensation, MC)). The reconstruction module 36 can obtain reconstruction information by using the predicted information and the residual information.

As noted in the foregoing, this application relates to, for example, inter decoding. Therefore, specific technologies of this application may be executed by the motion compensation module 322. In other feasible implementations, one or more other units of the video decoder 30 may additionally or alternatively be responsible for executing the technologies of this application.

The following first describes concepts in this application.
(1) Inter Prediction Mode In HEVC, two inter prediction modes are used: an advanced motion vector prediction (advanced motion vector prediction, AMVP) mode and a merge (merge) mode.

In the AMVP mode, spatial or temporal neighboring encoded blocks (denoted as neighboring blocks) of a current block are first traversed, a candidate motion vector list (which may also be referred to as a motion information candidate list) is constructed based on motion information of each neighboring block, an optimal motion vector is determined from the candidate motion vector list by using rate-distortion costs, and candidate motion information with a minimum rate-distortion cost is used as a motion vector predictor (motion vector predictor, MVP) of the current block. Both locations of the neighboring blocks and a traversal order the neighboring blocks are predefined. The rate-distortion cost is calculated according to formula (1), where J represents a rate-distortion cost (RD Cost), SAD is a sum of absolute differences (sum of absolute differences, SAD) between an original pixel value and a predicted pixel value obtained through motion estimation by using the candidate motion vector predictor, R represents a bit rate, and represents a Lagrange multiplier. An encoder side transfers an index value of the selected motion vector predictor in the candidate motion vector list and a reference picture index value to a decoder side. Further, motion search is performed in a neighborhood with the MVP as a center, to obtain an actual motion vector of the current block. The encoder side transfers a difference (motion vector difference) between the MVP and an actual motion vector to the decoder side.

$$J = SAD + \lambda R \quad (1)$$

Figure 3:
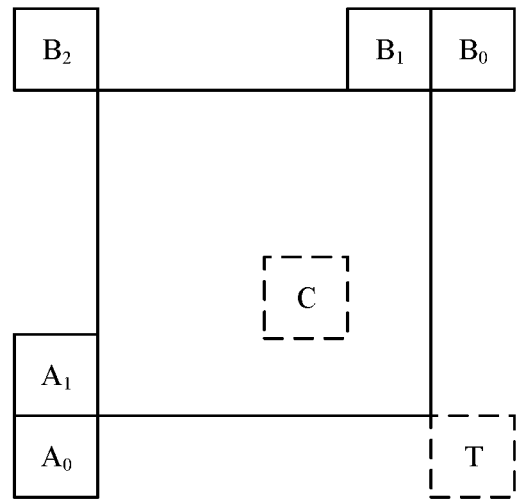
FIG. 3 is a schematic diagram of candidate locations of motion information in an implementation described in an embodiment of this application.

In the merge mode, a candidate motion vector list is first constructed by using motion information of spatial or temporal neighboring encoded block of a current block, then optimal motion information is determined from the candidate motion vector list by calculating a rate-distortion cost and is used as motion information of the current block, and then an index value (which is denoted as a merge index, same hereinafter) of a location of the optimal motion information in the candidate motion vector list is transferred to a decoder side. FIG. 3 shows spatial and temporal candidate motion information of the current block. The spatial candidate motion information comes from five spatial neighboring blocks (A0, A1, B0, B1, and B2). If the neighboring blocks are unavailable (there is no neighboring block, the neighboring blocks are not encoded, or a prediction mode used by the neighboring blocks is not the inter prediction mode), motion information of the neighboring blocks is not added to the candidate motion vector list. The temporal candidate motion information of the current block is obtained by scaling an MV of a block in a corresponding location in a reference frame based on picture order counts (picture order count, POC) of a reference frame and a current frame. Whether a block in a location T in the reference frame is available is first determined. If the block is unavailable, a block in a location C is selected.

Similar to the AMVP mode, in the merge mode, both locations of the neighboring blocks and a traversal order of the neighboring blocks are also predefined. In addition, the locations of the neighboring blocks and the transversal order of the neighboring blocks may differ in different modes.

It can be learned that a candidate motion vector list needs to be maintained in both the AMVP mode and the merge mode. Before new motion information is added to the candidate list each time, whether the same motion information already exists in the list is first checked. If the same motion information exists in the list, the motion information is not added to the list. This check process is referred to as pruning of the candidate motion vector list. The list is pruned to avoid the same motion information in the list, thereby avoiding redundant rate-distortion cost calculation.

In inter prediction in HEVC, same motion information is used for all pixels in a coding block, and then motion compensation is performed based on the motion information, to obtain predictors of the pixels of the coding block. In the coding block, however, not all pixels have same motion features. Using the same motion information may result in inaccurate motion compensation prediction and more residual information.

In existing video coding standards, block matching motion estimation based on a translational motion model is used, and it is assumed that motion of all pixels in a block is consistent. However, in the real world, there are a variety of motion. Many objects are in non-translational motion, for example, a rotating object, a roller coaster spinning in different directions, a display of fireworks, and some stunts in movies, especially a moving object in a UGC scenario. For these moving objects, if a block motion compensation technology based on a translational motion model in the existing coding standards is used for coding, coding efficiency may be greatly affected. In this case, a non-translational motion model, for example, an affine motion model, is introduced to further improve the coding efficiency.

On this basis, in terms of different motion models, the AMVP mode may be classified into a translational model-based AMVP mode and a non-translational model-based AMVP mode, and the merge mode may be classified into a translational model-based merge mode and a non-translational motion model-based merge mode.

(2) Non-Translational Motion Model

Non-translational motion model prediction means that an encoder/decoder side derives motion information of each motion compensation subunit in a current block by using a same motion model, and performs motion compensation based on the motion information of the motion compensation subunit to obtain a prediction block, thereby improving prediction efficiency. Common non-translational motion models include a 4-parameter affine motion model or a 6-parameter affine motion model.

The motion compensation subunit in this embodiment of this application may be a sample or a pixel block that has a size of $N_1 \times N_2$ and that is obtained through partitioning according to a specific method, where both $N_1$ and $N_2$ are positive integers, and $N_1$ may be equal to $N_2$, or may be not equal to $N_2$.

The 4-parameter affine motion model is expressed as formula (2):

$$\begin{cases} vx = a_1 + a_3 x + a_4 y \\ vy = a_2 - a_4 x + a_3 y \end{cases} \quad (2)$$

The 4-parameter affine motion model may be represented by using motion vectors of two samples and coordinates of the two samples relative to the top-left sample of the current block. A sample used for representing a motion model parameter is referred to as a control point. If the top-left sample (0, 0) and the top-right sample (W, 0) are used as control points, motion vectors (vx0, vy0) and (vx1, vy1) of the control points of the top-left sample and the top-right sample of the current block are first determined, and then motion information of each motion compensation subunit in the current block is obtained according to a formula (3), where (x, y) are coordinates of the motion compensation subunit relative to the top-left sample of the current block, and W is the width of the current block.

$$\begin{cases} vx = \dfrac{vx_1 - vx_0}{W} x - \dfrac{vy_1 - vy_0}{W} y + vx_0 \\ vy = \dfrac{vy_1 - vy_0}{W} x + \dfrac{vx_1 - vx_0}{W} y + vy_0 \end{cases} \quad (3)$$

The 6-parameter affine motion model is expressed as formula (4):

$$\begin{cases} vx = a_1 + a_3 x + a_4 y \\ vy = a_2 + a_5 x + a_6 y \end{cases} \quad (4)$$

The 6-parameter affine motion model may be represented by using motion vectors of three samples and coordinates of the three samples relative to the top-left sample of the current block. If the top-left sample (0, 0), the top-right sample (W, 0), and the bottom-left sample (0, H) are used as control points, motion vectors of the top-left control point, the top-right control point, and the bottom-left control point of the current block are first determined as (vx0, vy0), (vx1, vy1), and (vx2, vy2), respectively. Then motion information of each motion compensation subunit in the current block is obtained according to formula (5). (x, y) are coordinates of the motion compensation subunit relative to the top-left sample of the current block, and W and H are respectively the width and the height of the current block.

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases} \quad (5)$$

A coding block predicted by using an affine motion model is referred to as an affine coding block.

Motion information of a control point of the affine coding block may usually be obtained by using an affine motion model-based advanced motion vector prediction (Advanced Motion Vector Prediction, AMVP) mode or an affine motion model-based merge (Merge) mode.

The motion information of the control point of the current encoding block may be obtained by using a method for predicting an inherited control point motion vector or a constructed control point motion vector.

(3) Method for Predicting an Inherited Control Point Motion Vector

The method for predicting the inherited control point motion vector is determining a candidate control point motion vector of a current block by using a motion model of a neighboring encoded affine coding block.

Figure 4:
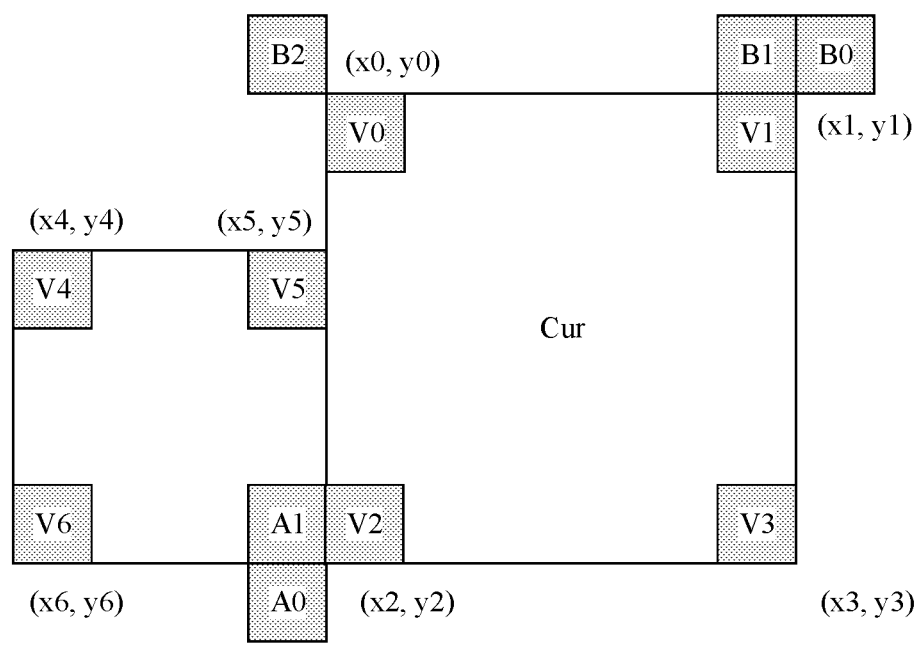
FIG. 4 is a schematic diagram of prediction of an inherited control point motion vector in an implementation described in an embodiment of this application.

A current block shown in FIG. 4 is used as an example. Blocks in neighboring locations around the current block are traversed in a specified order, for example, an order A1→B1→B0→A0→B2, to find affine coding blocks in which the blocks in the neighboring locations of the current block are located, and obtain control point motion information of the affine coding blocks. Further, control point motion vectors (which are used in the merge mode) or a control point motion vector predictor (which is used in the AMVP mode) of the current block is further derived by using motion models constructed by using the control point motion information of the affine coding blocks. The order A1→B1→B0→A0→B2 is merely used as an example. An order of another combination is also applicable to this application. In addition, the blocks in the neighboring locations are not limited to A1, B1, B0, A0, and B2.

A block in a neighboring location may be a sample or a pixel block of a preset size obtained through partitioning according to a specific method. For example, the pixel block may be a 4×4 pixel block, a 4×2 pixel block, or a pixel block of another size, and is not limited.

The following describes a determining process by using A1 as an example, and another case is similar thereto.

As shown in FIG. 4, if a coding block in which A1 is located is a 4-parameter affine coding block, a motion vector (vx4, vy4) of the top-left sample (x4, y4) of the affine coding block and a motion vector (vx5, vy5) of the top-right sample (x5, y5) of the affine coding block are obtained. A motion vector (vx0, vy0) of the top-left sample (x0, y0) of the current affine coding block is calculated according to formula (6), and a motion vector (vx1, vy1) of the top-right sample (x1, y1) of the current affine coding block is calculated according to formula (7).

$$\begin{cases} vx_0 = vx_4 + \dfrac{(vx_5 - vx_4)}{x_5 - x_4} \times (x_0 - x_4) - \dfrac{(vy_5 - vy_4)}{x_5 - x_4} \times (y_0 - y_4) \\ vy_0 = vy_4 + \dfrac{(vy_5 - vy_4)}{x_5 - x_4} \times (x_0 - x_4) + \dfrac{(vx_5 - vx_4)}{x_5 - x_4} \times (y_0 - y_4) \end{cases} \quad (6)$$

-continued $$\begin{cases} vx_1 = vx_4 + \frac{(vx_5 - vx_4)}{x_5 - x_4} \times (x_1 - x_4) - \frac{(vy_5 - vy_4)}{x_5 - x_4} \times (y_1 - y_4) \\ vy_1 = vy_4 + \frac{(vy_5 - vy_4)}{x_5 - x_4} \times (x_1 - x_4) + \frac{(vx_5 - vx_4)}{x_5 - x_4} \times (y_1 - y_4) \end{cases} \quad (7)$$

A combination of the motion vector (vx0, vy0) of the top-left sample (x0, y0) of the current block and the motion vector (vx1, vy1) of the top-right sample (x1, y1) of the current block that are obtained based on the affine coding block in which A1 is located is the candidate control point motion vector of the current block.

If a coding block in which A1 is located is a 6-parameter affine coding block, a motion vector (vx4, vy4) of the top-left sample (x4, y4) of the affine coding block, a motion vector (vx5, vy5) of the top-right sample (x5, y5) of the affine coding block, and a motion vector (vx6, vy6) of the bottom-left sample (x6, y6) of the affine coding block are obtained. A motion vector (vx0, vy0) of the top-left sample (x0, y0) of the current block is calculated according to formula (8), a motion vector (vx1, vy1) of the top-right sample (x1, y1) of the current block is calculated according to formula (9), and a motion vector (vx2, vy2) of the bottom-left sample (x2, y2) of the current block is calculated according to formula (10).

$$\begin{cases} vx_0 = vx_4 + \frac{(vx_5 - vx_4)}{x_5 - x_4} \times (x_0 - x_4) + \frac{(vx_6 - vx_4)}{y_6 - y_4} \times (y_0 - y_4) \\ vy_0 = vy_4 + \frac{(vy_5 - vy_4)}{x_5 - x_4} \times (x_0 - x_4) + \frac{(vy_6 - vy_4)}{y_6 - y_4} \times (y_0 - y_4) \end{cases} \quad (8)$$

$$\begin{cases} vx_1 = vx_4 + \frac{(vx_5 - vx_4)}{x_5 - x_4} \times (x_1 - x_4) + \frac{(vx_6 - vx_4)}{y_6 - y_4} \times (y_1 - y_4) \\ vy_1 = vy_4 + \frac{(vy_5 - vy_4)}{x_5 - x_4} \times (x_1 - x_4) + \frac{(vy_6 - vy_4)}{y_6 - y_4} \times (y_1 - y_4) \end{cases} \quad (9)$$

$$\begin{cases} vx_2 = vx_4 + \frac{(vx_5 - vx_4)}{x_5 - x_4} \times (x_2 - x_4) + \frac{(vx_6 - vx_4)}{y_6 - y_4} \times (y_2 - y_4) \\ vy_2 = vy_4 + \frac{(vy_5 - vy_4)}{x_5 - x_4} \times (x_2 - x_4) + \frac{(vy_6 - vy_4)}{y_6 - y_4} \times (y_2 - y_4) \end{cases} \quad (10)$$

A combination of the motion vector (vx0, vy0) of the top-left sample (x0, y0) of the current block, the motion vector (vx1, vy1) of the top-right sample (x1, y1) of the current block, and the motion vector (vx2, vy2) of the bottom-left sample (x2, y2) of the current block that are obtained based on the affine coding block in which A1 is located is the candidate control point motion vector of the current block.

It should be noted that other motion models, candidate locations, and search and traversal orders are also applicable to this application. Details are not described in this embodiment of this application.

It should be noted that methods in which other control points are used to represent motion models of neighboring and current encoding blocks are also applicable to this application. Details are not described herein.

(4) Method 1 for Predicting Constructed Control Point Motion Vectors (Constructed Control Point Motion Vectors)

The method for predicting the constructed control point motion vector is combining motion vectors of neighboring encoded blocks around a control point of a current block to serve as a control point motion vector of a current affine coding block, without considering whether the neighboring encoded blocks are affine coding blocks.

Figure 5A:
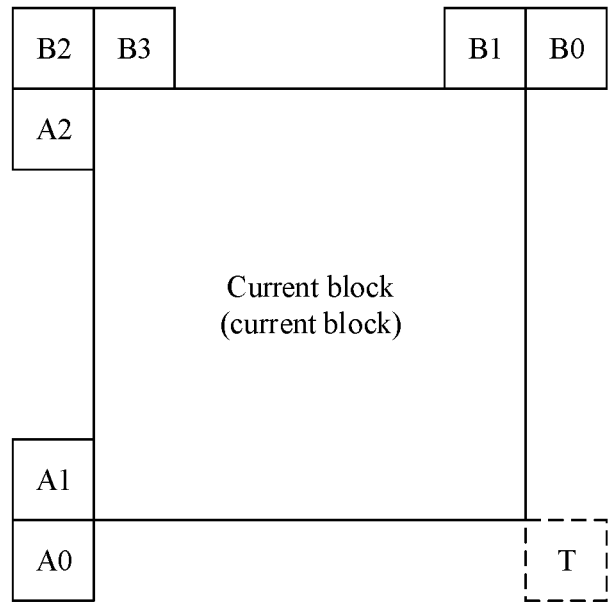
FIG. 5A is a schematic diagram of predicting a constructed control point motion vector in an implementation described in an embodiment of this application.

Motion vectors of the top-left sample and the top-right sample of the current block are determined by using motion information of the neighboring encoded blocks around the current encoding block. FIG. 5A is used as an example to describe the method for predicting the constructed control point motion vector. It should be noted that FIG. 5A is merely an example.

As shown in FIG. 5A, motion vectors of neighboring encoded blocks A2, B2, and B3 of the top-left sample are used as candidate motion vectors for a motion vector of the top-left sample of a current block, and motion vectors of neighboring encoded blocks B1 and B0 of the top-right sample are used as candidate motion vectors for a motion vector of the top-right sample of the current block. The candidate motion vectors of the top-left sample and the candidate motion vectors of the top-right sample are combined to constitute a plurality of 2-tuples. Motion vectors of two encoded blocks included in a 2-tuple may be used as candidate control point motion vectors of the current block, as shown in formula (11A):

$$\{v_{A2}, v_{B1}\}, \{v_{A2}, v_{B0}\}, \{v_{B2}, v_{B1}\}, \{v_{B2}, v_{B0}\}, \{v_{B3}, v_{B1}\}, \{v_{B3}, v^{B0}\} \quad (11A), \text{where}$$

$v_{A2}$ represents a motion vector of A2, $v_{B1}$ represents a motion vector of B1, $v_{B0}$ represents a motion vector of B0, $v_{B2}$ represents a motion vector of B2, and $v_{B3}$ represents a motion vector of B3.

As shown in FIG. 5A, motion vectors of neighboring encoded blocks A2, B2, and B3 of the top-left sample are used as candidate motion vectors for a motion vector of the top-left sample of a current block, motion vectors of neighboring encoded blocks B1 and B0 of the top-right sample are used as candidate motion vectors for a motion vector of the top-right sample of the current block, and motion vectors of neighboring encoded blocks A0 and A1 of the bottom-left sample are used as candidate motion vectors for a motion vector of the bottom-left sample of the current block. The candidate motion vectors of the top-left sample, the candidate motion vectors of the top-right sample, and the candidate motion vectors of the bottom-left sample are combined to constitute 3-tuples. Motion vectors of three encoded blocks included in a 3-tuple may be used as candidate control point motion vectors of the current block, as shown in formula (11B) and formula (11C):

$$\{v_{A2}, v_{B1}, v_{A0}\}, \{v_{A2}, v_{B0}, v_{A0}\}, \{v_{B2}, v_{B1}, v_{A0}\}, \{v_{B2}, v_{B0}, v_{A0}\}, \{v_{B3}, v_{B1}, v_{A0}\}, \{v_{B3}, v_{B0}, v_{A0}\} \quad (11B)$$

$$\{v_{A2}, v_{B1}, v_{A1}\}, \{v_{A2}, v_{B0}, v_{A1}\}, \{v_{B2}, v_{B1}, v_{A1}\}, \{v_{B2}, v_{B0}, v_{A1}\}, \{v_{B3}, v_{B1}, v_{A1}\}, \{v_{B3}, v_{B0}, v_{A1}\} \quad (11C), \text{where}$$

$v_{A2}$ represents a motion vector of A2, $v_{B1}$ represents a motion vector of B1, $v_{B0}$ represents a motion vector of B0, $v_{B2}$ represents a motion vector of B2, $v_{B3}$ represents a motion vector of B3, $v_{A0}$ represents a motion vector of A0, and $v_{A1}$ represents a motion vector of A1.

It should be noted that other methods for combining control point motion vectors are also applicable to this application. Details are not described herein.

It should be noted that methods in which other control points are used to represent motion models of neighboring and current encoding blocks are also applicable to this application. Details are not described herein.

Figure 5B:
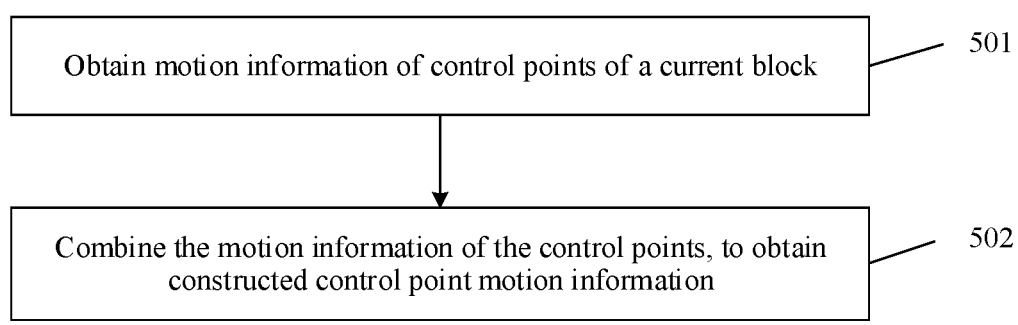
FIG. 5B is a schematic flowchart of combining control point motion information to obtain constructed control point motion information in an implementation described in an embodiment of this application.

(5) Method 2 for Predicting Constructed Control Point Motion Vectors (Constructed Control Point Motion Vectors), as Shown in FIG. 5B.

Step 501: Obtain motion information of control points of a current block.

For example, in FIG. 5A, CPk (k=1, 2, 3, 4) represents a $k^{th}$ control point. A0, A1, A2, B0, B1, B2, and B3 are spatial neighboring locations of the current block, and are used to predict CP1, CP2, or CP3. T is a temporal neighboring location of the current block, and is used to predict CP4.

It is assumed that coordinates of CP1, CP2, CP3, and CP4 are (0, 0), (W, 0), (H, 0), and (W, H), respectively, where W and H represent the width and the height of the current block.

Motion information of each control point is obtained in the following order:

(1) For CP1, a check order is B2→A2→B3. If B2 is available, motion information of B2 is used. Otherwise, A2 and B3 are checked. If motion information of all the three locations is unavailable, motion information of CP1 cannot be obtained.

(2) For CP2, a check order is B0→B1. If B0 is available, motion information of B0 is used for CP2. Otherwise, B1 is checked. If motion information of both the locations is unavailable, motion information of CP2 cannot be obtained.

(3) For CP3, a check order is A0→A1.

(4) For CP4, motion information of T is used.

Herein, that X is available mean that a block including an X (X is A0, A1, A2, B0, B1, B2, B3, or T) location has been encoded and an inter prediction mode is used. Otherwise, the X location is unavailable.

It should be noted that other methods for obtaining the motion information of the control points are also applicable to this application. Details are not described herein.

Step 502: Combine the motion information of the control points, to obtain constructed control point motion information.

Motion information of two control points is combined to constitute a 2-tuple, to construct a 4-parameter affine motion model. The two control points may be combined as follows: {CP1, CP4}, {CP2, CP3}, {CP1, CP2}, {CP2, CP4}, {CP1, CP3}, or {CP3, CP4}. For example, a 4-parameter affine motion model constructed by using a 2-tuple that is based on motion information (for example, 2 MVs) of the control points CP1 and CP2 may be denoted as Affine (CP1, CP2).

Motion information of three control points is combined to constitute a 3-tuple, to construct a 6-parameter affine motion model. The three control points may be combined as follows: {CP1, CP2, CP4}, {CP1, CP2, CP3}, {CP2, CP3, CP4}, or {CP1, CP3, CP4}. For example, a 6-parameter affine motion model constructed by using a 3-tuple that is based on motion information (for example, 3 MVs) of the control points CP1, CP2, and CP3 may be denoted as Affine (CP1, CP2, CP3).

Motion information of four control points is combined to constitute a 4-tuple, to construct an 8-parameter bilinear motion model. An 8-parameter bilinear model constructed by using a 4-tuple including motion information (for example, 4 MVs) of the control points CP1, CP2, CP3, and CP4 is denoted as Bilinear (CP1, CP2, CP3, CP4).

In this embodiment of this application, for ease of description, a combination of motion information of two control points (or two encoded blocks) is referred to as a 2-tuple for short, a combination of motion information of three control points (or three encoded blocks) is referred to as a 3-tuple for short, and a combination of motion information of four control points (or four encoded blocks) is referred to as a 4-tuple for short.

These models are traversed in a preset order. If motion information of a specific control point corresponding to a combined model is unavailable, it is considered that the model is unavailable. Otherwise, a reference picture index of the model is determined, and a motion vector of the control point is scaled. If motion information of all control points obtained after scaling is consistent, the model is invalid. If all of motion information of control points controlling the model is available, and the model is valid, the motion information of the control points for constructing the model is added to a motion information candidate list.

A control point motion vector scaling method is shown in formula (12):

$$MV_s = \frac{CurPoc - DesPoc}{CurPoc - SrcPoc} \times MV, \qquad (12)$$

where

CurPoc represents a POC number of a current frame, DesPoc represents a POC number of a reference frame of a current block, SrcPoc represents a POC number of a reference frame of a control point, MV s represents a motion vector obtained after scaling, and MV represents a motion vector of a control point.

It should be noted that a combination of different control points may be converted into control points in a same location.

For example, a 4-parameter affine motion model obtained by using a combination {CP1, CP4}, {CP2, CP3}, {CP2, CP4}, {CP1, CP3}, or {CP3, CP4} is converted into {CP1, CP2} or {CP1, CP2, CP3}. A conversion method is: substituting motion vectors of the control points and coordinate information of the control points into formula (2), to obtain a model parameter; and then substituting coordinate information of {CP1, CP2} into formula (3), to obtain motion vectors of CP1 and CP2.

More directly, conversion may be performed according to formulas (13) to (21). W represents the width of the current block. H represents the height of the current block. In formulas (13) to (21), $(vx_0, vy_0)$ represents a motion vector of CP1, $(vx_1, vy_1)$ represents a motion vector of CP2, $(vx_2, vy_2)$ represents a motion vector of CP3, and $(vx_3, vy_3)$ represents a motion vector of CP4.

{CP1, CP2} may be converted into {CP1, CP2, CP3} by using formula (13). In other words, the motion vector of CP3 in {CP1, CP2, CP3} may be determined by using formula (13):

$$\begin{cases} vx_2 = -\dfrac{vy_1 - vy_0}{W}H + vx_0 \\ vy_2 = +\dfrac{vx_1 - vx_0}{W}H + vy_0 \end{cases} \qquad (13)$$

{CP1, CP3} may be converted into {CP1, CP2} or {CP1, CP2, CP3} by using formula (14):

$$\begin{cases} vx_1 = +\dfrac{vy_2 - vy_0}{H}W + vx_0 \\ vy_1 = -\dfrac{vx_2 - vx_0}{H}W + vy_0 \end{cases} \qquad (14)$$

{CP2, CP3} may be converted into {CP1, CP2} or {CP1, CP2, CP3} by using formula (15):

$$\begin{cases} vx_0 = \dfrac{vx_2 - vx_1}{W*W + H*H} W*W - \dfrac{vy_2 - vy_1}{W*W + H*H} H*W + vx_1 \\ vy_0 = \dfrac{vy_2 - vy_1}{W*W + H*H} W*W + \dfrac{vx_2 - vx_1}{W*W + H*H} H*W + vy_1 \end{cases} \quad (15)$$

{CP1, CP4} may be converted into {CP1, CP2} or {CP1, CP2, CP3} by using formula (16) or (17):

$$\begin{cases} vx_1 = \dfrac{vx_3 - vx_0}{W*W + H*H} W*W + \dfrac{vy_3 - vy_0}{W*W + H*H} H*W + vx_0 \\ vy_1 = \dfrac{vy_3 - vy_0}{W*W + H*H} W*W - \dfrac{vx_3 - vx_0}{W*W + H*H} H*W + vy_0 \end{cases} \quad (16)$$

$$\begin{cases} vx_2 = \dfrac{vx_3 - vx_0}{W*W + H*H} H*H - \dfrac{vy_3 - vy_0}{W*W + H*H} H*W + vx_0 \\ vy_2 = \dfrac{vy_3 - vy_0}{W*W + H*H} W*H + \dfrac{vx_3 - vx_0}{W*W + H*H} H*H + vy_0 \end{cases} \quad (17)$$

{CP2, CP4} may be converted into {CP1, CP2} by using formula (18), and {CP2, CP4} may be converted into {CP1, CP2, CP3} by using formulas (18) and (19):

$$\begin{cases} vx_0 = -\dfrac{vy_3 - vy_1}{H} W + vx_1 \\ vy_0 = +\dfrac{vx_3 - vx_1}{H} W + vy_1 \end{cases} \quad (18)$$

$$\begin{cases} vx_2 = -\dfrac{vy_3 - vy_1}{H} W + vx_3 \\ vy_2 = +\dfrac{vx_3 - vx_1}{H} W + vy_3 \end{cases} \quad (19)$$

{CP3, CP4} may be converted into {CP1, CP2} by using formula (20), and {CP3, CP4} may be converted into {CP1, CP2, CP3} by using formulas (20) and (21):

$$\begin{cases} vx_0 = +\dfrac{vy_3 - vy_2}{W} H + vx_2 \\ vy_0 = -\dfrac{vx_3 - vx_2}{W} H + vy_2 \end{cases} \quad (20)$$

$$\begin{cases} vx_1 = +\dfrac{vy_3 - vy_2}{W} H + vx_3 \\ vy_1 = -\dfrac{vx_3 - vx_2}{W} H + vy_3 \end{cases} \quad (21)$$

For example, a 6-parameter affine motion model obtained by using a combination {CP1, CP2, CP4}, {CP2, CP3, CP4}, or {CP1, CP3, CP4} is converted into {CP1, CP2, CP3} of control points. A conversion method is: substituting motion vectors of control points and coordinate information of the control points into formula (4), to obtain a model parameter; and then substituting coordinate information of {CP1, CP2, CP3} into formula (5), to obtain motion vectors of CP1, CP2, and CP3.

More directly, conversion may be performed according to formulas (22) to (24). W represents the width of the current block. H represents the height of the current block. In formulas (13) to (21), ($vx_0$, $vy_0$) represents a motion vector of CP1, ($vx_1$, $vy_1$) represents a motion vector of CP2, ($vx_2$, $vy_2$) represents a motion vector of CP3, and ($vx_3$, $vy_3$) represents a motion vector of CP4.

{CP1, CP2, CP4} may be converted into {CP1, CP2, CP3} according to formula (22):

$$\begin{cases} vx_2 = vx_3 + vx_0 - vx_1 \\ vy_2 = vy_3 + vy_0 - vy_1 \end{cases} \quad (22)$$

{CP2, CP3, CP4} may be converted into {CP1, CP2, CP3} according to formula (23):

$$\begin{cases} vx_0 = vx_1 + vx_2 - vx_3 \\ vy_0 = vy_1 + vy_2 - vy_3 \end{cases} \quad (23)$$

{CP1, CP3, CP4} may be converted into {CP1, CP2, CP3} according to formula (24):

$$\begin{cases} vx_1 = vx_3 + vx_0 - vx_2 \\ vy_1 = vy_3 + vy_0 - vy_2 \end{cases} \quad (24)$$

(6) An Affine Motion Model-Based Advanced Motion Vector Prediction Mode (Affine AMVP Mode):
1. Construct a Candidate Motion Vector List The candidate motion vector list for the affine motion model-based AMVP mode is constructed by using a method for predicting an inherited control point motion vector and/or a constructed control point motion vector. In this embodiment of this application, the candidate motion vector list for the affine motion model-based AMVP mode may be referred to as a control point motion vector predictor candidate list (control point motion vectors predictor candidate list), and each control point motion vector predictor includes motion vectors of two (a 4-parameter affine motion model) control points or motion vectors of three (6-parameter affine motion model) control points.

Optionally, the control point motion vector predictor candidate list is pruned and sorted according to a specific rule, and may be truncated or padded to a specific quantity.

2. Determine an Optimal Control Point Motion Vector Predictor

On an encoder side, a motion vector of each motion compensation subunit in a current encoding block is obtained according to formula (3)/(5) by using each control point motion vector predictor in the control point motion vector predictor candidate list. Further, a pixel value in a corresponding location in a reference frame to which a motion vector of each motion compensation subunit points is obtained, and is used as a predictor of the pixel value, to perform motion compensation by using an affine motion model. Average values of differences between original values and predictors of all samples in the current encoding block are calculated. A control point motion vector predictor corresponding to minimum average values is selected as an optimal control point motion vector predictor, and is used as two/three control point motion vector predictors of the current encoding block. An index number representing a location of the control point motion vector predictor in the control point motion vector predictor candidate list is encoded into a bitstream and sent to a decoder.

On a decoder side, the index number is parsed, and the control point motion vector predictor (control point motion vectors predictor, CPMVP) is determined from the control point motion vector predictor candidate list based on the index number.

3. Determine Control Point Motion Vectors

On the encoder side, a control point motion vector predictor is used as a search start point for motion search within a specific search range, to obtain control point motion vectors (control point motion vectors, CPMV). Differences (control point motion vector differences, CPMVD) between the control point motion vectors and the control point motion vector predictor are transferred to the decoder side.

On the decoder side, the control point motion vector differences are parsed, and the control point motion vector difference and the control point motion vector predictor are added to obtain the control point motion vectors.

(7) Affine Merge Mode (Affine Merge Mode)

A control point motion vector merge candidate list (control point motion vectors merge candidate list) is constructed by using the method for predicting the inherited control point motion vector and/or the constructed control point motion vector.

Optionally, the control point motion vector merge candidate list is pruned and sorted according to a specific rule, and may be truncated or padded to a specific quantity.

On an encoder side, a motion vector of each motion compensation subunit (a sample or a pixel block that has a size of $N_1 \times N_2$ and that is obtained through partitioning according to a specific method) in a current encoding block is obtained according to formula (3)/(5) by using each control point motion vector in the merge candidate list. Further, a pixel value in a location in a reference frame to which a motion vector of each motion compensation subunit points is obtained, and is used as a predictor of the pixel value, to perform affine motion compensation. Average values of differences between original values and predictors of all samples in the current encoding block are calculated. A control point motion vector corresponding to minimum average values of the differences is selected as selected as two/three control point motion vectors of the current encoding block. An index number representing a location of the motion vectors of the control points in the candidate list is encoded into a bitstream and sent to a decoder.

On a decoder side, an index number is parsed, and the control point motion vectors (control point motion vectors, CPMV) are determined from the control point motion vector merge candidate list based on the index number.

In addition, it should be noted that, in this application, "at least one" means one or more, and "a plurality of" means two or more than two. The term "and/or" describes an association relationship between associated objects and represents that three relationships may exist. For example, A and/or B may represent the following cases: Only A exists, both A and B exist, and only B exists, where A and B may be in a singular or plural form. The character "/" generally indicates an "or" relationship between the associated objects. "At least one of the following items (pieces)" or a similar expression thereof indicates any combination of these items, including a single cases (pieces) or any combination of a plurality of items (pieces). For example, at least one of a, b, or c may indicate: a, b, c, a-b, a-c, b-c, or a-b-c, where a, b, and c may be singular or plural.

In this application, when the current block is decoded by using an inter prediction mode, an inter prediction mode may be signaled by using a syntax element.

Currently, for a part of syntax structure currently used to parse the inter prediction mode that is used for the current block, refer to Table 1. It should be noted that a syntax element in a syntax structure may be alternatively represented by another identifier. This is not specifically limited in this application.

TABLE 1

| coding_unit(x0,y0,cbWidth,cbHeight) { | Descriptor (descriptor) |
|---|---|
| ... | |
|   merge_flag[x0][y0] | ae(v) |
|   if(merge_flag[x0][y0]) { | |
|     if (allowAffineMerge) | |
|       affine_merge_flag[x0][y0] | ae(v) |
|     if (MaxNumMergeCand > 1) | |
|       merge_idx[x0][y0] | ae(v) |
|   } else { | |
|     if(slice_type == B) | |
|       inter_pred_idc[x0][y0] | ae(v) |
|     if (allowAffineInter) { | |
|       affine_inter_flag[x0][y0] | ae(v) |
|       if(affine_inter_flag[x0][y0]) | |
|         affine_type_flag[x0][y0] | ae(v) |
|     } | |
|     MotionModelIdc[x0][y0] = affine_inter_flag[x0][y0] + affine_type_flag[x0][y0] | |
|     if(inter_pred_idc[x0][y0] != PRED_L1) { | |
|       if(num_ref_idx_l0_active_minus1 > 0) | |
|         ref_idx_l0[x0][y0] | ae(v) |
|       mvd_coding(x0, y0, 0, 0) | |
|       if(MotionModelIdc[x0][y0] > 0) { | |
|         mvd_coding(x0, y0, 0, 1) | |
|         if(MotionModelIdc[x0][y0] > 1) | |
|           mvd_coding(x0, y0, 0, 2) | |
|       } | |
|       mvp_l0_flag[x0][y0] | ae(v) |
|     } | |
|     if(inter_pred_idc[x0][y0] != PRED_L0) { | |
|       if(num_ref_idx_l1_active_minus1 > 0) | |
|         ref_idx_l1[x0][y0] | ae(v) |
|       mvd_coding(x0, y0, 1, 0) | |

TABLE 1-continued

| coding_unit(x0,y0,cbWidth,cbHeight) { | Descriptor (descriptor) |
|---|---|
|         if(MotionModelIdc[x0][y0] > 0) { | |
|           mvd_coding(x0, y0, 1, 1) | |
|           if(MotionModelIdc[x0][y0] > 1) | |
|             mvd_coding(x0, y0, 1, 2) | |
|         } | |
|         mvp_l1_flag[x0][y0] | ae(v) |
|     } | |
|   } | |
| ... | |
| } | |

The syntax element merge_flag[x0][y0] may be used to indicate whether a merge mode is used for a current block. For example, when merge_flag[x0][y0]=1, it indicates that the merge mode is used for the current block; or when merge_flag[x0][y0]=0, it indicates that the merge mode is not used for the current block. x0 and y0 represent coordinates of the current block relative to a video picture.

The variable allowAffineMerge may be used to indicate whether a condition for allowing an affine motion model-based merge mode for the current block is satisfied. For example, when allowAffineMerge=0, it indicates that the condition for allowing the affine motion model—based merge mode is not satisfied; or when allowAffineMerge=1, it indicates that the condition for the affine motion model-based merge mode is satisfied. The condition for allowing the affine motion model-based merge mode may be that both the width and the height of the current block are greater than or equal to 8. cbWidth represents the width of the current block, and cbHeight represents the height of the current block. That is, when cbWidth<8 or cbHeight<8, allowAffineMerge=0; or when cbWidth≥8 and cbHeight≥8, allowAffineMerge=1.

The variable allowAffineInter may be used to indicate whether a condition for allowing an affine motion model-based AMVP mode for the current block is satisfied. For example, when allowAffineInter=0, it indicates that the condition for allowing the affine motion model-based AMVP mode is not satisfied; or when allowAffineInter=1, it indicates that the condition for allowing the affine motion model-based AMVP mode is satisfied. The condition for allowing the affine motion model-based AMVP mode may be that both the width and the height of the current block are greater than or equal to 16. In other words, when cbWidth<16 or cbHeight<16, allowAffineInter=0; or when cbWidth≥16 and cbHeight≥16, allowAffineInter=1.

The syntax element affine_merge_flag[x0][y0] may be used to indicate whether the affine motion model-based merge mode is used for the current block when the slice including the current block is a P slice or a B slice. For example, when affine_merge_flag[x0][y0]=1, it indicates that the affine motion model-based merge mode is used for the current block; or when affine_merge_flag[x0][y0]=0, it indicates that the affine motion model-based merge mode is not used for the current block, and a translational motion model-based merge mode may be used.

The syntax element affine_inter_flag[x0][y0] may be used to indicate whether the affine motion model-based AMVP mode is used for the current block when the slice including the current block is a P slice or a B slice. For example, when affine_inter_flag[x0][y0]=1, it indicates that the affine motion model-based AMVP mode is used for the current block; or when affine_inter_flag[x0][y0]=0, it indicates that the affine motion model-based AMVP mode is not used for the current block, and a translational motion model-based AMVP mode may be used.

The syntax element affine_type_flag[x0][y0] may be used to indicate whether a 6-parameter affine motion model-based motion compensation is used for the current block when the slice including the current block is a P slice or a B slice. When affine_type_flag[x0][y0]=0, it indicates that the 6-parameter affine motion model-based motion compensation is not used for the current block, and only a 4-parameter affine motion model-based motion compensation may be used for the current block; or when affine_type_flag[x0][y0]=1, it indicates that the 6-parameter affine motion model-based motion compensation is used for the current block.

As shown in Table 2, when MotionModelIdc[x0][y0]=1, it indicates that the 4-parameter affine motion model is used; when MotionModelIdc[x0][y0]=2, it indicates that the 6-parameter affine motion model is used; or when MotionModelIdc[x0][y0]=0, it indicates that a translational motion model is used.

TABLE 2

| MotionModelIdc[x0][y0] | Motion model for motion compensation (motion model for motion compensation) |
|---|---|
| 0 | Translational motion (translational motion) |
| 1 | 4-parameter affine motion (4-parameter affine motion) |
| 2 | 6-parameter affine motion (6-parameter affine motion) |

The variable MaxNumMergeCand is used to represent a maximum list length, and indicates a maximum number of candidates of a constructed candidate motion vector list. inter_pred_idc[x0][y0] is used to indicate a prediction direction. PRED_L1 is used to indicate backward prediction. num_ref_idx_l0_active_minus1 indicates a quantity of reference frames in a forward reference frame list(list 0), and ref_idx_l0[x0][y0] indicates a forward (list 0) reference picture index for the current block. mvd_coding(x0, y0, 0, 0) indicates a first motion vector difference. mvp_l0_flag[x0][y0] indicates an MVP candidate index of a forward MVP candidate list (list 0). PRED_L0 indicates forward prediction. num_ref_idx_l1_active_minus1 indicates a quantity of reference frames in a backward reference frame list (list 1). ref_idx_l1[x0][y0] indicates a backward (list 1) reference picture index for the current block, and mvp_l1_flag[x0][y0] indicates an MVP candidate index of a backward MVP candidate list (list 1).

In Table 1, ae(v) represents a syntax element encoded by using context-based adaptive binary arithmetic coding (context-based adaptive binary arithmetic coding, CABAC).

Figure 6A:
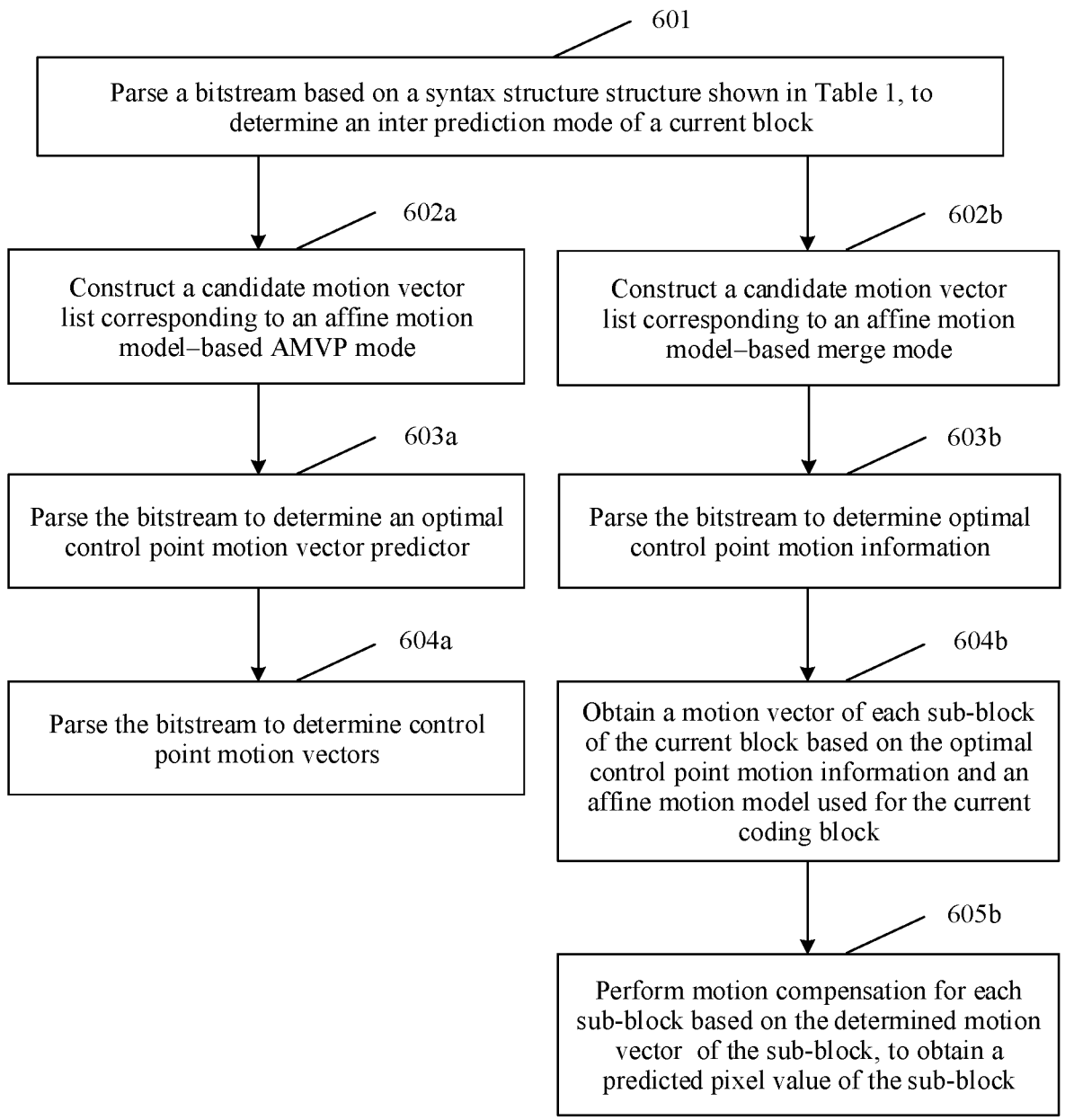
FIG. 6A is a flowchart of an inter prediction method in an implementation described in an embodiment of this application.

The following describes in detail an inter prediction process. Refer to FIG. 6A.

Step 601: Parse a bitstream based on a syntax structure shown in Table 1, to determine an inter prediction mode of a current block.

If it is determined that the inter prediction mode of the current block is an affine motion model-based AMVP mode, step 602a is performed.

That is, when merge_flag=0 and affine_inter_flag=1, it indicates that the inter prediction mode of the current block is the affine motion model-based AMVP mode.

If it is determined that the inter prediction mode of the current block is an affine motion model-based merge (merge) mode, step 602b is performed.

That is, when merge_flag=1 and affine_merge_flag=1 in the syntax elements, it indicates that the inter prediction mode of the current block is the affine motion model-based merge mode.

Step 602a: Construct a candidate motion vector list corresponding to the affine motion model-based AMVP mode, and perform step 603a.

A candidate control point motion vector of the current block is derived by using a method for predicting an inherited control point motion vector and/or a constructed control point motion vector, and is added to the candidate motion vector list.

The candidate motion vector list may include a 2-tuple list (a current encoding block is a 4-parameter affine motion model) or a 3-tuple list. The 2-tuple list includes one or more 2-tuples used to construct the 4-parameter affine motion model. The 3-tuple list includes one or more 3-tuples used to construct a 6-parameter affine motion model.

Optionally, the candidate motion vector 2-tuple/3-tuple list is pruned and sorted according to a specific rule, and may be truncated or padded to a specific quantity.

A1: Descriptions are provided for a procedure of constructing the candidate motion vector list by using the method for predicting the inherited control point motion vector.

FIG. 4 is used as an example. For example, blocks in neighboring locations around the current block are traversed in an order A1→B1→B0→A0→B2 in FIG. 4, to find affine coding blocks in which the blocks in the neighboring locations are located and obtain control point motion information of the affine coding blocks. Further, a motion model is constructed by using the control point motion information of the affine coding blocks, and candidate control point motion information of the current block is derived. For details, refer to related descriptions of the method for predicting the inherited control point motion vector in (3). Details are not described herein.

For example, an affine motion model used for the current block is a 4-parameter affine motion model (that is, MotionModelIdc=1). If a neighboring affine coding block is a 4-parameter affine motion model, motion vectors of two control points of the affine coding block are obtained: a motion vector (vx4, vy4) of the top-left control point (x4, y4) and a motion vector (vx5, vy5) of the top-right control point (x5, y5). The affine coding block is an affine coding block predicted in an encoding phase by using the affine motion model.

Motion vectors of the top-left control point and the top-right control point of the current block are derived by using the 4-parameter affine motion model including the two control points of the neighboring affine coding block and according to formulas (6) and (7) corresponding to the 4-parameter affine motion model, respectively.

If a 6-parameter affine motion model is used for the neighboring affine coding block, motion vectors of three control points of the neighboring affine coding block are obtained, for example, a motion vector (vx4, vy4) of the top-left control point (x4, y4), a motion vector (vx5, vy5) of the top-right control point (x5, y5), and a motion vector (vx6, vy6) of the bottom-left control point (x6, y6) in FIG. 4.

Motion vectors of the top-left control point and the top-right control point of the current block are derived by using the 6-parameter affine motion model including the three control points of the neighboring affine coding block and according to formulas (8) and (9) corresponding to the 6-parameter affine motion model, respectively.

For example, an affine motion model for the current decoding block is a 6-parameter affine motion model (that is, MotionModelIdc=2).

If an affine motion model used for a neighboring affine coding block is a 6-parameter affine motion model, motion vectors of three control points of the neighboring affine coding block are obtained, for example, a motion vector (vx4, vy4) of the top-left control point (x4, y4), a motion vector (vx5, vy5) of the top-right control point (x5, y5), and a motion vector (vx6, vy6) of the bottom-left control point (x6, y6) in FIG. 4.

Motion vectors of the top-left control point, the top-right control point, and the bottom-left control point of the current block are derived by using the 6-parameter affine motion model including the three control points of the neighboring affine coding block and according to formulas (8), (9), and (10) corresponding to the 6-parameter affine motion model, respectively.

If an affine motion model used for a neighboring affine coding block is a 4-parameter affine motion model, motion vectors of two control points of the affine coding block are obtained: a motion vector (vx4, vy4) of the top-left control point (x4, y4) and a motion vector (vx5, vy5) of the top-right control point (x5, y5).

Motion vectors of the top-left control point, the top-right control point, and the bottom-left control point of the current block are derived by using the 4-parameter affine motion model including the two control points of the neighboring affine coding block and according to formulas (6) and (7) corresponding to the 4-parameter affine motion model, respectively.

It should be noted that other motion models, candidate locations, and search orders are also applicable to this application. Details are not described herein. It should be noted that methods in which other control points are used to represent motion models of neighboring and current encoding blocks are also applicable to this application. Details are not described herein.

A2: Descriptions are provided for a procedure of constructing the candidate motion vector list by using the method for predicting the constructed control motion vector.

For example, an affine motion model used for a current decoding block is a 4-parameter affine motion model (that is, MotionModelIdc is 1). In this case, motion vectors of the top-left sample and the top-right sample of the current encoding block are determined by using motion information of a neighboring encoded block around the current encoding block. Specifically, the candidate motion vector list may be constructed in a manner 1 or a manner 2 of predicting the constructed control point motion vector. For a specific manner, refer to the descriptions in (4) and (5). Details are not described herein.

For example, if an affine motion model used for a current decoding block is a 6-parameter affine motion model (that is, MotionModelIdc is 2), motion vectors of the top-left sample, the top-right sample, and the bottom-left sample of the current encoding block are determined by using motion information of a neighboring encoded block around the current encoding block. Specifically, the candidate motion vector list may be constructed in a manner 1 or a manner 2 of predicting the constructed control point motion vector. For a specific manner, refer to the descriptions in (4) and (5). Details are not described herein.

It should be noted that other combinations of control point motion information are also applicable to this application. Details are not described herein.

Step 603a: Parse the bitstream, to determine an optimal control point motion vector predictor, and perform step 604a.

B1: If the affine motion model used for the current decoding block is the 4-parameter affine motion model (MotionModelIdc is 1), obtain an index number through parsing, and determine an optimal motion vector predictor of two control points from the candidate motion vector list based on the index number.

For example, the index number is mvp_l0_flag or mvp_l1_flag.

B2: If the affine motion model used for the current decoding block is the 6-parameter affine motion model (MotionModelIdc is 2), obtain an index number through parsing, and determine an optimal motion vector predictor of three control points from the candidate motion vector list based on the index number.

Step 604a: Parse the bitstream to determine control point motion vectors.

C1: When the affine motion model used for the current decoding block is the 4-parameter affine motion model (MotionModelIdc is 1), decode the bitstream to obtain motion vector differences of two control points of the current block, and obtain control point motion vectors based on the motion vector differences and a motion vector predictor of the control points. Forward prediction is used as an example. Motion vector differences of two control points are mvd_coding(x0, y0, 0, 0) and mvd_coding(x0, y0, 0, 1).

For example, motion vector differences of the top-left control point and the top-right control point are obtained by decoding the bitstream, and are added to motion vector predictors respectively, to obtain motion vectors of the top-left control point and the top-right control point of the current block.

C2: When the affine motion model for the current decoding block is the 6-parameter affine motion model (that is, MotionModelIdc is 2), decode the bitstream to obtain motion vector differences of three control points of the current block, and obtain control point motion vectors based on the motion vector differences and a motion vector predictor of the control points. Forward prediction is used as an example. Motion vector differences of three control points are mvd_coding(x0, y0, 0, 0), mvd_coding(x0, y0, 0, 1), and mvd_coding(x0, y0, 0, 2).

For example, motion vector differences of the top-left control point, the top-right control point, and the bottom-left control point are obtained by decoding the bitstream, and are added to motion vector predictors respectively, to obtain motion vectors of the top-left control point, the top-right control point, and the bottom-left control point of the current block.

Step 602b: Construct a motion information candidate list for the affine motion model—based merge mode.

Specifically, the motion information candidate list for the affine motion model-based merge mode may be constructed by using the method for predicting the inherited control point motion vector and/or the constructed control point motion vector.

Optionally, the motion information candidate list is pruned and sorted according to a specific rule, and may be truncated or padded to a specific quantity.

D1: Descriptions are provided for a procedure of constructing the candidate motion vector list by using the method for predicting the inherited control motion vector.

The candidate control point motion information of the current block is derived by using the method for predicting the inherited control point motion vector, and added to the motion information candidate list.

Blocks in neighboring locations around the current block are traversed in the order of A1, B1, B0, A0, and B2 in FIG. 5A, to find affine coding blocks of the neighboring locations, and obtain control point motion information of the affine coding blocks. Further, candidate control point motion information of the current block is further derived by using a motion model constructed from the control point motion information of the affine coding blocks.

If the candidate motion vector list is empty at this time, the candidate control point motion information is added to the candidate list. Otherwise, motion information in the candidate motion vector list is sequentially traversed to check whether motion information that is the same as the candidate control point motion information exists in the candidate motion vector list. If no motion information that is the same as the candidate control point motion information exists in the candidate motion vector list, the candidate control point motion information is added to the candidate motion vector list.

To determine whether two pieces of candidate motion information are the same, it is necessary to sequentially determine whether a forward reference frame, a backward reference frame, horizontal and vertical components of each forward motion vector, and horizontal and vertical components of each backward motion vector in one piece of candidate motion information are the same as those in the other piece of candidate motion information. The two pieces of candidate motion information are considered as different candidate motion information only when all of the foregoing elements are different.

If a quantity of pieces of motion information in the candidate motion vector list reaches a maximum list length MaxNumMrgCand (MaxNumMrgCand is a positive integer such as 1, 2, 3, 4, or 5, 5 is used as an example for description in the following, and details are not described herein), construction of the candidate list is completed. Otherwise, blocks in next neighboring locations are traversed.

Figure 6B:
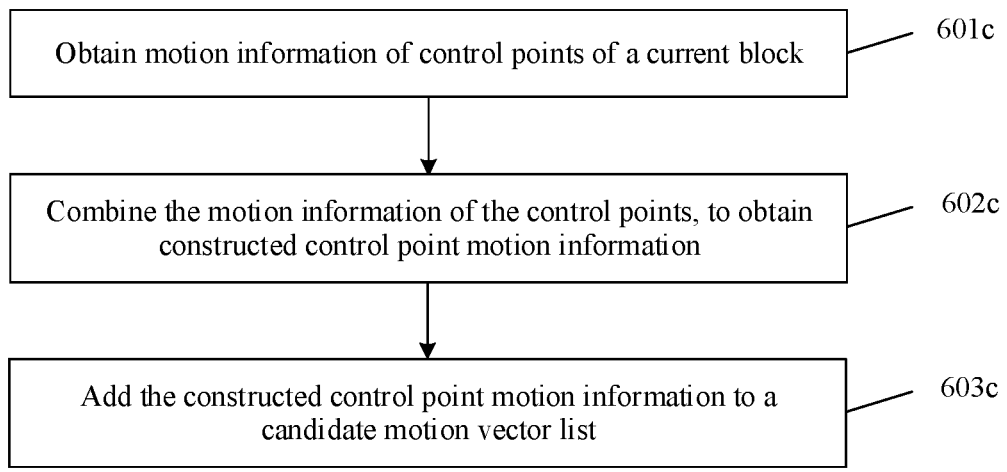
FIG. 6B is a schematic diagram of constructing a candidate motion vector list in an implementation described in an embodiment of this application.

D2: Derive the candidate control point motion information of the current block by using the method for predicting the constructed control point motion vector, and add the candidate control point motion information to the motion information candidate list, as shown in FIG. 6B.

Step 601c: Obtain motion information of control points of the current block. Refer to step 501 in the method 2 for predicting the constructed control point motion vector in (5). Details are not described herein again.

Step 602c: Combine the motion information of the control points, to obtain constructed control point motion information. Refer to step 501 in FIG. 5B. Details are not described herein again.

Step 603c: Add the constructed control point motion information to the candidate motion vector list.

If a length of the candidate list is less than a maximum list length MaxNumMrgCand at this time, these combinations are traversed in a preset order, to obtain a valid combination as candidate control point motion information. If the candidate motion vector list is empty at this time, the candidate control point motion information is added to the candidate motion vector list. Otherwise, motion information in the candidate motion vector list is sequentially traversed, to check whether motion information that is the same as the candidate control point motion information exists in the candidate motion vector list. If no motion information that is the same as the candidate control point motion information exists in the candidate motion vector list, the candidate control point motion information is added to the candidate motion vector list.

For example, a preset order is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3)→Affine (CP2, CP3)→Affine (CP1, CP4)→Affine (CP2, CP4)→Affine (CP3, CP4). There are a total of 10 combinations.

If control point motion information corresponding to a combination is unavailable, it is considered that the combination is unavailable. If a combination is available, a reference picture index of the combination is determined (in a case of two control points, a minimum reference picture index is selected as the reference picture index of the combination; in a case of more than two control points, a reference picture index that appears most frequently is selected, and a minimum reference picture index is selected as the reference picture index of the combination if quantities of times a plurality of reference picture indexes appear are the same), and control point motion vectors are scaled. If motion information of all control points obtained after scaling is consistent, the combination is invalid.

Optionally, in this embodiment of this application, the candidate motion vector list may be further padded. For example, after the foregoing traversal process, if the length of the candidate motion vector list is less than the maximum list length MaxNumMrgCand, the candidate motion vector list may be padded, until the length of the list is equal to MaxNumMrgCand.

The padding may be performed by filling with a zero motion vector, or by combining or weighted averaging existing candidate motion information in the existing list. It should be noted that other methods for padding the candidate motion vector list are also applicable to this application. Details are not described herein.

Step 603b: Parse the bitstream to determine optimal control point motion information.

The index number is parsed, and the optimal control point motion information is determined from the candidate motion vector list based on the index number.

Step 604b: Obtain a motion vector of each sub-block of the current block based on the optimal control point motion information and an affine motion model used for the current decoding block.

Figure 6C:
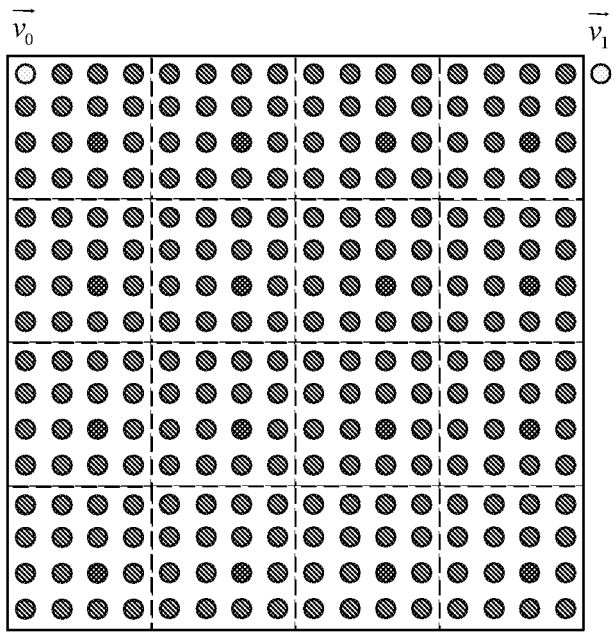
FIG. 6C is a schematic diagram of a motion compensation unit in an implementation described in an embodiment of this application.

For each sub-block (a sub-block may also be equivalent to a motion compensation unit, and the width and the height of the sub-block are less than the width and the height of the current block) of the current affine coding block, motion information of a sample in a preset location in a motion compensation unit may be used to represent motion information of all samples in the motion compensation unit. It is assumed that a size of the motion compensation unit is M×N; in this case, the sample in the preset location may be the center sample (M/2, N/2), the top-left sample (0, 0), the top-right sample (M−1, 0), or a sample in another location of the motion compensation unit. The following provides descriptions by using the center pixel of the motion compensation unit as an example. Refer to FIG. 6C. In FIG. 6C, V0 represents a motion vector of the top-left control point, and V1 represents a motion vector of the top-right control point. Each small square box represents one motion compensation unit.

Coordinates of the center sample of the motion compensation unit relative to the top-left sample of the current affine coding block are calculated by using formula (25), where i is an $i^{th}$ motion compensation unit in a horizontal direction (from left to right), j is a $j^{th}$ motion compensation unit in a vertical direction (from top to bottom), and $(x_{(i,j)}, y_{(i,j)})$ represents coordinates of the center sample of an $(i, j)^{th}$ motion compensation unit relative to the top-left sample of the current affine coding block.

If an affine motion model used for the current affine coding block is a 6-parameter affine motion model, $(x_{(i,j)}, y_{(i,j)})$ are substituted into formula (26) corresponding to the 6-parameter affine motion model, to obtain a motion vector of the center sample of each motion compensation unit, and the motion vector of the center sample of each motion compensation unit is used as a motion vector $(vx_{(i,j)}, vy_{(i,j)})$ of all samples of the motion compensation unit.

If an affine motion model used for the current affine coding block is a 4-parameter affine motion model, $(x_{(i,j)}, y_{(i,j)})$ are substituted into formula (27) corresponding to the 4-parameter affine motion model, to obtain a motion vector of the center sample of each motion compensation unit, and the motion vector of the center sample of each motion compensation unit is used as a motion vector $(vx_{(i,j)}, vy_{(i,j)})$ of all samples of the motion compensation unit.

$$\begin{cases} x_{(i,j)} = M \times i + \dfrac{M}{2}, i = 0, 1 .. \\ y_{(i,j)} = N \times j + \dfrac{N}{2}, j = 0, 1 .. \end{cases} \quad (25)$$

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases} \quad (26)$$

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + vy_0 \end{cases} \quad (27)$$

Step 605b: Perform motion compensation for each sub-block based on the determined motion vector of the sub-block, to obtain a predicted pixel value of the sub-block.

In a conventional technology, both parameter information of the 4-parameter affine motion model and parameter information of the 6-parameter affine motion model, for example, affine_merge_flag, affine_inter_flag, and affine_type_flag in Table 1, need to be transmitted to a decoder side via the bitstream. If the current video picture or slice has no affine transformation features, transmission of the parameter information increases a quantity of bits in the bitstream. In addition, the parameter information indicating whether an affine motion model is used for each coding block needs to be parsed on the decoder side. Consequently, load of a decoder may be increased, a processing speed may be reduced, and a processing time may be increased.

Based on this, the embodiments of this application provide a video picture prediction method and apparatus, to resolve a problem in a conventional technology that a quantity of bits in a bitstream is increased. The method and the apparatus are based on a same inventive concept. Because a problem-resolving principle of the method is similar to that of the apparatus, mutual reference may be made to implementations of the apparatus and the method. No repeated descriptions are provided.

To resolve the foregoing problem, the embodiments of this application provide, but not limited to, the following several possible implementations.

In a first possible implementation, for example, some video pictures may have some affine features, while some video pictures may have no affine features. In this case, an identifier may be added to a bitstream to indicate whether an affine motion model-based inter prediction mode is enabled for the video picture.

In a second possible implementation, for example, not all slices in a video picture have affine features, an identifier may be added to a bitstream to indicate whether an affine motion model-based inter prediction mode is enabled for the slice.

In a third possible implementation, for example, some video pictures have no affine features, and not all slices of some video pictures have affine features. In this case, two types of identifiers may be added to the bitstream. A first type of identifier is used to indicate whether an affine motion model-based inter prediction mode is enabled for a video picture, and a second type of identifier is used to indicate whether the affine motion model-based inter prediction mode is enabled for a slice in the video picture.

For ease of subsequent description, the identifier used to indicate whether the affine motion model-based inter prediction mode is enabled for the video picture is referred to as an identifier 1, and the identifier used to indicate whether the affine motion model-based inter prediction mode is enabled for the slice included in the video picture is referred to as an identifier 2.

In the foregoing three possible implementations, for a picture block included in a video picture or a slice for which an affine motion model does not need to be used, a parameter, related to the affine motion model, of the picture block may not need to be transmitted, for example, affine_merge_flag, affine_inter_flag, or affine_type_flag in Table 1. On a decoder side, during decoding of the picture block, the parameter related to the affine motion model does not need to be parsed. This can reduce load of a decoder, increase a processing speed, and decrease a processing time.

The following describes in detail the foregoing several possible implementations provided in this application from a perspective of a decoder side with reference to the accompanying drawings. Specifically, the possible implementations may be performed by a video decoder 30, or may be performed by a motion compensation module in a video decoder, or may be performed by a processor.

Figure 7:
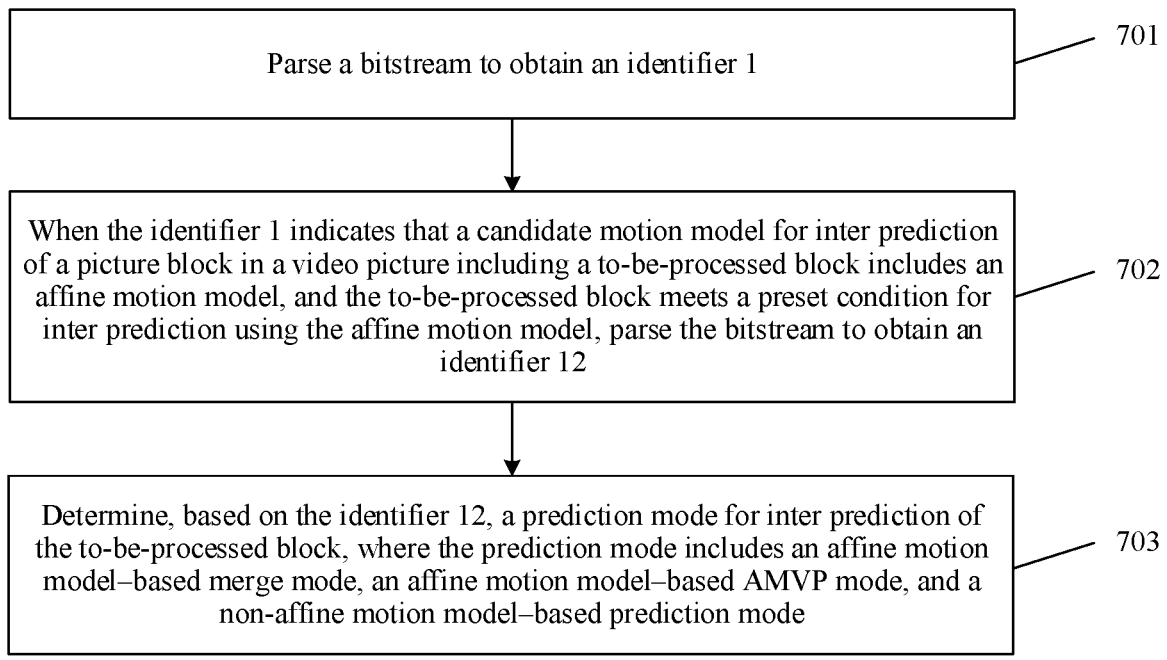
FIG. 7 is a schematic flowchart of a video picture prediction method according to an embodiment of this application.

Refer to FIG. 7. A first possible implementation is described.

Step 701: Parse a bitstream to obtain an identifier 1.

The identifier 1 is used to indicate whether a candidate motion model for inter prediction of a video picture including a to-be-processed block includes an affine motion model. In other words, the identifier 1 is used to indicate whether the affine motion model-based motion compensation is enabled for the video picture including the to-be-processed block.

For example, the identifier 1 may be configured in an SPS of the bitstream. Based on this, the parsing a bitstream to obtain an identifier 1 may be implemented in the following manner: parsing the SPS of the bitstream to obtain the identifier 1.

Step 702: When the identifier 1 indicates that the candidate motion model for inter prediction of the video picture including the to-be-processed block includes an affine motion model, and the to-be-processed block meets a preset condition for inter prediction using the affine motion model, parse the bitstream to obtain an identifier 12.

Optionally, the preset condition may include at least one of the following cases:

The width of the to-be-processed block is greater than or equal to a first preset threshold; and the height of the to-be-processed block is greater than or equal to a second preset threshold.

The first preset threshold may be equal to the second preset threshold. For example, when an inter prediction mode is a merge mode, the preset condition may be that the width of the to-be-processed block is greater than or equal to 8, and that the height of the to-be-processed block is greater than or equal to 8. When an inter prediction mode is an AMVP mode, the preset condition may be that the width of the to-be-processed block is greater than or equal to 16, and that the height of the to-be-processed block is greater than or equal to 16.

For example, when the inter prediction mode is the merge mode, whether the to-be-processed block meets the preset condition for inter prediction using the affine motion model may be represented by a variable allowAffineMerge. For example, when the inter prediction mode is an AMVP mode, whether the to-be-processed block meets the preset condition for inter prediction using the affine motion model may be represented by a variable allowAffineInter. For related descriptions of allowAffineMerge and allowAffineInter, refer to Table 1. Details are not described herein again.

For example, when the identifier 1 indicates that the candidate motion model for inter prediction of the picture block in the video picture including the to-be-processed block does not include an affine motion model, parameter information related to the affine motion model does not need to be parsed when inter prediction is performed on the picture block of the video picture. For example, the bitstream does not need to be parsed to obtain the identifier 12.

For example, when the identifier 1 is a value A, it indicates that the candidate motion model for inter prediction of the picture block in the video picture including the to-be-processed block includes an affine motion model, or when the identifier 1 is a value B, it indicates that the candidate motion model for inter prediction of the picture block in the video picture including the to-be-processed block does not include an affine motion model. For example, when the identifier 1 is 1, it indicates that the candidate motion model for inter prediction of the picture block in the video picture including the to-be-processed block includes an affine motion model, or when the identifier 1 is 0, it indicates that the candidate motion model for inter prediction of the picture block in the video picture including the to-be-processed block does not include an affine motion model.

Step 703: Determine, based on the identifier 12, a prediction mode for inter prediction of the to-be-processed block, where the prediction mode includes an affine motion model-based merge mode, an affine motion model-based AMVP mode, and a non-affine motion model-based prediction mode.

For example, the identifier 1 may be represented by a syntax element sps_affine_enabled_flag. sps_affine_enabled_flag specifies whether affine model based motion compensation is enabled for inter prediction (sps_affine_enabled_flag specifies whether affine model based motion compensation can be used for inter prediction). For example, sps_affine_enabled_flag is equal to 0, the syntax elements shall be constrained such that no affine model based motion compensation is used in the CVS, and affine_merge_flag, affine_inter_flag and affine_type_flag are not presented in picture block level syntax of the CVS. sps_affine_enabled_flag is equal to 1, affine model based motion compensation may be used in the CVS. (If sps_affine_enabled_flag is equal to 0, the syntax elements shall be constrained such that no affine model based motion compensation is used in the CVS, and affine_merge_flag, affine_inter_flag and affine_type_flag are not presented in coding unit level syntax of the CVS. Otherwise (sps_affine_enabled_flag is equal to 1), affine model based motion compensation may be used in the CVS.)

For example, when the inter prediction mode is the AMVP mode, the identifier 12 may be represented by a syntax element affine_inter_flag; or when the inter prediction mode is the merge mode, the identifier 12 may be represented by a syntax element affine_merge_flag. For related descriptions of the affine_inter_flag and the affine_merge_flag, refer to the descriptions of Table 1. Details are not described herein again.

In the first possible implementation, in a possible example, an identifier 13 may be further configured in the bitstream. The identifier 13 may be configured in a sequence parameter set of the bitstream. If affine motion model-based merge mode is used for inter prediction of the to-be-processed block, when the identifier 1 obtained by parsing the bitstream indicates that the candidate motion model for inter prediction of the picture block in the video picture including the to-be-processed block includes the affine motion model, the bitstream is parsed to obtain the identifier 13. When the identifier 13 is a first value, the affine motion model includes only a 4-parameter affine model; or when the identifier 13 is a second value, the affine motion model includes a 4-parameter affine model and a 6-parameter affine model. The first value is different from the second value. For example, the first value is 1, and the second value is 0; or the first value is 0, and the second value is 1.

For example, the identifier 13 may be represented by sps_affine_type_flag. sps_affine_type_flag specifies whether 6-parameter affine model based motion compensation is enabled for inter prediction. For example, sps_affine_type_flag is equal to 0, the syntax elements shall be constrained such that no 6-parameter affine model based motion compensation is used in the CVS, and affine_type_flag is not presented in picture block level syntax in the CVS. (sps_affine_type_flag specifies whether 6-parameter affine model based motion compensation can be used for inter prediction. If sps_affine_type_flag is equal to 0, the syntax elements shall be constrained such that no 6-parameter affine model based motion compensation is used in the CVS, and affine_type_flag is not presented in cu level syntax in the CVS. Otherwise (sps_affine_type_flag is equal to 1), 6-parameter affine model based motion compensation may be used in the CVS. When not present, the value of sps_affine_type_flag is inferred to be equal to 0.)

In the first possible implementation, in a possible example, when the identifier 12 indicates that the affine motion model-based AMVP mode is used for inter prediction of the to-be-processed block, and the identifier 13 is the second value, the bitstream needs to be parsed to obtain an identifier 14. When the identifier 14 is a third value, the affine motion model is the 6-parameter affine motion model, or when the identifier 14 is a fourth value, the affine motion model is the 4-parameter affine motion model. The third value is different from the fourth value. For example, the third value is 1, and the fourth value is 0; or the third value is 0, and the fourth value is 1.

For example, the identifier 14 may be represented by affine_type_flag. affine_type_flag is used to indicate whether 6-parameter affine motion model-based motion compensation can be used for inter prediction of the picture block. For example, when affine_type_flag=0, it indicates that no 6-parameter affine motion model-based motion compensation can be used for inter prediction of the picture block.

For example, for syntax structures for parsing the identifier 1 and the identifier 13, refer to Table 3. u(1) represents reading one more consecutive bit, and is interpreted as an unsigned integer.

TABLE 3

| seq_parameter_set_rbsp( ) { | Descriptor |
|---|---|
| ... | |
| sps_affine_enabled_flag | u(1) |
| if(sps_affine_enabled_flag) | |
| sps_affine_type_flag | u(1) |
| ... | |
| ... | |
| } | |

For example, for a part of syntax structure for parsing the inter prediction mode used for the current picture block, refer to Table 4.

TABLE 4

| coding_unit(x0, y0, cbWidth, cbHeight) { | |
|---|---|
| ... | |
| merge_flag[x0][y0] | ae(v) |
| if(merge_flag[x0][y0]) { | |
|   if(sps_affine_enable_flag && allowAffineMerge) | |
|     affine_merge_flag[x0][y0] | ae(v) |
| ... | |
| } else { | |
| ... | |
| if(sps_affine_enable_flag && allowAffineInter){ | |
|   affine_inter_flag[x0][y0] | ae(v) |
|   if(sps_affine_type_flag && affine_inter_flag[x0][y0]) | |
|     affine_type_flag[x0][y0] | ae(v) |
| } | |
| ... } | |
| ... | |
| } | |

In the first possible implementation, in a possible example, if the bitstream is parsed to obtain the identifier 1 and the identifier 13, when the identifier 12 indicates that affine motion model-based merge mode is used for inter prediction of the to-be-processed block, and the identifier 13 is the second value, a first candidate motion vector list is constructed. The first candidate motion vector list includes a first element, and the first element includes motion information of three control points for constructing the 6-parameter affine motion model. For example, the first element includes one or more 3-tuples.

Optionally, the first candidate motion vector list may further include a second element. The second element includes only motion information of two control points for constructing the 4-parameter affine motion model. For example, the second element includes one or more 2-tuples. The first candidate motion vector list may further include a third element, and the third element includes motion information of a non-affine motion model.

In another possible example, when the identifier 12 indicates that affine motion model—based merge mode is used for inter prediction of the to-be-processed block, and the identifier 13 is the first value, a second candidate motion vector list is constructed. The second candidate motion vector list includes a second element, and the second element includes only motion information of two control points for constructing the 4-parameter affine motion model. The second candidate motion vector list does not include a first element. The second candidate motion vector list may further include a third element, and the third element includes motion information of a non-affine motion model. Both the first candidate motion vector list and the second candidate motion vector list are candidate motion vector lists for the affine motion model-based merge mode.

In the first possible implementation, in a possible example, if the bitstream is parsed to obtain the identifier 1 and the identifier 13, when the identifier 12 indicates that the affine motion model-based AMVP mode is used for inter prediction of the to-be-processed block, and the identifier 13 is the second value, the bitstream is parsed to obtain an identifier 14; and when the identifier 14 is a third value, the affine motion model is the 6-parameter affine motion model, or when the identifier 14 is a fourth value, the affine motion model is the 4-parameter affine motion model. The third value is different from the fourth value. For example, the third value is 1, and the fourth value is 0; or the third value is 0, and the fourth value is 1.

Optionally, the identifier 14 may be represented by a syntax element affine_type_flag. For affine_type_flag, refer to related descriptions in Table 1. Details are not described herein again.

Figure 8:
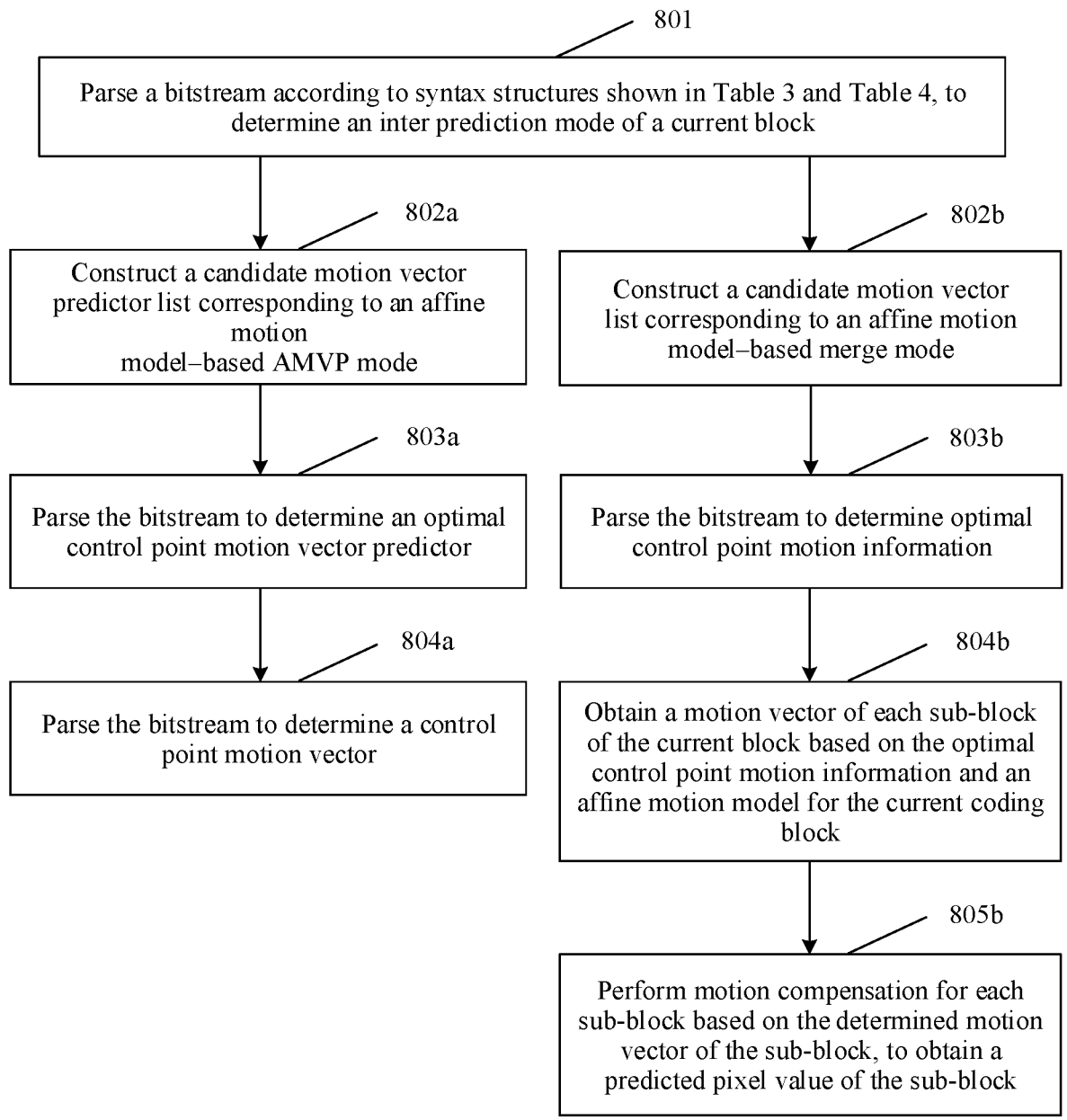
FIG. 8 is a schematic flowchart of an inter prediction method according to an embodiment of this application.

The following uses the syntax structures in Table 3 and Table 4 as an example to describe in detail the inter prediction procedure performed in the first possible manner, as shown in FIG. 8.

Step 801: Parse a bitstream based on the syntax structures shown in Table 3 and Table 4, to determine an inter prediction mode of a current block.

If it is determined that the inter prediction mode of the current block is an affine motion model-based AMVP mode, step 802a is performed.

That is, if sps_affine_enabled_flag=1, merge_flag=0, and affine_inter_flag=1 in the syntax elements, it indicates that the inter prediction mode of the current block is the affine motion model-based AMVP mode.

For example, if sps_affine_enabled_flag=1, merge_flag=0, affine_inter_flag=1, and sps_affine_type_flag=1 in the syntax elements, the bitstream needs to be parsed to obtain affine_type_flag. If affine_type_flag parsed is equal to 1, it indicates that the inter prediction mode of the current block is a 6-parameter affine motion model-based AMVP mode; or if affine_type_flag obtained through parsing is equal to 0, it indicates that the inter prediction mode of the current block is a 4-parameter affine motion model-based AMVP mode.

For example, if sps_affine_enabled_flag=1, merge_flag=0, affine_inter_flag=1, and sps_affine_type_flag=0 in the syntax elements, it indicates that the inter prediction mode of the current block is a 4-parameter affine motion model-based AMVP mode. In this case, affine_type_flag does not need to be parsed.

For example, if sps_affine_enabled_flag=0, and merge_flag=0 in the syntax elements, it indicates that the inter prediction mode of the current block is a translational motion model-based AMVP mode. In this case, affine_merge_flag, affine_inter_flag, and affine_type_flag may not be included in the bitstream, and do not need to be obtained by parsing the bitstream.

If it is determined that the inter prediction mode of the current block is an affine motion model-based merge (merge) mode, step 802b is performed.

That is, sps_affine_enabled_flag=1, merge_flag=1, and affine_merge_flag=1 in the syntax elements, it indicates that the inter prediction mode of the current block is the affine motion model-based merge mode.

For example, if sps_affine_enabled_flag=0, and merge_flag=1 in the syntax elements, it indicates that the inter prediction mode of the current block is a translational motion model-based merge mode. In this case, affine_merge_flag, affine_inter_flag, and affine_type_flag may not be included in the bitstream, and do not need to be obtained by parsing the bitstream.

For step 802a to step 804a, refer to step 602a to step 604a. Details are not described herein again.

Step 802b: Construct a motion information candidate list for the affine motion model-based merge mode.

Specifically, the motion information candidate list for the affine motion model-based merge mode may be constructed by using a method for predicting an inherited control point motion vector and/or a constructed control point motion vector.

For constructing the motion information candidate list for the affine motion model-based merge mode by using the method for predicting the inherited control point motion vector, refer to related descriptions of D1 in step 602b. Details are not described herein again.

When candidate control point motion information of the current block is derived by using the method for predicting the constructed control point motion vector, and is added to the motion information candidate list, the method specifically includes the following steps:

(1) Obtain motion information of control points of the current block. For details, refer to step 601c. Details are not described herein again.

(2) Combine the motion information of the control points to obtain constructed control point motion information.

If sps_affine_type_flag=0, motion information of two control points is combined to construct a 4-parameter affine motion model. The two control points are combined as follows: {CP1, CP4}, {CP2, CP3}, {CP1, CP2}, {CP2, CP4}, {CP1, CP3}, or {CP3, CP4}. For example, a 4-parameter affine motion model constructed by using a 2-tuple that is based on motion information (for example, 2 MVs) of control points CP1 and CP2 is denoted as Affine (CP1, CP2).

If sps_affine_type_flag=1, motion information of three control points is combined to construct a 6-parameter affine motion model. The three control points are combined as follows: {CP1, CP2, CP4}, {CP1, CP2, CP3}, {CP2, CP3, CP4}, or {CP1, CP3, CP4}. For example, a 6-parameter affine motion model constructed by using a 3-tuple that is based on motion information (for example, 3 MVs) of control points CP1, CP2, and CP3 is denoted as Affine (CP1, CP2, CP3). For example, if sps_affine_type_flag=1, in addition to combining the motion information of the three control points to construct a 6-parameter affine motion model, motion information of two control points may be further combined to construct a 4-parameter affine motion model.

It should be noted that a combination of different control points may also be converted into control points in a same location. For a specific conversion method, refer to related descriptions in step 502. Details are not described herein again.

(3) Add the constructed control point motion information to the candidate motion vector list.

If a length of the candidate list is less than a maximum list length MaxNumMrgCand at this time, these combinations are traversed in a preset order, to obtain a valid combination as candidate control point motion information. If the candidate motion vector list is empty at this time, the candidate control point motion information is added to the candidate motion vector list. Otherwise, motion information in the candidate motion vector list is sequentially traversed, to check whether motion information that is the same as the candidate control point motion information exists in the candidate motion vector list. If no motion information that is the same as the candidate control point motion information exists in the candidate motion vector list, the candidate control point motion information is added to the candidate motion vector list.

For example, if sps_affine_type_flag is 1, a preset order is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3)→Affine (CP2, CP3)→Affine (CP1, CP4)→Affine (CP2, CP4)→Affine (CP3, CP4). There are a total of 10 combinations. An order of adding the 10 combinations to the candidate motion vector list is not specifically limited in this embodiment of this application.

If sps_affine_type_flag is 0, a preset order is as follows: Affine (CP1, CP2)→Affine (CP1, CP3)→Affine (CP2, CP3)→Affine (CP1, CP4)→Affine (CP2, CP4)→Affine (CP3, CP4). There are a total of six combinations. An order of adding the six combinations to the candidate motion vector list is not specifically limited in this embodiment of this application.

For step 803b to step 805b, refer to step 603b to step 605b. Details are not described herein again.

Figure 9:
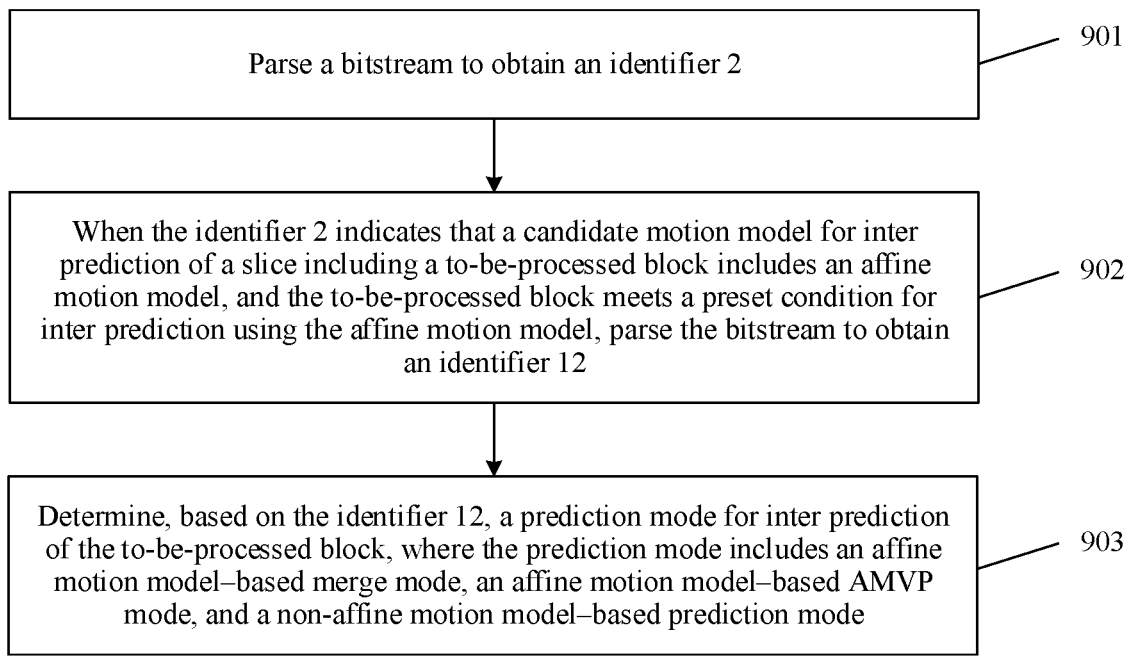
FIG. 9 is a schematic flowchart of another video picture prediction method according to an embodiment of this application.

Referring to FIG. 9, a second possible implementation is described.

Step 901: Parse a bitstream to obtain an identifier 2.

The identifier 2 is used to indicate whether a candidate motion model for inter prediction of a picture block in a slice including a to-be-processed block includes an affine motion model. In other words, the identifier 2 is used to indicate whether the affine motion model can be used when motion compensation is performed on the picture block included in the slice including the to-be-processed block.

For example, the identifier 2 may be configured in a slice header of the slice of the bitstream. Based on this, the parsing a bitstream to obtain an identifier 2 may be implemented in the following manner: parsing the slice header of the slice of the bitstream to obtain the identifier 2.

Step 902: When the identifier 2 indicates that the candidate motion model for inter prediction of the picture block in the slice including the to-be-processed block includes an affine motion model, and the to-be-processed block meets a preset condition for inter prediction using the affine motion model, parse the bitstream to obtain the identifier 12.

For related descriptions of the preset condition and the identifier 12, refer to the embodiments corresponding to FIG. 7 and FIG. 8. Details are not described herein again.

For example, when the identifier 2 indicates that the candidate motion model for inter prediction of the picture block of the slice including the to-be-processed block does not include an affine motion model, parameter information related to the affine motion model does not need to be parsed when inter prediction is performed on the picture block of the slice. For example, the bitstream does not need to be parsed to obtain the identifier 12.

For example, when the identifier 2 is a value A1, it indicates that the candidate motion model for inter prediction of the picture block in the slice including the to-be-processed block includes an affine motion model, or when the identifier 2 is a value B1, it indicates that the candidate motion model for inter prediction of the picture block in the slice including the to-be-processed block includes an affine motion model. For example, when the identifier 2 is equal to 1, it indicates that the candidate motion model for inter prediction of the picture block in the slice including the to-be-processed block includes an affine motion model, or when the identifier 2 is equal to 0, it indicates that the candidate motion model for inter prediction of the picture block in the slice including the to-be-processed block does not include an affine motion model.

Step 903: Determine, based on the identifier 12, a prediction mode for inter prediction of the to-be-processed block, where the prediction mode includes an affine motion model-based merge mode, an affine motion model-based AMVP mode, and a non-affine motion model-based prediction mode.

For example, the identifier 2 may be represented by a syntax element slice_affine_enabled_flag. slice_affine_enabled_flag specifies whether affine model based motion compensation is enabled for inter prediction. For example, slice_affine_enabled_flag is equal to 0, the syntax elements shall be constrained such that no affine model based motion compensation is used for the slice, and affine_merge_flag, affine_inter_flag and affine_type_flag are not presented in picture block level syntax of the CVS. slice_affine_enabled_flag is equal to 1, affine model based motion compensation may be used for the slice. (slice_affine_enabled_flag specifies whether affine model based motion compensation can be used for inter prediction. If slice_affine_enabled_flag is equal to 0, the syntax elements shall be constrained such that no affine model based motion compensation is used for the slice, and affine_merge_flag, affine_inter_flag and affine_type_flag are not presented in cu level syntax of the CVS. Otherwise (slice_affine_enabled_flag is equal to 1), affine model based motion compensation may be used in the slice).

In the second possible implementation, in a possible example, an identifier 23 may be further configured in the bitstream. The identifier 23 may be configured in a slice header of a slice of the bitstream. When the identifier 2 obtained by parsing the bitstream indicates that the candidate motion model for inter prediction of the slice including the to-be-processed block includes the affine motion model, the bitstream is further parsed to obtain the identifier 23. When the identifier 23 is a first value, the affine motion model includes only a 4-parameter affine model. When the identifier 23 is a second value, the affine motion model includes a 4-parameter affine model and a 6-parameter affine model. The first value is different from the second value. For example, the first value is 1, and the second value is 0; or the first value is 0, and the second value is 1.

For example, the identifier 23 may be represented by slice_affine_type_flag. slice_affine_type_flag specifies whether 6-parameter affine model based motion compensation is enabled for inter prediction. For example, slice_affine_type_flag is equal to 0, the syntax elements shall be constrained such that no 6-parameter affine model based motion compensation is used for the slice, and affine_type_flag is not presented in picture block level syntax in the CVS. Otherwise (slice_affine_type_flag specifies whether 6-parameter affine model based motion compensation can be used for inter prediction. If slice_affine_type_flag is equal to 0, the syntax elements shall be constrained such that no 6-parameter affine model based motion compensation is used in the slice, and affine_type_flag is not presented in cu level syntax in the CVS. Otherwise (slice_affine_type_flag is equal to 1), 6-parameter affine model based motion compensation may be used in the slice. When not present, the value of slice_affine_type_flag is inferred to be equal to 0).

For example, for syntax structures for parsing the identifier 2 and the identifier 23, refer to Table 5.

TABLE 5

| slice_segment_header( ) { | Descriptor |
|---|---|
| ... | |
| slice_affine_enabled_flag | u(1) |
| if(slice_affine_enabled_flag) | |
| slice_affine_type_flag | u(1) |
| ... | |
| ... | |
| } | |

For example, for a part of syntax structure for parsing the inter prediction mode used for the current picture block, refer to Table 6.

TABLE 6

| coding_unit(x0, y0, cb Width, cbHeight) { | |
|---|---|
| ... | |
| merge_flag[x0][y0] | ae(v) |
| if(merge_flag[x0][y0]) { | |
| if(slice_affine_enable_flag && allowAffineMerge) | |
| affine_merge_flag[x0][y0] | ae(v) |
| ... | |
| } else { | |
| ... | |
| if(slice_affine_enable_flag && allowAffineInter){ | |
| affine_inter_flag[x0][y0] | ae(v) |
| if(slice_affine_type_flag && affine_inter_flag[x0][y0]) | |
| affine_type_flag[x0][y0] | ae(v) |
| } | |
| ... } | |
| ... | |
| } | |

In the second possible implementation, in a possible example, if the identifier 2 and the identifier 23 are obtained by parsing the bitstream, when the identifier 12 indicates that affine motion model-based merge mode is used for inter prediction of the to-be-processed block, and the identifier 23 is the second value, a first candidate motion vector list is constructed. The first candidate motion vector list includes a first element, and the first element includes motion information of three control points for constructing the 6-parameter affine motion model. For example, the first element includes one or more 3-tuples.

Optionally, the first candidate motion vector list may further include a second element. The second element includes only motion information of two control points for constructing the 4-parameter affine motion model. For example, the second element includes one or more 2-tuples. The first candidate motion vector list may further include a third element, and the third element includes motion information of a non-affine motion model.

In another possible example, when the identifier 12 indicates that affine motion model-based merge mode is used for inter prediction of the to-be-processed block, and the identifier 23 is the first value, a second candidate motion vector list is constructed. The second candidate motion vector list includes a second element, and the second element includes only motion information of two control points for constructing the 4-parameter affine motion model. The second candidate motion vector list does not include a first element. The second candidate motion vector list may further include a third element, and the third element includes motion information of a non-affine motion model. Both the first candidate motion vector list and the second candidate motion vector list are candidate motion vector lists for the affine motion model-based merge mode.

In the second possible implementation, in a possible example, if the identifier 2 and the identifier 23 are obtained by parsing the bitstream, when the identifier 12 indicates that the affine motion model-based AMVP mode is used for inter prediction of the to-be-processed block, and the identifier 23 is the second value, the bitstream is parsed to obtain an identifier 14. When the identifier 14 is a third value, the affine motion model is the 6-parameter affine motion model, or when the identifier 14 is a fourth value, the affine motion model is the 4-parameter affine motion model. The third value is different from the fourth value. For example, the third value is 1, and the fourth value is 0; or the third value is 0, and the fourth value is 1.

Optionally, the identifier 14 may be represented by a syntax element affine_type_flag. For affine_type_flag, refer to related descriptions in Table 1. Details are not described herein again.

Figure 10:
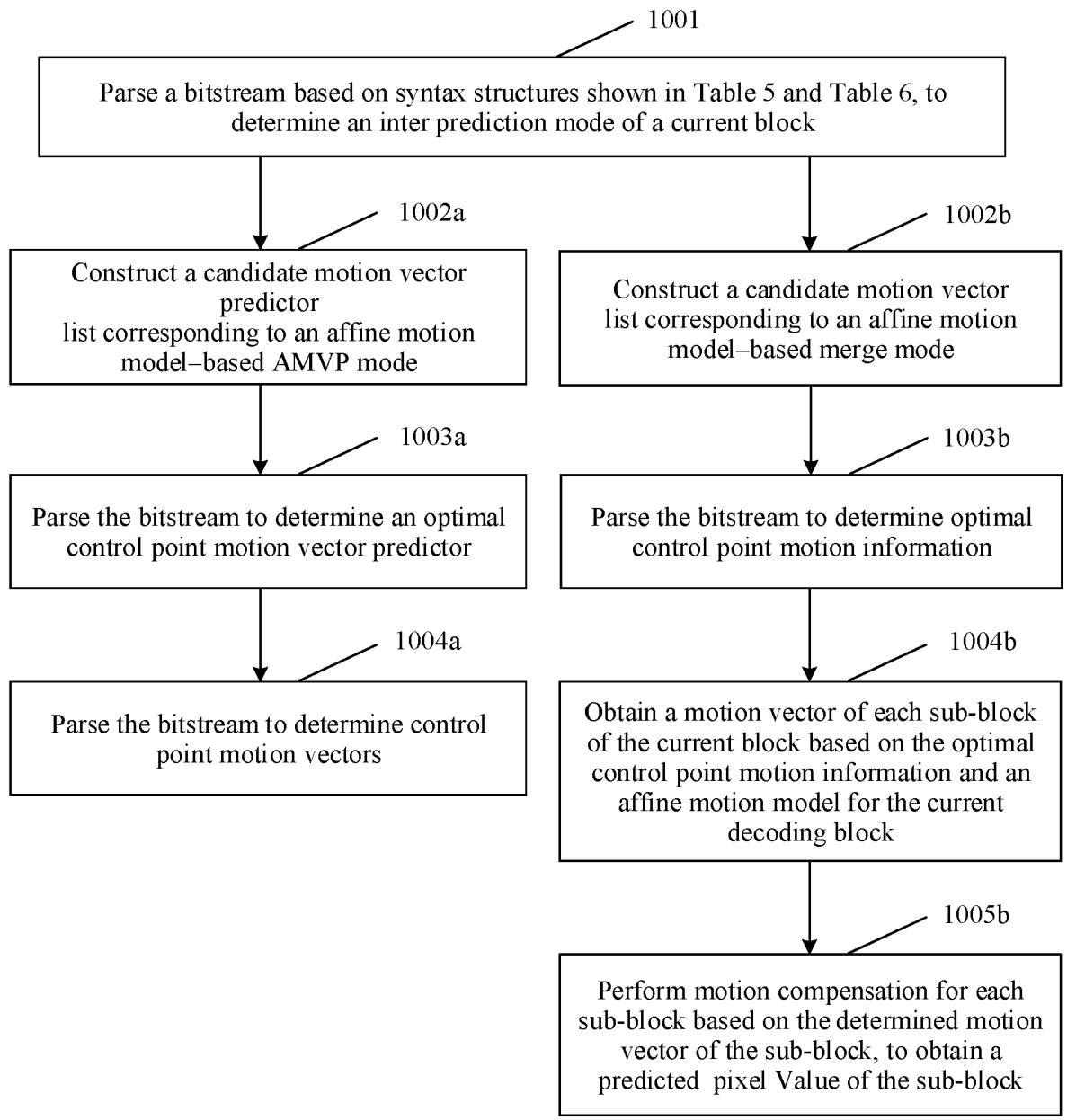
FIG. 10 is a schematic flowchart of an inter prediction method according to an embodiment of this application.

The following uses the syntax structures in Table 5 and Table 6 as an example to describe in detail the inter prediction procedure performed in the second possible manner, as shown in FIG. 10.

Step 1001: Parse a bitstream based on syntax structures shown in Table 5 and Table 6, to determine an inter prediction mode of a current block.

If it is determined that the inter prediction mode of the current block is an affine motion model-based AMVP mode, step 1002*a* is performed.

That is, if slice_affine_enabled_flag=1, merge_flag=0, and affine_inter_flag=1 in syntax elements, it indicate that the inter prediction mode of the current block is the affine motion model-based AMVP mode.

For example, if slice_affine_enabled_flag=0, and merge_flag=0 in the syntax elements, it indicates that the inter prediction mode of the current block is a translational motion model-based AMVP mode. In this case, affine_merge_flag, affine_inter_flag, and affine_type_flag may not be included in the bitstream, and do not need to be obtained by parsing the bitstream.

If it is determined that the inter prediction mode of the current block is an affine motion model-based merge (merge) mode, step 702*b* is performed.

That is, slice_affine_enabled_flag=1, merge_flag=1, and affine_merge_flag=1 in the syntax elements, it indicates that the inter prediction mode of the current block is the affine motion model-based merge mode.

For example, if slice_affine_enabled_flag=0, and merge_flag=1 in the syntax elements, it indicates that the inter prediction mode of the current block is a translational motion model-based merge mode. In this case, affine_ merge_flag, affine_inter_flag, and affine_type_flag may not be included in the bitstream, and do not need to be obtained by parsing the bitstream.

For step 1002a to step 1004a, refer to step 602a to step 604a. Details are not described herein again.

Step 1002b: Construct a motion information candidate list for the affine motion model-based merge mode.

Specifically, the motion information candidate list for the affine motion model-based merge mode may be constructed by using a method for predicting an inherited control point motion vector and/or a constructed control point motion vector.

For constructing the motion information candidate list for the affine motion model-based merge mode by using the method for predicting the inherited control point motion vector, refer to related descriptions of D1 in step 602b. Details are not described herein again.

When candidate control point motion information of the current block is derived by using the method for predicting the constructed control point motion vector, and is added to the motion information candidate list, the method specifically includes the following steps:

(1) Obtain motion information of control points of the current block. For details, refer to step 601c. Details are not described herein again.

(2) Combine the motion information of the control points to obtain constructed control point motion information.

If slice_affine_type_flag=0, motion information of two control points is combined to construct a 4-parameter affine motion model. The two control points are combined as follows: {CP1, CP4}, {CP2, CP3}, {CP1, CP2}, {CP2, CP4}, {CP1, CP3}, or {CP3, CP4}. For example, a 4-parameter affine motion model constructed by using control points CP1 and CP2 is denoted as Affine (CP1, CP2).

If slice_affine_type_flag=1, motion information of three control points is combined to construct a 6-parameter affine motion model. The three control points are combined as follows: {CP1, CP2, CP4}, {CP1, CP2, CP3}, {CP2, CP3, CP4}, or {CP1, CP3, CP4}. For example, a 6-parameter affine motion model constructed by using control points CP1, CP2, and CP3 is denoted as Affine (CP1, CP2, CP3). For example, if slice_affine_type_flag=1, in addition to combining the motion information of the three control points to construct the 6-parameter affine motion model, motion information of two control points may be further combined to construct a 4-parameter affine motion model.

It should be noted that a combination of different control points may also be converted into control points in a same location. For a specific conversion method, refer to related descriptions in step 502. Details are not described herein again.

(3) Add the constructed control point motion information to the candidate motion vector list.

If a length of the candidate list is less than a maximum list length MaxNumMrgCand at this time, these combinations are traversed in a preset order, to obtain a valid combination as candidate control point motion information. If the candidate motion vector list is empty at this time, the candidate control point motion information is added to the candidate motion vector list. Otherwise, motion information in the candidate motion vector list is sequentially traversed, to check whether motion information that is the same as the candidate control point motion information exists in the candidate motion vector list. If no motion information that is the same as the candidate control point motion information exists in the candidate motion vector list, the candidate control point motion information is added to the candidate motion vector list.

For example, if slice_affine_type_flag is 1, a preset order is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3)→Affine (CP2, CP3)→Affine (CP1, CP4)→Affine (CP2, CP4)→Affine (CP3, CP4). There are a total of 10 combinations. An order of adding the 10 combinations to the candidate motion vector list is not specifically limited in this embodiment of this application.

If slice_affine_type_flag is 0, a preset order is as follows: Affine (CP1, CP2)→Affine (CP1, CP3)→Affine (CP2, CP3)→Affine (CP1, CP4)→Affine (CP2, CP4)→Affine (CP3, CP4). There are a total of six combinations. An order of adding the six combinations to the candidate motion vector list is not specifically limited in this embodiment of this application.

For step 1003b, refer to step 603b. Details are not described herein again.

For step 1004b, refer to step 604b. Details are not described herein again.

Figure 11:
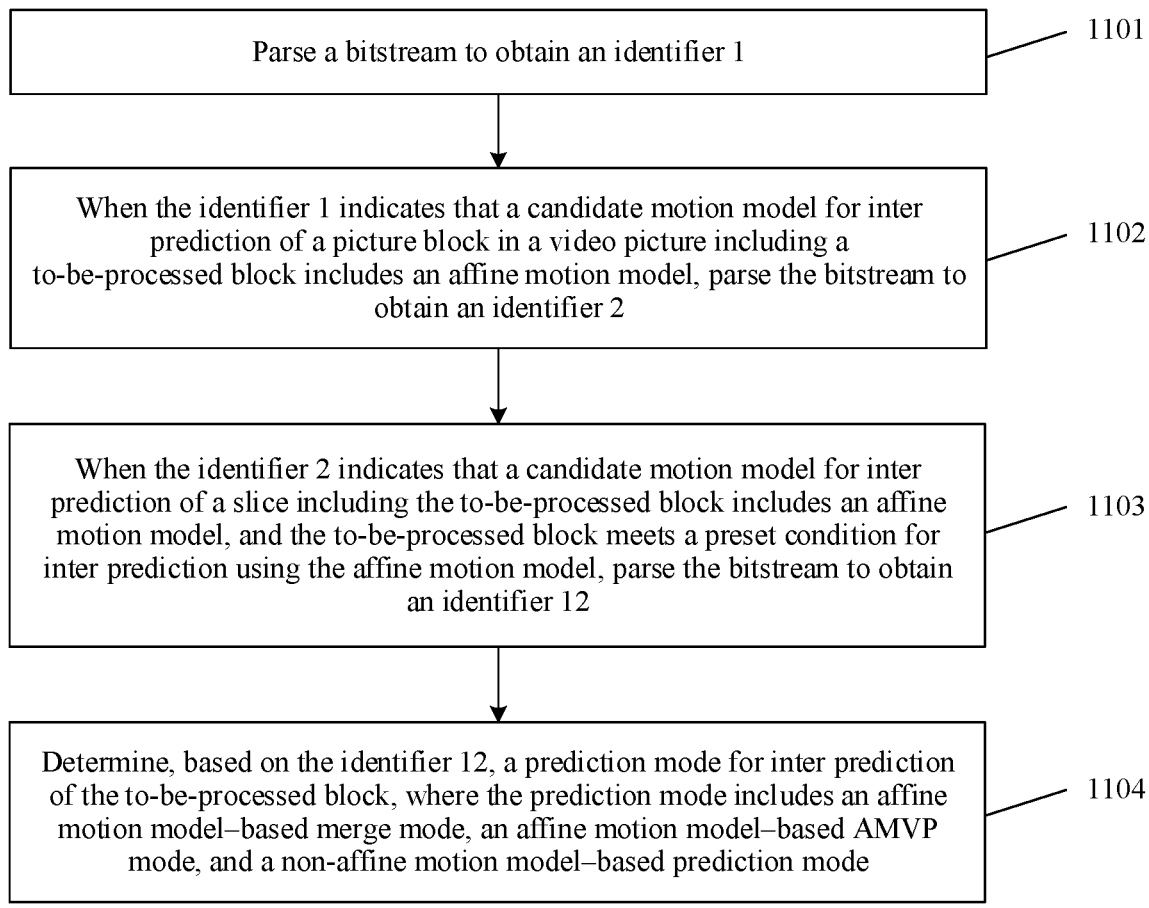
FIG. 11 is a schematic flowchart of still another video picture prediction method according to an embodiment of this application.

Referring to FIG. 11, a third possible implementation is described.

Step 1101: Parse a bitstream to obtain an identifier 1.

Step 1102: When the identifier 1 indicates that a candidate motion model for inter prediction of a picture block in a video picture including a to-be-processed block includes an affine motion model, parse the bitstream to obtain an identifier 2.

For example, the identifier 1 may be represented by a syntax element sps_affine_enabled_flag. sps_affine_enabled_flag specifies whether affine model based motion compensation is enabled for inter prediction. For example, if sps_affine_enabled_flag is equal to 0, it indicates that no affine model based motion compensation is used for the CVS, and slice_affine_enabled_flag are not presented in slice level syntax of the CVS. (sps_affine_enabled_flag equals to 1 specifies that slice_affine_enabled_flag is present in the slice headers. sps_affine_enabled_flag equal to 0 specifies that slice_affine_enabled_flag is not present in the slice headers and affine model based motion compensation is not used in the CVS).

In a possible example, if the identifier 1 indicates that the candidate motion model for inter prediction of the picture block in the video picture including the to-be-processed block includes an affine motion model, it indicates that the bitstream includes the identifier 2. If the identifier 1 indicates that the candidate motion model for inter prediction of the picture block in the video picture including the to-be-processed block does not include an affine motion model, it indicates that the bitstream does not include the identifier 2.

Step 1103: When the identifier 2 indicates that a candidate motion model for inter prediction of a picture block in a slice including the to-be-processed block includes an affine motion model, and the to-be-processed block meets a preset condition for inter prediction using the affine motion model, parse the bitstream to obtain an identifier 12.

For related descriptions of the preset condition, the identifier 1, the identifier 2, and the identifier 12, refer to the embodiments corresponding to FIG. 9 and FIG. 10. Details are not described herein again.

Step 1104: Determine, based on the identifier 12, a prediction mode for inter prediction of the to-be-processed block, where the prediction mode includes an affine motion model-based merge mode, an affine motion model-based AMVP mode, and a non-affine motion model-based mode.

In the third possible implementation, in a possible example, an identifier 23 may be further configured in the bitstream. The identifier 23 may be configured in a slice header of a slice of the bitstream. When the identifier 2 obtained by parsing the bitstream indicates that the candidate motion model for inter prediction of the picture block in the slice including the to-be-processed block includes the affine motion model, the bitstream is parsed to obtain the identifier 23. When the identifier 23 is a first value, the affine motion model includes only a 4-parameter affine model. When the identifier 23 is a second value, the affine motion model includes a 4-parameter affine model and a 6-parameter affine model. The first value is different from the second value. For example, the first value is 1, and the second value is 0; or the first value is 0, and the second value is 1.

For example, for syntax structures for parsing the identifier 1, refer to Table 7.

TABLE 7

| seq_parameter_set_rbsp( ) { | Descriptor |
|---|---|
| ... | |
| sps_affine_enabled_flag | u(1) |
| ... | |
| ... | |
| } | |

For example, for syntax structures for parsing the identifier 2 and the identifier 23, refer to Table 8. Details are not described herein again.

TABLE 8

| slice_segment_header( ) { | Descriptor |
|---|---|
| ... | |
| if(sps_affine_enabled_flag) | |
|     slice_affine_enabled_flag | u(1) |
| if(slice_affine_enabled_flag) | |
|     slice_affine_type_flag | u(1) |
| ... | |
| } | |

For example, for a part of syntax structure for parsing an inter prediction mode used for the current picture block, refer to Table 6.

In the inter prediction procedure in the third possible manner, only a procedure of parsing the bitstream to determine the inter prediction mode of the current block is different from that of the second possible manner, and other procedures are the same. Details are not described herein again.

When the bitstream is parsed to determine the inter prediction mode of the current block, if sps_affine_enabled_flag=1, slice_affine_enabled_flag=1, merge_flag=0, and affine_inter_flag=1 in syntax elements, it indicates that the inter prediction mode of the current block is an affine motion model-based AMVP mode.

For example, if sps_affine_enabled_flag=0, and merge_flag=0 in the syntax elements, it indicates that the inter prediction mode of the current block is a translational motion model based AMVP mode. In this case, affine_merge_flag, affine_inter_flag, and affine_type_flag may not be included in the bitstream, and do not need to be obtained by parsing the bitstream.

For example, if sps_affine_enabled_flag=1, slice_affine_enabled_flag=0, and merge_flag=0 in the syntax elements, it indicates that the inter prediction mode of the current block is a translational motion model-based AMVP mode. In this case, affine_merge_flag, affine_inter_flag, and affine_type_flag may not be included in the bitstream, and do not need to be obtained by parsing the bitstream.

If sps_affine_enabled_flag=1, slice_affine_enabled_flag=1, merge_flag=1, and affine_merge_flag=1 in the syntax elements, it indicates that the inter prediction mode of the current block is an affine motion model-based merge mode.

For example, if sps_affine_enabled_flag=0, and merge_flag=1 in the syntax elements, it indicates that the inter prediction mode of the current block is a translational motion model based merge mode. In this case, affine_merge_flag, affine_inter_flag, and affine_type_flag may not be included in the bitstream, and do not need to be obtained by parsing the bitstream.

For example, if sps_affine_enabled_flag=1, slice_affine_enabled_flag=0, and merge_flag=1, it indicates that the inter prediction mode of the current block is a translational motion model-based merge mode. In this case, affine_merge_flag, affine_inter_flag, and affine_type_flag may not be included in the bitstream, and do not need to be obtained by parsing the bitstream.

In the third possible implementation, an identifier 13 may be further configured in the bitstream based on the identifier 1. In the third possible implementation, when the identifier 13 indicates that affine motion model-based merge mode is used for inter prediction of the to-be-processed block, the identifier 13 may further indicate whether the bitstream includes the identifier 23.

After the parsing a bitstream to obtain an identifier 1 in step 1101 and before the parsing the bitstream to obtain an identifier 2 in step 1102, the method further includes: parsing the bitstream to obtain an identifier 13.

The identifier 13 may be represented by a syntax element sps_affine_type_flag. sps_affine_type_flag is used to indicate whether 6-parameter affine motion model-based motion compensation is enabled for inter prediction and whether the bitstream includes slice_affine_type_flag. For example, sps_affine_type_flag=0, it indicates that 6-parameter affine motion model-based motion compensation is not enabled for inter prediction. In this case, a CVS does not include a syntax element used to indicate 6-parameter affine motion model-based motion compensation. For example, slice_affine_type_flag or affine_type_flag are not presented in picture block level syntax of the CVS. (slice_affine_type_flag specifies whether 6-parameter affine model based motion compensation can be used for inter prediction. If slice_affine_type_flag is equal to the syntax elements shall be constrained such that no 6-parameter affine model based motion compensation is used in decoding of the current picture, and affine_type_flag is not presented in cu level syntax of the current picture. Otherwise (slice_affine_type_flag is equal to 1), 6-parameter affine model based motion compensation may be used in decoding of the current picture. When not present, the value of slice_affine_type_flag is inferred to be equal to 0).

For example, for syntax structures for parsing the identifier 1 and the identifier 13, refer to Table 9.

TABLE 9

| seq_parameter_set_rbsp( ) { | Descriptor |
|---|---|
| ... | |
|     sps_affine_enabled_flag | u(1) |
|     if(sps_affine_enabled_flag) | |
|         sps_affine_type_flag | u(1) |
| ... | |
| } | |

For example, for syntax structures for parsing the identifier 2 and the identifier 23, refer to Table 10.

| slice_segment_header( ) { | Descriptor |
|---|---|
| ... | |
|     if(sps_affine_enabled_flag) | |
|         slice_affine_enabled_flag | u(1) |
|     if(sps_affine_type_flag && slice_affine_enabled_flag) | |
|         slice_affine_type_flag | u(1) |
| ... | |
| } | |

Figure 12:
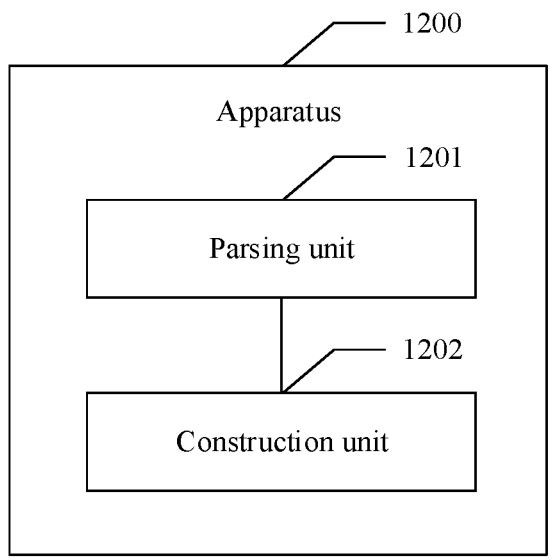
FIG. 12 is a schematic diagram of an apparatus 1200 according to an embodiment of this application.

Based on a same inventive concept as the method embodiment, an embodiment of this application further provides an apparatus. Referring to FIG. 12, the apparatus 1200 may be specifically a processor, a chip, or a chip system in a video decoder, or a module in a video decoder, for example, a motion compensation module 322.

For example, the apparatus may include a parsing unit 1201 and a construction unit 1202. The parsing unit 1201 and the construction unit 1202 perform the steps in the methods shown in the embodiments corresponding to FIG. 7 to FIG. 11. For example, the parsing unit 1201 may be configured to parse identifiers (for example, an identifier 1, an identifier 12, an identifier 13, an identifier 14, an identifier 2, and an identifier 23) included in a bitstream, and the construction unit 1202 is configured to construct a candidate motion vector list (a first candidate motion vector list, a second candidate motion vector list, or the like).

Figure 13:
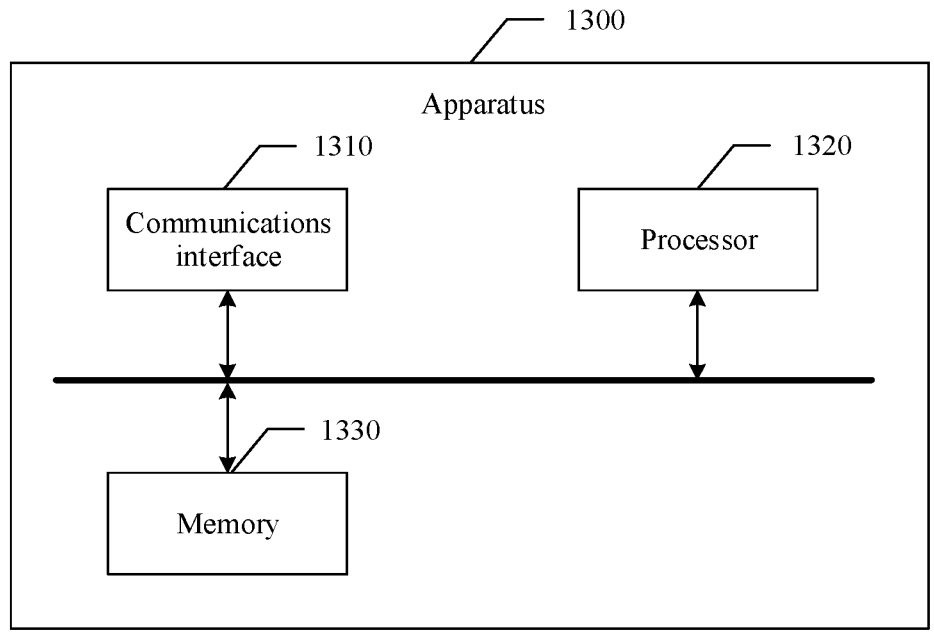
FIG. 13 is a schematic diagram of an apparatus 1300 according to an embodiment of this application.

An embodiment of this application further provides another structure of a decoding apparatus. As shown in FIG. 13, the apparatus 1300 may include a communications interface 1310 and a processor 1320. Optionally, the apparatus 1300 may further include a memory 1330. The memory 1330 may be disposed inside or outside the apparatus. Both the parsing unit 1201 and the construction unit 1202 shown in FIG. 12 may be implemented by the processor 1320. The processor 1320 sends or receives a video stream or a bitstream through the communications interface 1310, and is configured to implement the methods in FIG. 7 to FIG. 11. In an implementation process, steps in a processing procedure may be implemented by using an integrated logic circuit of hardware in the processor 1320 or an instruction in a form of software, to complete the methods in FIG. 7 to FIG. 11.

The communications interface 1310 in this embodiment of this application may be a circuit, a bus, a transceiver, or any other apparatus that may be configured to exchange information. For example, the other apparatus may be a device connected to the apparatus 1300. For example, when the apparatus is a video encoder, the other apparatus may be a video decoder.

In this embodiment of this application, the processor 1320 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps in the methods disclosed with reference to the embodiments of this application may be directly performed by a hardware processor, or may be performed by using a combination of hardware in the processor and a software unit. Program code executed by the processor 1320 to implement the foregoing methods may be stored in the memory 1330. The memory 1330 is coupled to the processor 1320.

Coupling in this embodiment of this application is an indirect coupling or a communication connection between apparatuses, units, or modules, may be in an electrical form, a mechanical form, or another form, and is used for information exchange between the apparatuses, the units, or the modules.

The processor 1320 may operate in collaboration with the memory 1330. The memory 1330 may be a nonvolatile memory, for example, a hard disk drive (hard disk drive, HDD) or a solid-state drive (solid-state drive, SSD), or may be a volatile memory (volatile memory), for example, a random access memory (random-access memory, RAM). The memory 1330 is any other medium that can be configured to carry or store expected program code in a form of an instruction or a data structure and that can be accessed by a computer, but is not limited thereto.

In this embodiment of this application, a specific connection medium between the communications interface 1310, the processor 1320, and the memory 1330 is not limited. In this embodiment of this application, the memory 1330, the processor 1320, and the communications interface 1310 are connected through a bus in FIG. 13, and the bus is represented by a thick line in FIG. 13. A connection mode between other components is merely schematically described, and is not limited thereto. The bus may be classified into an address bus, a data bus, a control bus, and the like. For ease of representation, only one thick line is used to represent the bus in FIG. 13, but this does not mean that there is only one bus or only one type of bus.

The foregoing feasible implementations and specific embodiments related to FIG. 7 to FIG. 11 describe one or more video data decoding apparatuses in this application. It should be understood that, according to the foregoing description, an encoder side usually determines an inter prediction mode and encodes the inter prediction mode into a bitstream. After the finally selected inter prediction mode is selected, indicators (for example, the identifier 1, the identifier 2, the identifier 12, the identifier 13, the identifier 14, and the identifier 23 in the foregoing description) of the inter prediction mode are encoded into the bitstream according to an encoding process that is completely inverse to that of the foregoing decoding method (which correspond to the identifier 1, the identifier 2, the identifier 12, the identifier 13, the identifier 14, and the identifier 23 respectively parsed in a decoding process). It should be understood that construction of the candidate motion vector list on the encoder side is completely consistent with that on a decoder side. A specific embodiment of the encoder side is not described again. However, it should be understood that the video picture prediction method described in this application is also applicable to an encoding apparatus.

Figure 14:
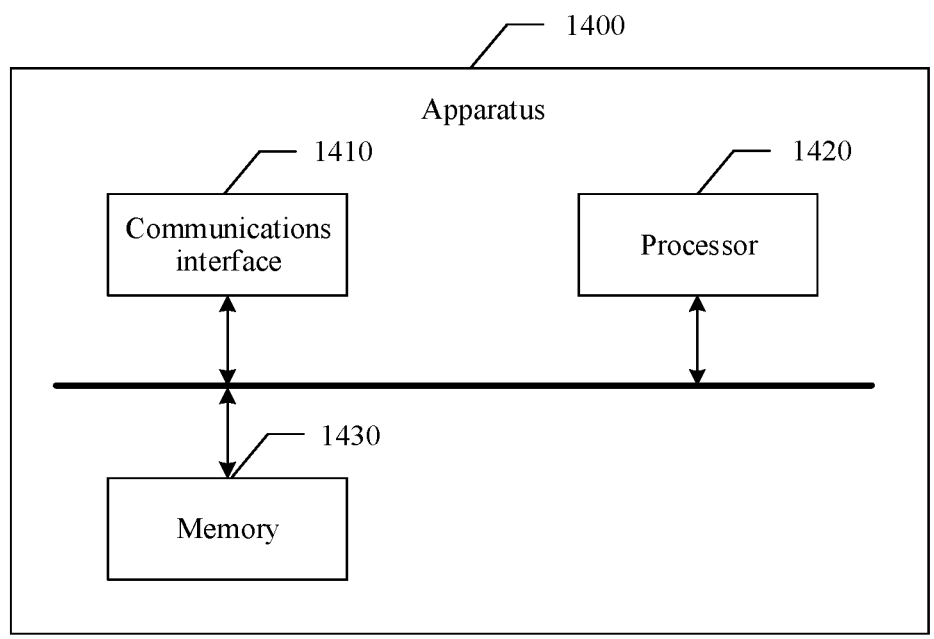
FIG. 14 is a schematic diagram of an apparatus 1400 according to an embodiment of this application.

An embodiment of this application further provides an encoding apparatus. As shown in FIG. 14, the apparatus 1400 may include a communications interface 1410 and a processor 1420. Optionally, the apparatus 1400 may further include a memory 1430. The memory 1430 may be disposed inside or outside the apparatus. The processor 1420 sends or receives a video stream or a bitstream through the communications interface 1410.

In an aspect, the processor 1420 is configured to: encode an identifier 1 into a bitstream; and when the identifier 1 indicates that a candidate motion model for inter prediction of a picture block in a video picture including a to-be-processed block includes an affine motion model, and the to-be-processed block meets a preset condition for inter prediction using the affine motion model, encode an identifier 12 into the bitstream. The identifier 12 is used to determine a prediction mode for inter prediction of the to-be-processed block. The prediction mode includes an affine motion model-based merge mode, an affine motion model-based advanced motion vector prediction (AMVP) mode, and a non-affine motion model-based prediction mode.

In another aspect, the processor 1420 is configured to: encode an identifier 3 into a bitstream; and when the identifier 3 indicates that a candidate motion model for inter prediction of a picture block in a slice including a to-be-processed block includes an affine motion model, and the to-be-processed block meets a preset condition for inter prediction using the affine motion model, encode an identifier 32 into the bitstream. The identifier 32 is used to determine a prediction mode for inter prediction of the to-be-processed block. The prediction mode includes an affine motion model-based merge mode, an affine motion model-based advanced motion vector prediction (AMVP) mode, and a non-affine motion model-based prediction mode.

The communications interface 1410 in this embodiment of this application may be a circuit, a bus, a transceiver, or any other apparatus that may be configured to exchange information. For example, the other apparatus may be a device connected to the apparatus 1400. For example, when the apparatus is a video encoder, the other apparatus may be a video decoder.

In this embodiment of this application, the processor 1420 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps in the methods disclosed with reference to the embodiments of this application may be directly performed by a hardware processor, or may be performed by using a combination of hardware in the processor and a software unit. Program code executed by the processor 1420 to implement the foregoing methods may be stored in the memory 1430. The memory 1430 is coupled to the processor 1420.

Coupling in this embodiment of this application is an indirect coupling or a communication connection between apparatuses, units, or modules, may be in an electrical form, a mechanical form, or another form, and is used for information exchange between the apparatuses, the units, or the modules.

The processor 1420 may operate in collaboration with the memory 1430. The memory 1430 may be a nonvolatile memory, for example, a hard disk drive (hard disk drive, HDD) or a solid-state drive (solid-state drive, SSD), or may be a volatile memory (volatile memory), for example, a random access memory (random-access memory, RAM). The memory 1430 is any other medium that can be configured to carry or store expected program code in a form of an instruction or a data structure and that can be accessed by a computer, but is not limited thereto.

In this embodiment of this application, a specific connection medium between the communications interface 1410, the processor 1420, and the memory 1430 is not limited. In this embodiment of this application, the memory 1430, the processor 1420, and the communications interface 1410 are connected through a bus in FIG. 14, and the bus is represented by a thick line in FIG. 14. A connection mode between other components is merely schematically described, and is not limited thereto. The bus may be classified into an address bus, a data bus, a control bus, and the like. For ease of representation, only one thick line is used to represent the bus in FIG. 14, but this does not mean that there is only one bus or only one type of bus.

Based on the foregoing embodiments, an embodiment of this application further provides a computer storage medium. The storage medium stores a software program; and when the software program is read and executed by one or more processors, the method provided in any one or more of the foregoing embodiments may be implemented. The computer storage medium may include any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor, configured to implement the functions in any one or more of the foregoing embodiments, for example, obtaining or processing the information or the message in the foregoing methods. Optionally, the chip further includes a memory, and the memory is configured to store a program instruction and data that are necessary and executed by the processor. The chip may include a chip, or may include a chip and another discrete device.

Although specific aspects of this application have been described with reference to the video encoder 20 and the video decoder 30, it should be understood that the technologies of this invention may be applied by using many other video encoding and/or decoding units, processors, processing units such as a hardware-based decoding unit of an encoder/decoder (CODEC) and a similar unit, and the like. In addition, it should be understood that the steps shown and described in FIG. 6A to FIG. 11 are merely provided as feasible implementations. In other words, the steps shown in the feasible implementations in FIG. 6A to FIG. 11 are not necessarily performed in the order shown in FIG. 6A to FIG. 11, and fewer, additional, or alternative steps may be performed.

Further, it should be understood that depending on the feasible implementations, specific actions or events in any of the methods described in this specification may be performed in different orders, an action or event may be added, or the actions or events may be combined, or omitted (for example, not all of the described actions or events are necessary for implementing the method). Further, in a specific feasible implementation, the actions or events may (for example) undergo multi-threading processing or interrupt processing, or may be processed by a plurality of processors simultaneously instead of sequentially. Further, although a specific aspect of this application is described as being performed by a single module or unit for purposes of clarity, it should be understood that the technologies of this application may be performed by a combination of units or modules associated with a video decoder.

In one or more feasible implementations, the described functions may be implemented by using hardware, software, firmware, or any combination thereof. If the functions are implemented by using software, the functions may be stored in a computer-readable medium as one or more instructions or code or be transmitted through a computer-readable medium, and be performed by a hardware-based processing unit. The computer-readable medium may include a computer-readable storage medium or a communications medium. The computer-readable storage medium corresponds to a tangible medium such as a data storage medium. The communications medium includes any medium that facilitates transmission of a computer program (for example) from one location to another location according to a communications protocol.

In this manner, the computer-readable medium may correspond to, for example, (1) a non-transitory tangible computer-readable storage medium, or (2) a communications medium such as a signal or a carrier. The data storage medium may be any available medium that can be accessed by one or more computers or one or more processors to retrieve instructions, code, and/or data structures for implementing the technologies described in this application. A computer program product may include a computer-readable medium.

By way of a feasible implementation rather than a limitation, the computer-readable storage medium may include a RAM, a ROM, an EEPROM, a CD-ROM or another optical disk storage apparatus, a magnetic disk storage apparatus or another magnetic storage apparatus, a flash memory, or any other medium that can be used to store required code in a form of an instruction or a data structure and that can be accessed by a computer. Likewise, any connection may be appropriately referred to as a computer-readable medium. For example, if an instruction is transmitted from a website, server, or another remote source through a coaxial cable, a fiber-optic cable, a twisted pair, a digital subscriber line (DSL), or wireless technologies such as infrared, radio, and microwave, the coaxial cable, fiber-optic cable, twisted pair, DSL, or wireless technologies such as infrared, radio, and microwave are included in a definition of medium.

However, it should be understood that the computer-readable storage medium and the data storage medium do not include a connection, a carrier, a signal, or another transitory medium, but alternatively mean non-transitory tangible storage media. A magnetic disk and an optical disc used in this specification include a compact disc (CD), a laser disc, an optical disc, a digital versatile disc (DVD), a floppy disk, and a Blu-ray disc. The magnetic disk usually reproduces data magnetically, and the optical disc reproduces data optically through a laser. A combination of the foregoing magnetic disk and optical disc shall also be included in a scope of the computer-readable medium.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any one of the foregoing structures or another structure that is used to implement the technologies described in this specification. In addition, in some aspects, the functionality described in this specification may be provided in a dedicated hardware and/or software module configured for encoding and decoding, or may be incorporated into a combined codec. In addition, the technologies may all be implemented in one or more circuits or logic elements.

The technologies in this application may be implemented in various apparatuses or devices, including a wireless mobile phone, an integrated circuit (IC), or a set of ICs (for example, a chip set). Various components, modules, or units are described in this application to emphasize functional aspects of an apparatus configured to perform the disclosed technologies, but are not necessarily implemented by different hardware units. More specifically, as described above, the units may be combined in a codec hardware unit or provided by a set of interoperable hardware units (including one or more processors as described above) in conjunction with suitable software and/or firmware.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method for transmitting an encoded bitstream of video data, comprising:
   receiving the encoded bitstream of video data, the encoded bitstream comprises a plurality of syntax elements, wherein the plurality of syntax elements comprise a first identifier which indicates that an affine motion model based motion compensation is enabled for a video sequence including a picture block to be processed;
   wherein the encoded bitstream further comprises a second identifier when the first identifier indicates that the affine motion model based motion compensation is enabled for the video sequence and the picture block satisfies a condition for inter prediction using the affine motion model, and wherein the second identifier indicates that an affine motion model based advanced motion vector prediction (AMVP) mode is used for inter prediction of the picture block;
   wherein the encoded bitstream further comprises a third identifier when the first identifier indicates that the affine motion model based motion compensation is enabled for the video sequence;
   wherein the encoded bitstream further comprises a fourth identifier when the second identifier indicates that the affine motion model based AMVP mode is used for inter prediction of the picture block and the third identifier is a true value;
   wherein a false value of the third identifier indicates that a 6-parameter affine motion model based motion compensation is disabled for the video sequence and the true value of the third identifier indicates that the 6-parameter affine motion model based motion compensation is enabled for the video sequence, wherein a true value of the fourth identifier indicates that the 6-parameter affine motion model based motion compensation is used for inter prediction of the picture block, and wherein the false value of the fourth identifier indicates that a 4-parameter affine motion model based motion compensation is used for inter prediction of the picture block; and
   sending the encoded bitstream.

2. The method of claim 1, further comprising:
storing the encoded bitstream.

3. The method according to claim 1, wherein the first identifier is represented by sps_affine_enabled_flag indicating whether the affine motion model based motion compensation is enabled for the video sequence, and wherein the affine motion model based motion compensation is indicated as enabled for the video sequence when a value of the sps_affine_enabled_flag is 1.

4. The method according to claim 1, wherein the third identifier is represented by a sequence parameter set (SPS) level flag indicating whether the 6-parameter affine motion model based motion compensation is enabled for the video sequence, wherein the SPS level flag has a value of 1 or 0, wherein the value of 1 of the SPS level flag indicates that the 6-parameter affine motion model based motion compensation is enabled for the video sequence, and wherein the value of 0 of the SPS level flag indicates the 6-parameter affine motion model based motion compensation is disabled.

5. The method according to claim 1, wherein the second identifier is represented by affine_inter_flag indicating whether the affine motion model-based AMVP mode is used for the picture block when a slice comprising the picture block is a P slice or a B slice, wherein the affine_inter_flag has a value of 1 or 0, wherein the value of 1 of the affine_inter_flag indicates that the affine motion model-based AMVP mode is used for the picture block, and wherein the value of 0 of the affine_inter_flag indicates that the affine motion model-based AMVP mode is not used for the picture block.

6. The method according to claim 1, wherein the fourth identifier is represented by affine_type_flag in a coding unit syntax, wherein the affine_type_flag has a value of 1 or 0, indicating whether a 6-parameter affine motion model-based motion compensation is used for inter prediction of the picture block, wherein the value of 1 of the affine_type_flag indicates that the 6-parameter affine motion model-based motion compensation is used for inter prediction of the picture block, and wherein the value of 0 of the affine_type_flag indicates that the 4-parameter affine motion model-based motion compensation is used for inter prediction of the picture block.

7. The method according to claim 1, wherein the condition comprises that a width of the picture block is greater than or equal to 16, and a height of the picture block is greater than or equal to 16.

8. The method according to claim 1, wherein the true value is indicated by 1 and the false value is indicated by 0.

9. A device for transmitting an encoded bitstream of video data, comprising:
a non-transitory memory storage, configured to store video data in a form of a bitstream; and
a processor, configured to:
receive the encoded bitstream for video signals, the encoded bitstream comprises a plurality of syntax elements, wherein the plurality of syntax elements comprise a first identifier which indicates that an affine motion model based motion compensation is enabled for a video sequence including a picture block to be processed;
wherein the encoded bitstream further comprises a second identifier when the first identifier indicates that the affine motion model based motion compensation is enabled for the video sequence and the picture block satisfies a condition for inter prediction using the affine motion model, and wherein the second identifier indicates that an affine motion model based advanced motion vector prediction (AMVP) mode is used for inter prediction of the picture block;
wherein the encoded bitstream further comprises a third identifier when the first identifier indicates that the affine motion model based motion compensation is enabled for the video sequence;
wherein the encoded bitstream further comprises a fourth identifier when the second identifier indicates that the affine motion model based AMVP mode is used for inter prediction of the picture block and the third identifier is a true value;
wherein a false value of the third identifier indicates that a 6-parameter affine motion model based motion compensation is disabled for the video sequence and the true value of the third identifier indicates that the 6-parameter affine motion model based motion compensation is enabled for the video sequence, wherein a true value of the fourth identifier indicates that the 6-parameter affine motion model based motion compensation is used for inter prediction of the picture block, and wherein the false value of the fourth identifier indicates that a 4-parameter affine motion model based motion compensation is used for inter prediction of the picture block; and
send the encoded bitstream.

10. The device of claim 9, wherein the processor is further configured to store the encoded bitstream.

11. The device according to claim 9, wherein the first identifier is represented by sps_affine_enabled_flag indicating whether the affine motion model based motion compensation is enabled for the video sequence, and wherein the affine motion model based motion compensation is indicated as enabled for the video sequence when a value of the sps_affine_enabled_flag is 1.

12. The device according to claim 9, wherein the third identifier is represented by a sequence parameter set (SPS) level flag indicating whether the 6-parameter affine motion model based motion compensation is enabled for the video sequence, wherein the SPS level flag has a value of 1 or 0, wherein the value of 1 of the SPS level flag indicates that the 6-parameter affine motion model based motion compensation is enabled for the video sequence, and wherein the value of 0 of the SPS level flag indicates the 6-parameter affine motion model based motion compensation is disabled.

13. The device according to claim 9, wherein the second identifier is represented by affine_inter_flag indicating whether the affine motion model-based AMVP mode is used for the picture block when a slice comprising the picture block is a P slice or a B slice, wherein the affine_inter_flag has a value of 1 or 0, wherein the value of 1 of the affine_inter_flag indicates that the affine motion model-based AMVP mode is used for the picture block, and wherein the value of 0 of the affine_inter_flag indicates that the affine motion model-based AMVP mode is not used for the picture block.

14. The device according to claim 9, wherein the fourth identifier is represented by affine_type_flag in a coding unit syntax, wherein the affine_type_flag has a value of 1 or 0, indicating whether a 6-parameter affine motion model-based motion compensation is used for inter prediction of the picture block, wherein the value of 1 of the affine_type_flag indicates that the 6-parameter affine motion model-based motion compensation is used for inter prediction of the picture block, and wherein the value of 0 of the affine_ type_flag indicates that the 4-parameter affine motion model-based motion compensation is used for inter prediction of the picture block.

15. The device according to claim 9, wherein the condition comprises that a width of the picture block is greater than or equal to 16, and a height of the picture block is greater than or equal to 16.

16. The device according to claim 9, wherein the true value is indicated by 1 and the false value is indicated by 0.

17. A non-transitory computer-readable storage medium storing one or more instructions executable on a computer to perform operations comprising:
receiving an encoded bitstream of video data, the encoded bitstream comprises a plurality of syntax elements, wherein the plurality of syntax elements comprise a first identifier which indicates that an affine motion model based motion compensation is enabled for a video sequence including a picture block to be processed;
wherein the encoded bitstream further comprises a second identifier when the first identifier indicates that the affine motion model based motion compensation is enabled for the video sequence and the picture block satisfies a condition for inter prediction using the affine motion model, and wherein the second identifier indicates that an affine motion model based advanced motion vector prediction (AMVP) mode is used for inter prediction of the picture block;
wherein the encoded bitstream further comprises a third identifier when the first identifier indicates that the affine motion model based motion compensation is enabled for the video sequence;
wherein the encoded bitstream further comprises a fourth identifier when the second identifier indicates that the affine motion model based AMVP mode is used for inter prediction of the picture block and the third identifier is a true value;
wherein a false value of the third identifier indicates that a 6-parameter affine motion model based motion compensation is disabled for the video sequence and the true value of the third identifier indicates that the 6-parameter affine motion model based motion compensation is enabled for the video sequence, wherein a true value of the fourth identifier indicates that the 6-parameter affine motion model based motion compensation is used for inter prediction of the picture block, and wherein the false value of the fourth identifier indicates that a 4-parameter affine motion model based motion compensation is used for inter prediction of the picture block; and
sending the encoded bitstream.

18. The non-transitory computer-readable storage medium of claim 17, the operations further comprising:
storing the encoded bitstream.

19. The non-transitory computer-readable storage medium according to claim 17, wherein the first identifier is represented by sps_affine_enabled_flag indicating whether the affine motion model based motion compensation is enabled for the video sequence, and wherein the affine motion model based motion compensation is indicated as enabled for the video sequence when a value of the sps_affine_enabled_flag is 1.

20. The non-transitory computer-readable storage medium according to claim 17, wherein the third identifier is represented by a sequence parameter set (SPS) level flag indicating whether the 6-parameter affine motion model based motion compensation is enabled for the video sequence, wherein the SPS level flag has a value of 1 or 0, wherein the value of 1 of the SPS level flag indicates that the 6-parameter affine motion model based motion compensation is enabled for the video sequence, and wherein the value of 0 of the SPS level flag indicates the 6-parameter affine motion model based motion compensation is disabled.

* * * * *

UNITED STATES PATENT AND TRADEMARK OFFICE
CERTIFICATE OF CORRECTION

| | | |
|---|---|---|
| PATENT NO. | : 12,309,415 B2 | Page 1 of 1 |
| APPLICATION NO. | : 18/345223 | |
| DATED | : May 20, 2025 | |
| INVENTOR(S) | : Huanbang Chen et al. | |

It is certified that error appears in the above-identified patent and that said Letters Patent is hereby corrected as shown below:

On the Title Page

Item (56), Column 2 (Other Publications), In Line 3, Delete "buJoint" and insert -- Joint --.

Signed and Sealed this
Sixteenth Day of September, 2025

Coke Morgan Stewart
*Acting Director of the United States Patent and Trademark Office*